(12) United States Patent
Khoshkholgh Dashtaki et al.

(10) Patent No.: US 12,501,514 B2
(45) Date of Patent: Dec. 16, 2025

(54) METHODS AND APPARATUSES FOR DETERMINING A DISCONTINUOUS RECEPTION (DRX) CYCLE

(71) Applicant: KONINKLIJKE PHILIPS N.V., Eindhoven (NL)

(72) Inventors: Mohammad Ghadir Khoshkholgh Dashtaki, Reston, VA (US); Ali Cagatay Cirik, Chantilly, VA (US); Esmael Hejazi Dinan, McLean, VA (US); Hsin-Hsi Tsai, Reston, VA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 19/038,912

(22) Filed: Jan. 28, 2025

(65) Prior Publication Data

US 2025/0176067 A1    May 29, 2025

Related U.S. Application Data

(63) Continuation of application No. PCT/US2023/085547, filed on Dec. 21, 2023.
(Continued)

(51) Int. Cl.
*H04W 76/28* (2018.01)
*H04W 72/0446* (2023.01)
(Continued)

(52) U.S. Cl.
CPC ....... *H04W 76/28* (2018.02); *H04W 72/0446* (2013.01); *H04W 72/231* (2023.01)

(58) Field of Classification Search
CPC ............... H04W 76/28; H04W 72/231; H04W 72/0446
See application file for complete search history.

(56) References Cited

U.S. PATENT DOCUMENTS 12,004,255 B2    6/2024 Ang et al.
2020/0077337 A1    3/2020 Wei et al.
(Continued)

FOREIGN PATENT DOCUMENTS

WO    2023/226685 A1    11/2023

OTHER PUBLICATIONS

S. Dutta et al., 'XR-specific C-DRX Enhancement for UE power saving in 5G NR', 2022 IEEE 33rd Annual International Symposium on Personal, Indoor and Mobile Radio Communications (PIMRC), 2022, pp. 1-6. (Year: 2022).*
(Continued)

*Primary Examiner* — Melvin C Marcelo

(57) ABSTRACT

A method can include receiving, by a wireless device, one or more discontinuous reception (DRX) configuration parameters indicating: a first DRX cycle; a DRX slot offset; and a DRX on-duration timer. The method can also include determining, for starting the DRX on-duration timer, a DRX cycle. The DRX cycle can be the first DRX cycle, based on the one or more DRX configuration parameters not indicating the second DRX cycle with the non-integer value. Alternatively, the DRX cycle can be the second DRX cycle, based on the one or more DRX configuration parameters indicating the second DRX cycle with the non-integer value. A parameter of the one or more DRX configuration parameters can indicate the non-integer value of the second DRX cycle. The method can further include starting, after the DRX slot offset from a subframe determined based on the DRX cycle, the DRX on-duration timer.

20 Claims, 29 Drawing Sheets

---

Receiving one or more DRX configuration parameters

↓

Determining a starting occasion (e.g., subframe/slot/symbols) of a DRX on duration timer (e.g., of a DRX configuration) using/via a first set of formulas/methods or a second set of formulas/methods considering/based on at least on of the following:
• whether the DRX configuration has a non-integer DRX cycle or an integer DRX cycle; and/or
• whether the DRX configuration corresponds to a first traffic type (e.g., with an integer periodicity) or a second traffic type (e.g., with a non-integer periodicity);

↓

Starting the DRX on duration timer at the starting occasion

Related U.S. Application Data

(60) Provisional application No. 63/434,749, filed on Dec. 22, 2022.

(51) Int. Cl.
  *H04W 72/231* (2023.01)
  *H04W 88/02* (2009.01)

(56) References Cited

U.S. PATENT DOCUMENTS

| | | |
|---|---|---|
| 2020/0389933 A1 | 12/2020 | Ang et al. |
| 2021/0266837 A1 | 8/2021 | Chen et al. |
| 2021/0307108 A1 | 9/2021 | Babaei |
| 2022/0095230 A1 | 3/2022 | Shi |
| 2022/0104134 A1 | 3/2022 | Shi |
| 2023/0008854 A1 | 1/2023 | Lee et al. |
| 2023/0051778 A1 | 2/2023 | Lee et al. |
| 2023/0292237 A1 | 9/2023 | Mondet et al. |

OTHER PUBLICATIONS

R2-2211860; 3GPP TSG-RAN WG2 Meeting #120; Toulouse, France and Online, Nov. 14-18, 2022; Revision of R2-2210651; Agenda Item: 8.5.3.1; Souce: MediaTek Inc.; Title: C-DRX enhancements for XR; Document for: Discussion and decision.
3GPP TS 38.211 V17.3.0 (Sep. 2022); Technical Specification; 3rd Generation Partnership Project; Technical Specification Group Radio Access Network; NR; Physical channels and modulation; (Release 17).
3GPP TS 38.212 V17.3.0 (Sep. 2022); Technical Specification; 3rd Generation Partnership Project; Technical Specification Group Radio Access Network; NR; Multiplexing and channel coding; (Release 17).
3GPP TS 38.213 V17.3.0 (Sep. 2022); Technical Specification; 3rd Generation Partnership Project; Technical Specification Group Radio Access Network; NR; Physical layer procedures for control (Release 17).
3GPP TS 38.214 V17.3.0 (Sep. 2022); Technical Specification; 3rd Generation Partnership Project; Technical Specification Group Radio Access Network; NR; Physical layer procedures for data; (Release 17).
3GPP TS 38.300 V17.1.0 (Jun. 2022); Technical Specification; 3rd Generation Partnership Project; Technical Specification Group Radio Access Network; NR; NR and NG-RAN Overall Description; Stage 2; (Release 17).
3GPP TS 38.321 V17.2.0 (Sep. 2022); Technical Specification; 3rd Generation Partnership Project; Technical Specification Group Radio Access Network; NR; Medium Access Control (MAC) protocol specification; (Release 17).
3GPP TS 38.331 V17.1.0 (Jun. 2022); Technical Specification; 3rd Generation Partnership Project; Technical Specification Group Radio Access Network; NR; Radio Resource Control (RRC) protocol specification; (Release 17).
3GPP TSG RAN WG1 #111; Toulouse, France, Nov. 14-18, 2022; Title: RAN1 Chair's Notes.
R1-2007363; 3GPP TSG RAN WG1 Meeting #102-e; e-Meeting, aUG. 17-28, 2020; Change Request; 38.214; CR 0124; rev -; Current version: 16.2.0.
R1-2208401; 3GPP TSG RAN WG1 Meeting #110-bis-eTdoc; Online, Oct. 10-19, 2022; Agenda Item: 9.10.1; Source: Ericsson; Title: Discussion on power saving enhancements for XR; Document for: Discussion, Decision.
R1-2208420; 3GPP TSG RAN WG1 Meeting #110bis-e; e-Meeting, Oct. 10-19, 2022; Agenda Item: 9.10.1; Source: Huawei, HiSilicon; Title: Discussion on XR-specific power saving techniques; Document for: Discussion and Decision.
R1-2208660; 3GPP TSG RAN WG1 #110bis-e; e-Meeting, Oct. 10-19, 2022; Source: vivo; Title: Discussion on XR specific power saving enhancements; Agenda Item: 9.10.1; Document for: Discussion and Decision.
R1-2208862; 3GPP TSG RAN WG1 #110bis-e; e-Meeting, Oct. 10-19, 2022; Source: OPPO; Title: Discussion on XR specific power saving techniques; Agenda Item: 9.10.1; Document for: Discussion and Decision.
R1-2209197; 3GPP TSG RAN WG1 #110-bis-e; e-Meeting, Oct. 10-19, 2022; Source: ZTE, Sanechips; Title: Discussion on XR specific power saving techniques; Agenda item: 9.10.1; Document for: Discussion.
R1-2209354; 3GPP TSG RAN WG1 #110bis-e; e-Meeting, Oct. 10-19, 2022; Source: CMCC; Title: Discussion on XR-specific power saving techniques; Agenda item: 9.10.1; Document for: Discussion & Decision.
R1-2209517; 3GPP RAN WG1 Meeting #110bis-e; e-Meeting, Oct. 10-19, 2022; Agenda Item: 9.10.1; Source: MediaTek Inc.; Title: On XR specific power saving techniques; Document for: Discussion and Decision.
R1-2209535; 3GPP TSG RAN WG1 #110bis-e; e-meeting, Oct. 10-19, 2022; Agenda item: 9.10.1; Source: Nokia, Nokia Shanghai Bell; Title: XR-specific power saving enhancements; Document for: Discussion and Decision.
R1-2209597; 3GPP TSG RAN WG1 #110bis-e; e-Meeting, Oct. 10-19, 2022; Agenda Item: 9.10.1; Source: Apple Inc.; Title: XR specific power saving techniques; Document for: Discussion/ Decision.
R1-2209636; 3GPP TSG RAN WG1 #110bis-e; e-Meeting, Oct. 10-19, 2022; Source: Google Inc.; Title: On XR-specific power saving techniques; Document for: Discussion and Decision.
R1-2210002; 3GPP TSG RAN WG1 #110-bis-e; e-Meeting, Oct. 10-19, 2022; Agenda item: 9.10.1; Source: Qualcomm Incorporated; Title: Power Saving Techniques for XR; Document for: Discussion and Decision.
R1-2212608; 3GPP TSG-RAN WG1 Meeting #111; Toulouse, France, Nov. 10-19, 2022; Agenda Item: 9.10.2; Source: Moderator (Ericsson); Title: Moderator Summary#3—Study on XR Specific Capacity Improvements; Document for: Discussion, Decision.
R1-2212700; 3GPP TSG-RAN WG1 #111; Toulouse, France, Nov. 14-18, 2022; Agenda item: 9.10.1; Source: Moderator (Qualcomm Incorporated); Title: Moderator Summary #3 on XR specific power saving techniques; Document for: Discussion and Decision.
R2-2209512; 3GPP TSG-RAN WG2 Meeting #119bis Electronic; Online, Oct. 10-Oct. 19, 2022; Agenda Item: 8.5.3.1; Source: OPPO; Title: Discussion on CDRX enhancement for Power saving; Document for: Discussion and decision.
R2-2209516; 3GPP TSG-RAN WG2 Meeting #119bis-e; Online, Oct. 10-19, 2022; Agenda item: 8.5.3.1; Source: Huawei, HiSilicon; Title: Further discussion on C-DRX enhancements for XR; Document for: Discussion and Decision.
R2-2209649; 3GPP TSG-RAN2#119bis-e; Electronic meeting, Oct. 2022; Source: ZTE Corporation, Sanechips; Title: DRX enhancements for XR ; Agenda item: 8.5.3.1; Document for: Discussion and Decision.
R2-2210061; 3GPP TSG-RAN WG2 Meeting #119-bis Electronic; Oct. 10-Oct. 19, 2022; Agenda item: 8.5.3.1 (DRX enhancements); Source: Samsung; Title: Discussion on power saving scheme for XR; Document for: Discussion & Decision.
R2-2210144; 3GPP TSG-RAN WG2 Meeting #119-bis electronic; Online, 10-19, Oct. 2022; Agenda Item: 8.5.3.1; Source: CMCC; Title: Discussion on DRX enhancements for XR-specific power saving; Document for: Discussion.
R2-2210186; 3GPP TSG-RAN WG2 Meeting #119bis Electronic; Elbonia, Oct. 10-19, 2022; Agenda item: 8.5.3.1; Source: Nokia, Nokia Shanghai Bell; Title: DRX enhancements for XR; WID/SID: FS_NR_XR_enh—Release 18; Document for: Discussion and Decision.
R2-2210189; 3GPP TSG-RAN WG2 #119bis-e; Electronic meeting, Oct. 10-19, 2022; Agenda Item: 8.5.3.1; Source: NEC; Title: Candidate solutions on C-DRX enhancement; Document for: Discussion, Decision.
R2-2210651; 3GPP TSG-RAN WG2 Meeting #119bis-e; Online, Oct. 10-29, 2022; Agenda Item: 8.5.3.1; Source: MediaTek Inc.; Title: C-DRX enhancements for XR; Document for: Discussion and decision.

(56) References Cited

OTHER PUBLICATIONS

R2-2210690; 3GPP TSG-RAN WG2 #119-bis-eTdoc; Electronical meeting, Oct. 10-Oct. 19, 2022; Agenda Item: 8.5.3.1; Source: Ericsson; Title: Discussion on RAN2-specific CDRX aspects; Document for: Discussion, Decision.

R2-2211180; 3GPP TSG-RAN WG2 Meeting #120; Toulouse France, Nov. 14-18, 2022; Agenda item: 8.5.3.1; Source: Qualcomm Incorporated; Title: DRX enhancements for XR; WID/SID: FS_NR_XR_enh; Document for: Discussion and Decision.

R2-2211278; 3GPP TSG-RAN WG2 Meeting #120; Toulouse, France, Nov. 14-18, 2022; Agenda item: 8.5.3.1; Source: Huawei, HiSilicon; Title: Further discussion on C-DRX enhancements for XR; Document for: Discussion and Decision.

R2-2211381; 3GPP TSG RAN WG2 Meeting #120; Toulouse, France, Nov. 14-18, 2022; Agenda item: 8.5.3.1; Source: Intel Corporation; Title: C-DRX enhancements for XR traffic; Document for: Discussion and decision.

R2-2211775; 3GPP TSG-RAN WG2 Meeting #120; Toulouse, France, Nov. 14-18, 2022; Agenda item: 8.5.3.1; Source: Nokia, Nokia Shanghai Bell; Title: DRX enhancements for XR; WID/SID: FS_NR_XR_enh—Release 18; Document for: Discussion and Decision.

R2-2212040; 3GPP TSG-RAN WG2 Meeting #120; Toulouse, France, Nov. 14-18, 2022; Agenda item: 8.5.3.1; Source: Lenovo; Title: Discussion of DRX enhancement; Document for: Discussion and Decision.

R2-2213002; 3GPP TSG-RAN WG2 Meeting #120 Toulouse, France; Online, Nov. 2022; Agenda item: 10.2; Source: Vice Chairman (Nokia); Title: Report on LTE legacy, DCCA, MUSIM, Slicing, 71 GHz, XR and QoE; Document for: Approval.

International Search Report and Written Opinion of the International Searching Authority mailed Jun. 24, 2024, in International Application No. PCT/US2023/085547.

R2-2211494; 3GPP TSG-RAN WG2 Meeting #120; Troulouse, France, Nov. 14-Nov. 18, 2022; Source: vivo; Title: Discussion on DRX Enhancements for XR Power Saving; Agenda Item: 8.5.3.1; Document for: Discussion and Decision.

\* cited by examiner

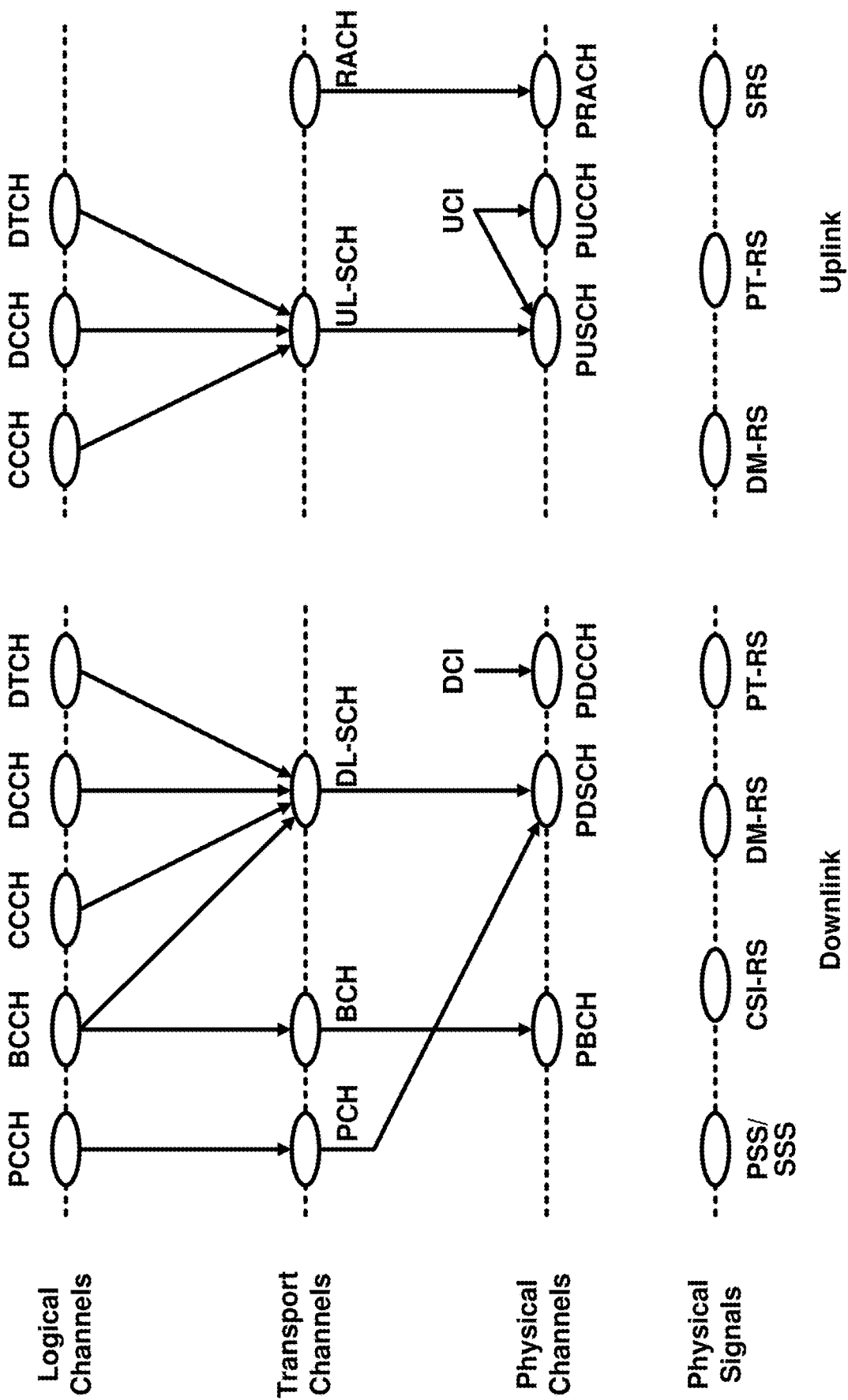
FIG. 5B Uplink
FIG. 5A Downlink

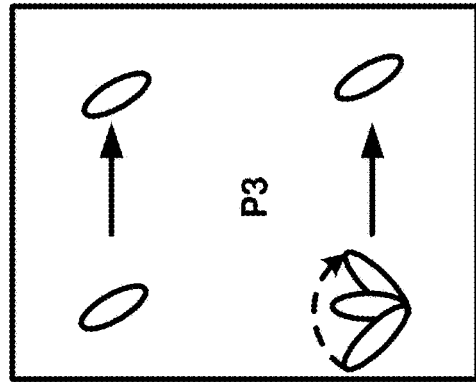
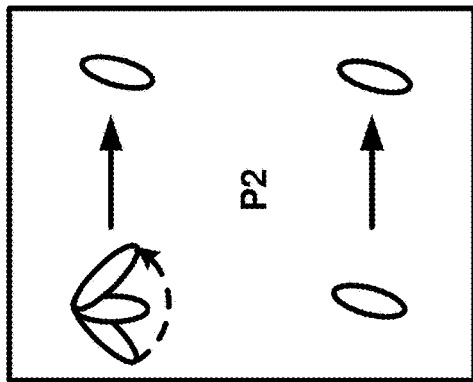
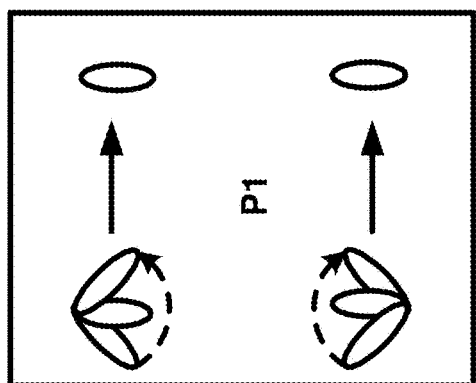
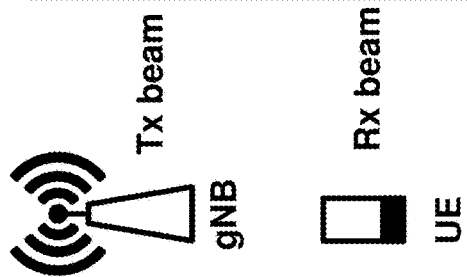
FIG. 12A
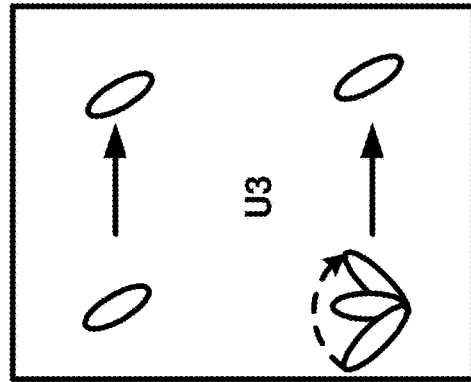
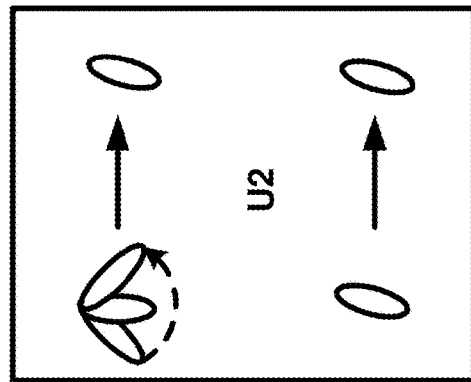
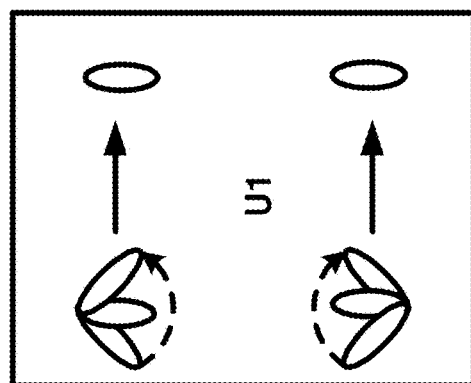
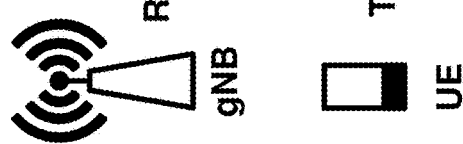
FIG. 12B

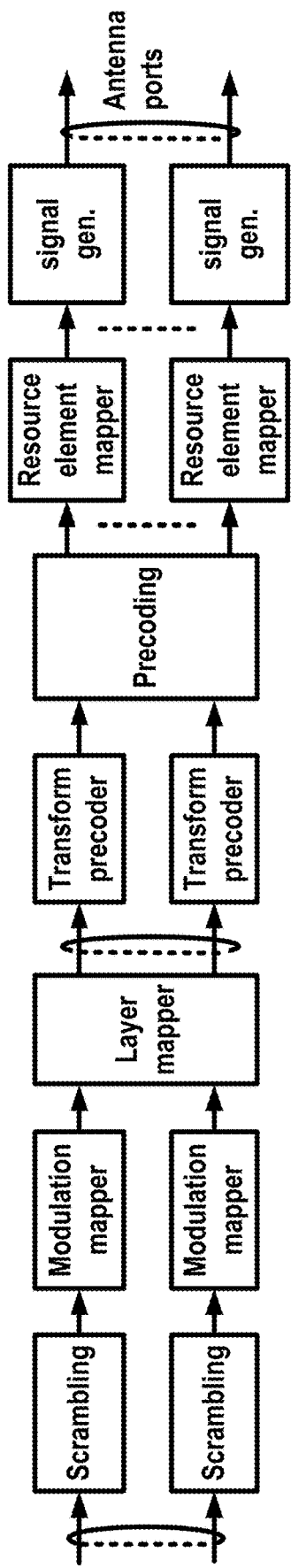
FIG. 16A
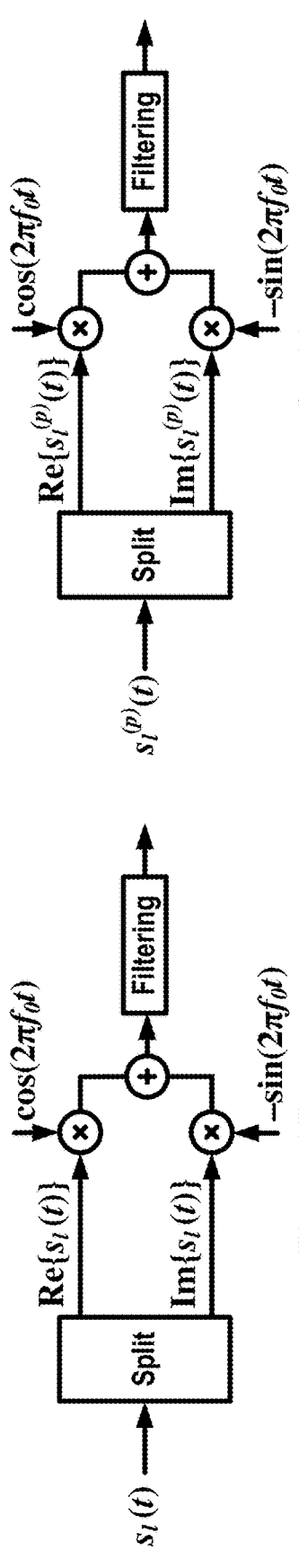
FIG. 16B
FIG. 16D
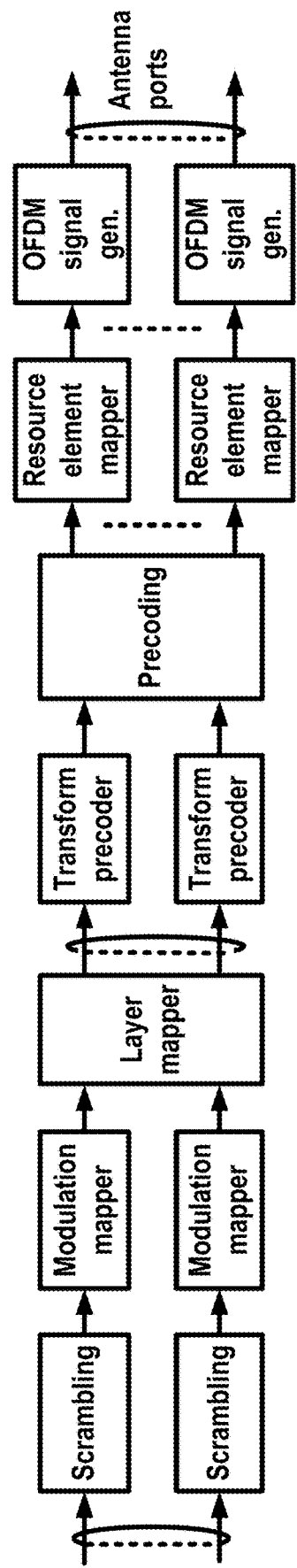
FIG. 16C

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

Receiving one or more configuration parameters comprising one or more DRX configurations (e.g., per a DRX group) and one or more PDCCH configuration parameters comprising at least two SS groups for monitoring PDCCH In response to starting a DRX Active Time (e.g., a DRX onDurationTimer), determining a SS group of the at least two SS groups for monitoring PDCCH during the DRX Active Time based on whether the DRX Active Time being started at a beginning of a DRX cycle or not (e.g., the DRX Active Time is started within the DRX cycle)

FIG. 25A

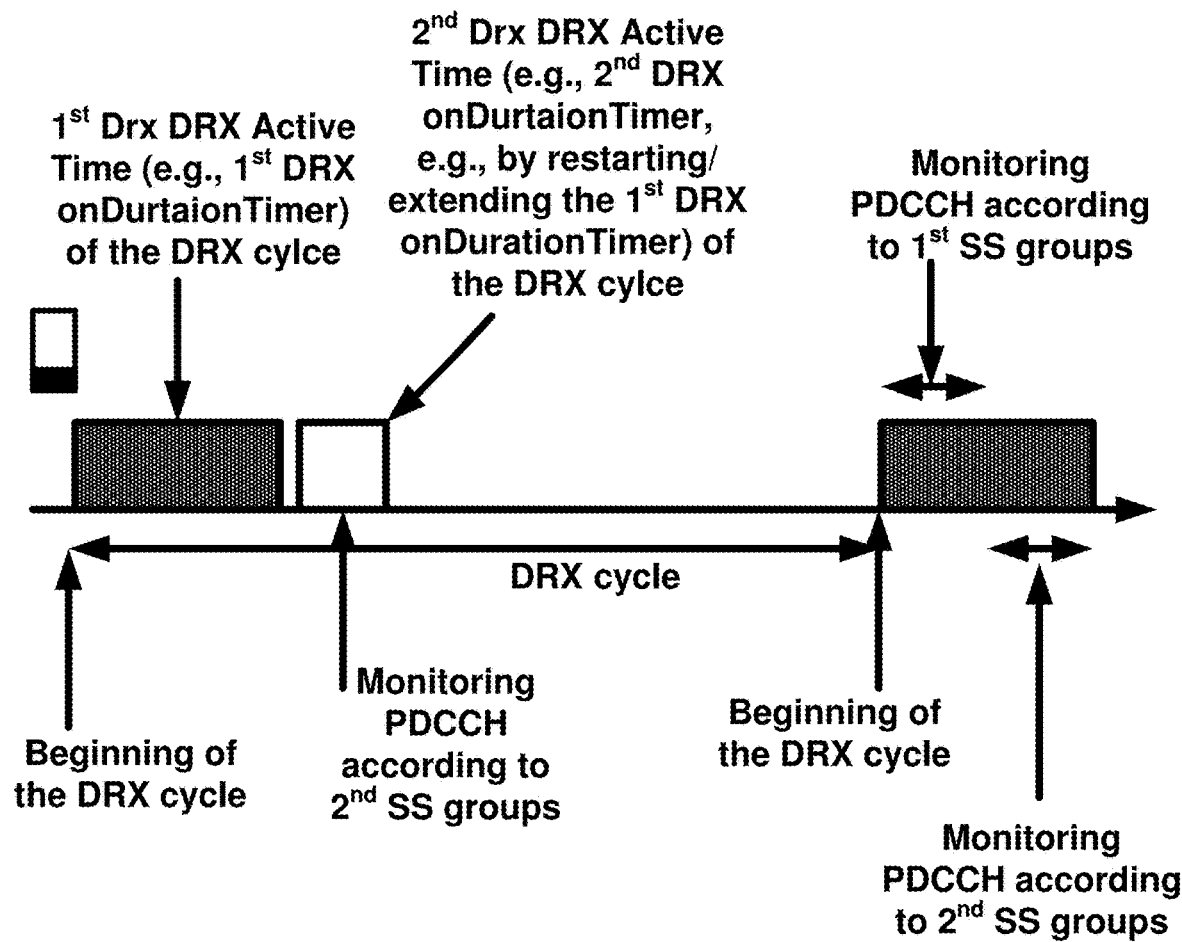

FIG. 25B

Receiving one or more configuration parameters comprising at least two DRX configurations (e.g., per a DRX group) and one or more PDCCH configuration parameters comprising at least two SS groups for monitoring PDCCH Monitoring, during a DRX active time, PDCCH according to at least one SS group of the at least two SS groups based on a DRX configuration (of the at least two DRX configurations) corresponding/associated to the DRX active time

FIG. 26A

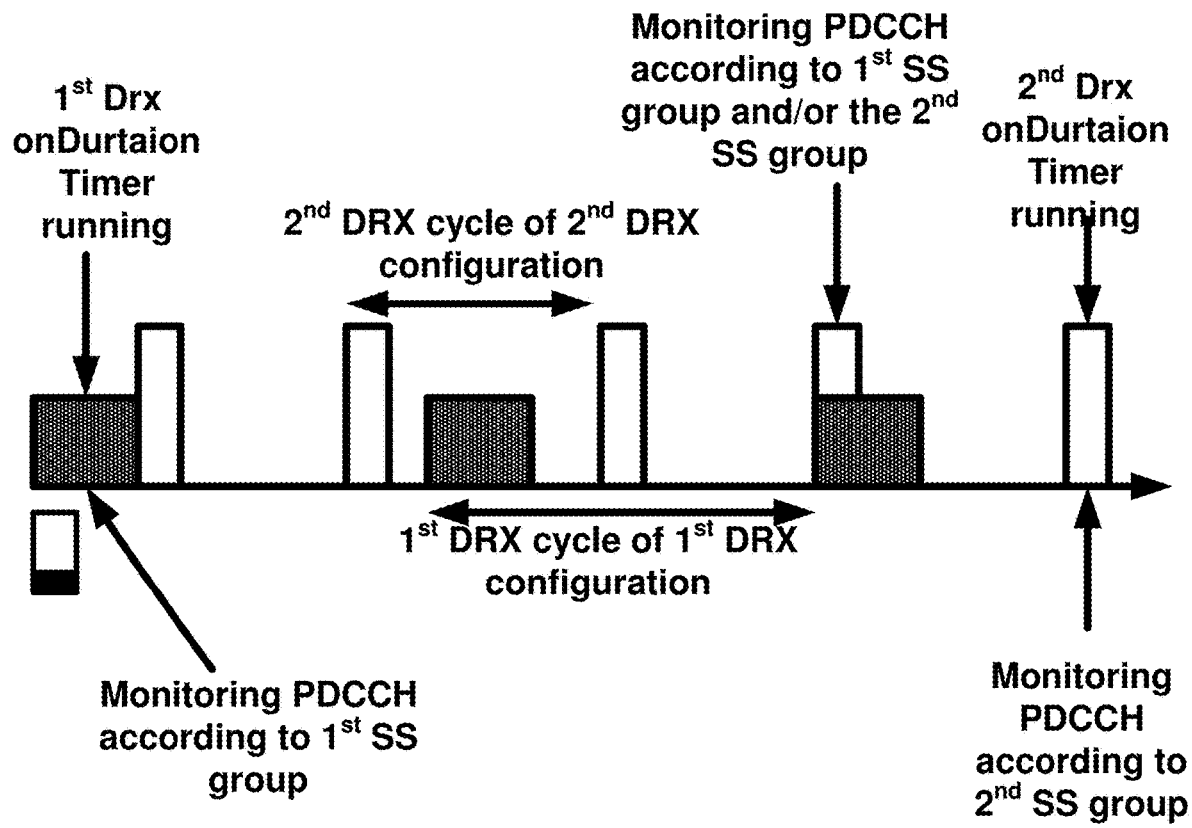

FIG. 26B

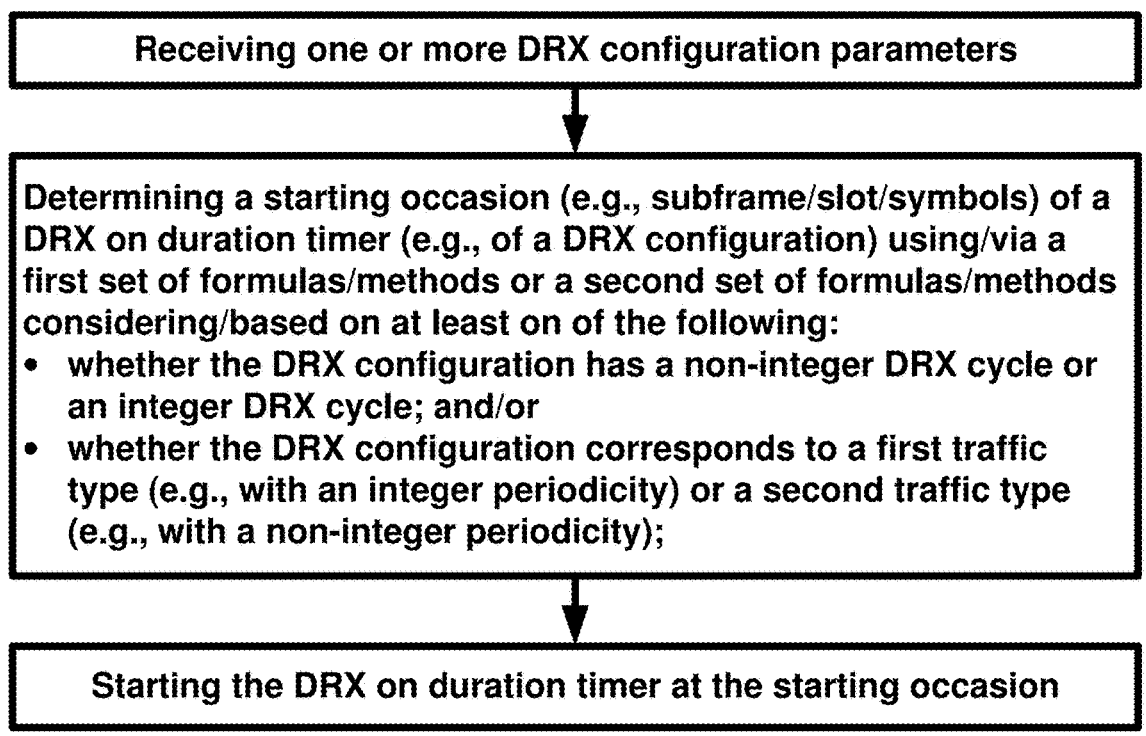
FIG. 28A
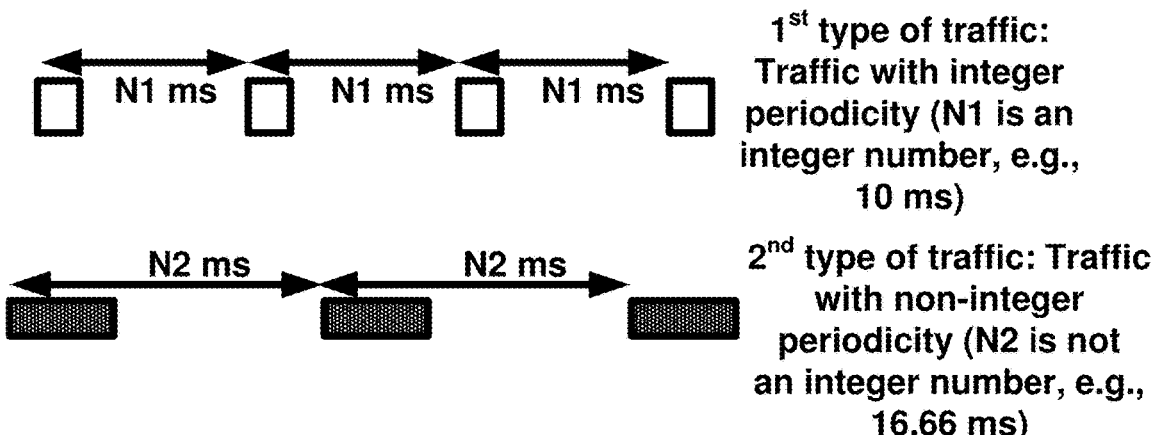
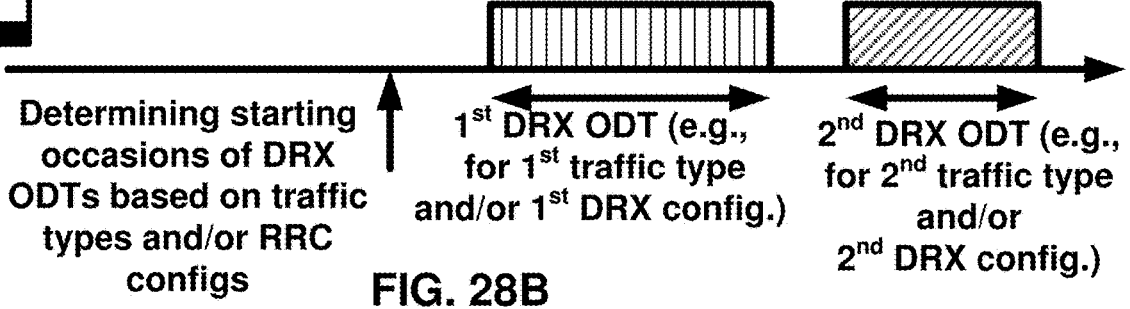
FIG. 28B

METHODS AND APPARATUSES FOR DETERMINING A DISCONTINUOUS RECEPTION (DRX) CYCLE

CROSS-REFERENCE TO RELATED APPLICATIONS

This application is a continuation of International Application No. PCT/US2023/085547, filed Dec. 21, 2023, which claims the benefit of U.S. Provisional Application No. 63/434,749, filed Dec. 22, 2022, all of which are hereby incorporated by reference in their entireties.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 17 shows several DCI formats.

FIG. 25A shows a flowchart of a method for PDCCH monitoring in wireless communication systems.

FIG. 25B shows an example embodiment of a PDCCH monitoring in wireless communication systems per an aspect of the present disclosure.

FIG. 26A shows a flowchart of a method for PDCCH monitoring in wireless communication systems.

FIG. 26B shows an example embodiment of a PDCCH monitoring in wireless communication systems per an aspect of the present disclosure.

FIG. 28A shows a flowchart of a method for DRX operation in wireless communication systems.

FIG. 28B shows an example embodiment of a DRX operation in wireless communication systems per an aspect of the present disclosure.

DETAILED DESCRIPTION

Figure 1A:
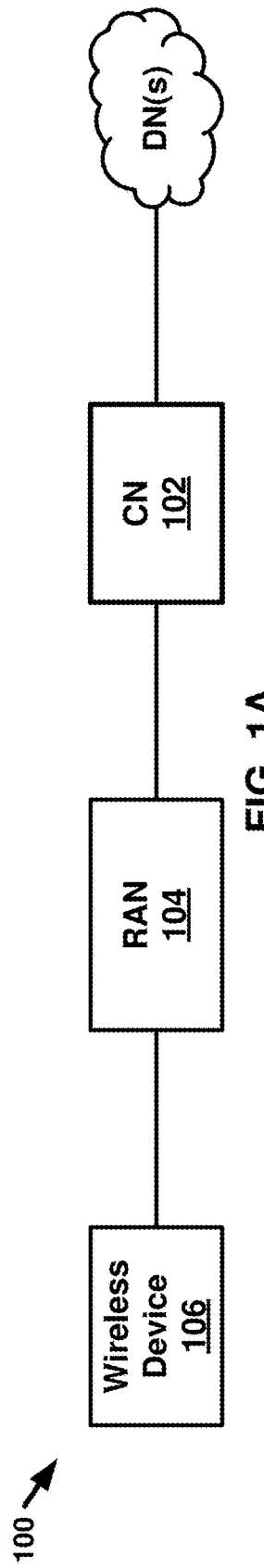
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or non-operational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
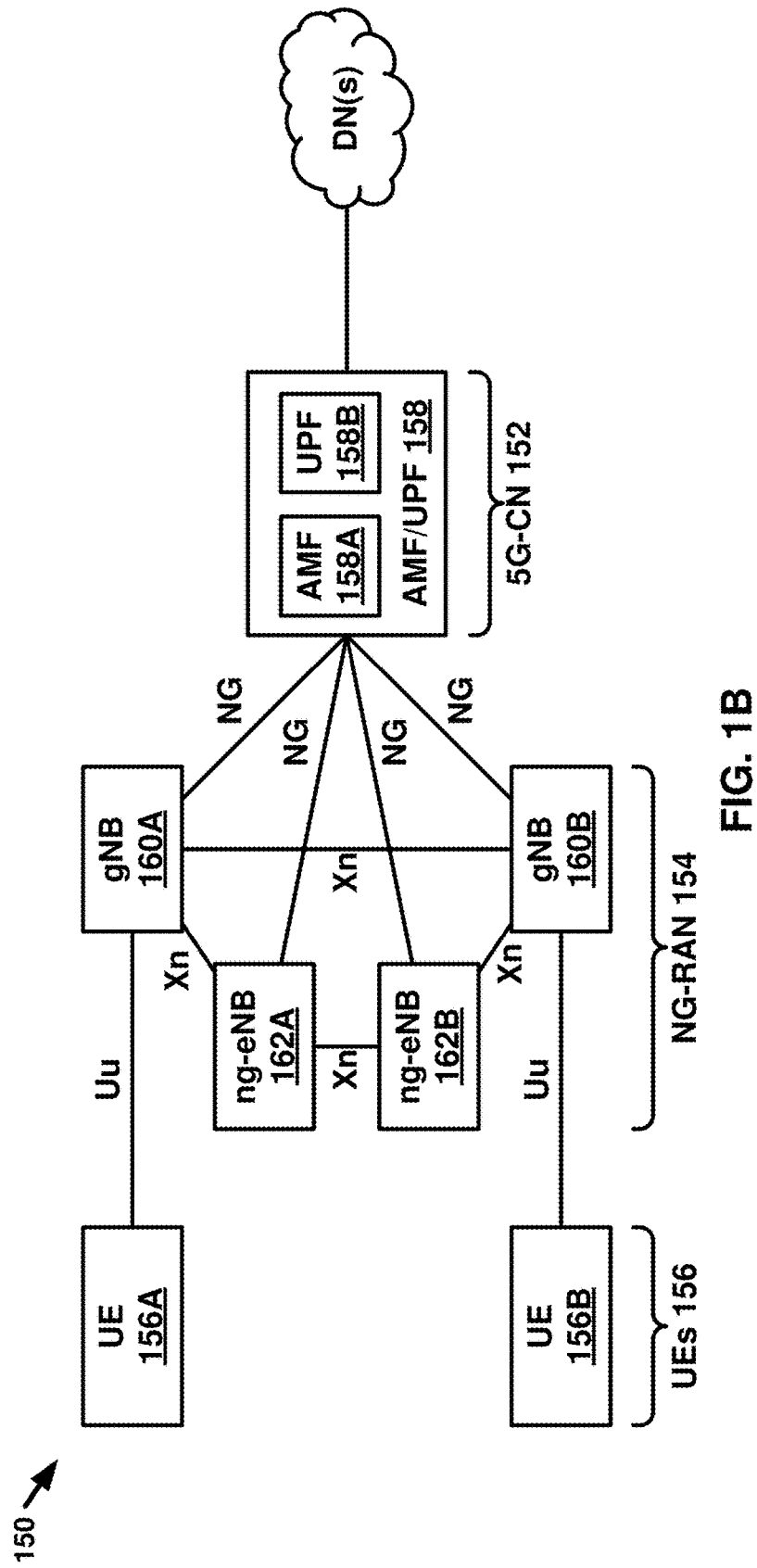

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
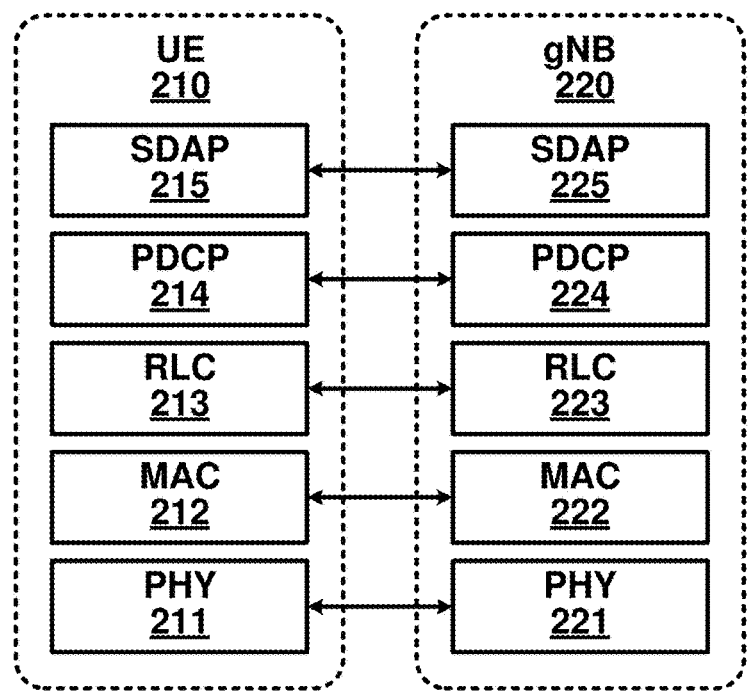
FIG. 2A and FIG. 2B respectively illustrate a New Radio (NR) user plane and control plane protocol stack.
Figure 2B:
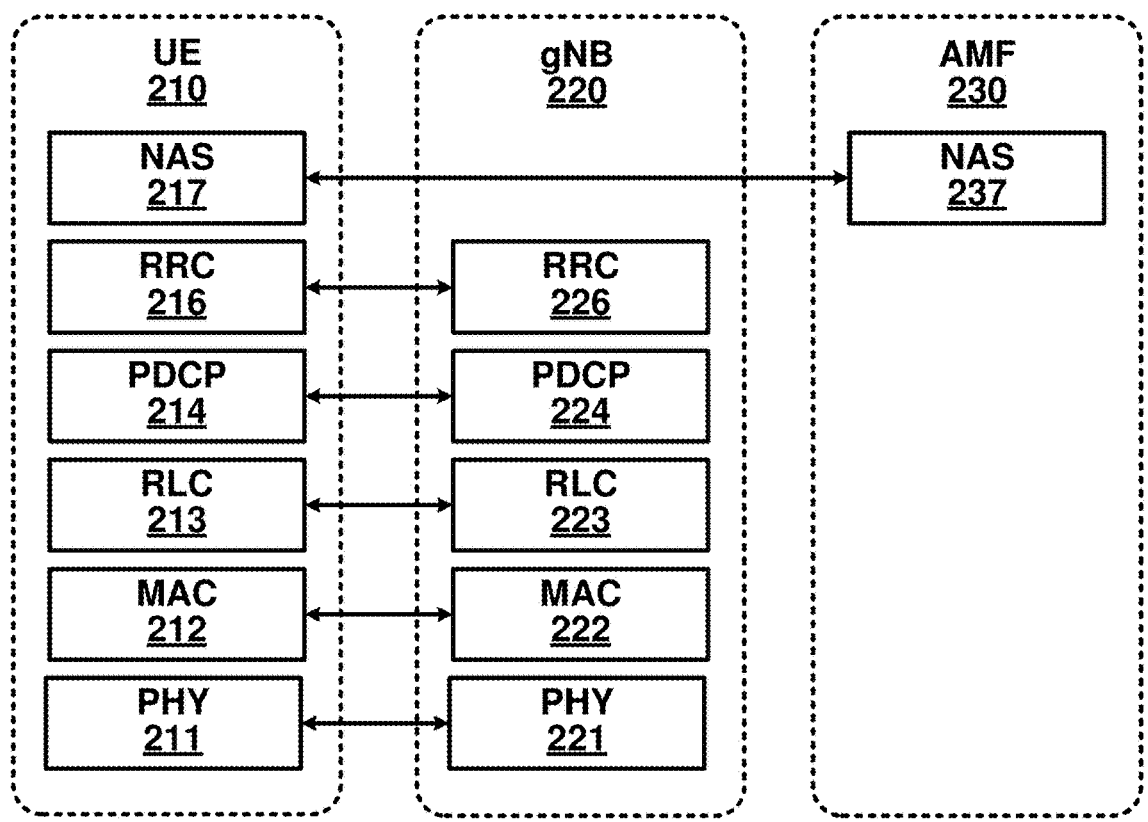

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
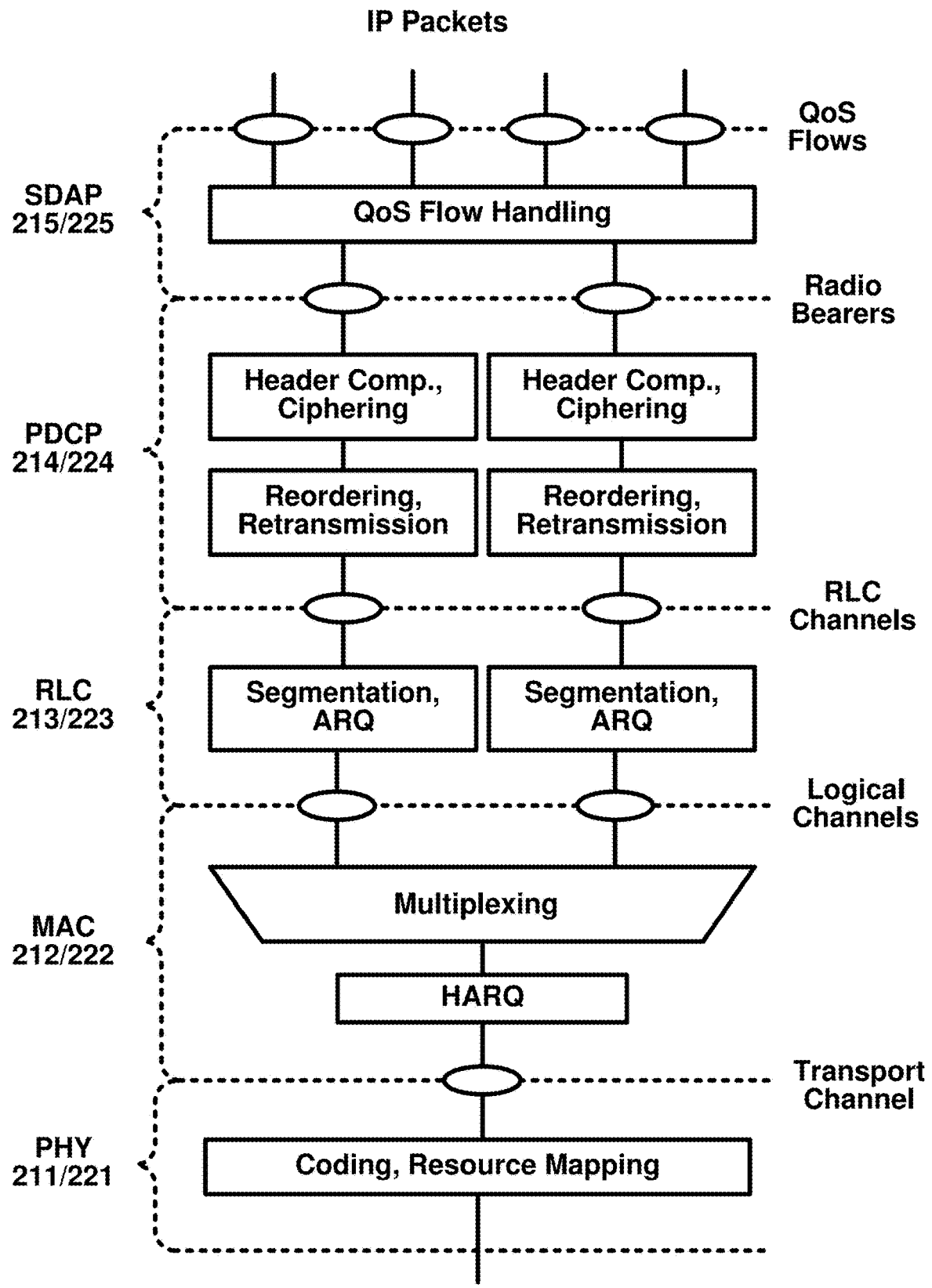
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
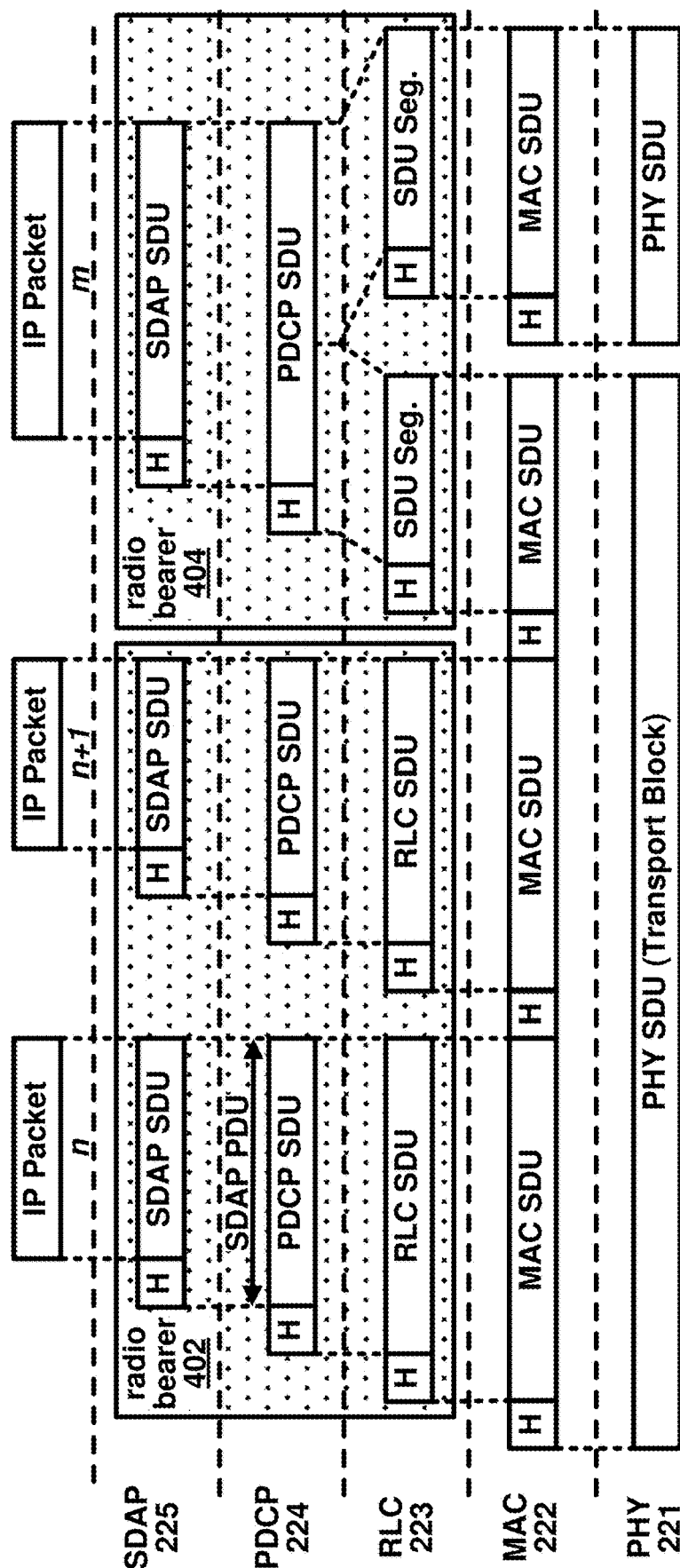
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
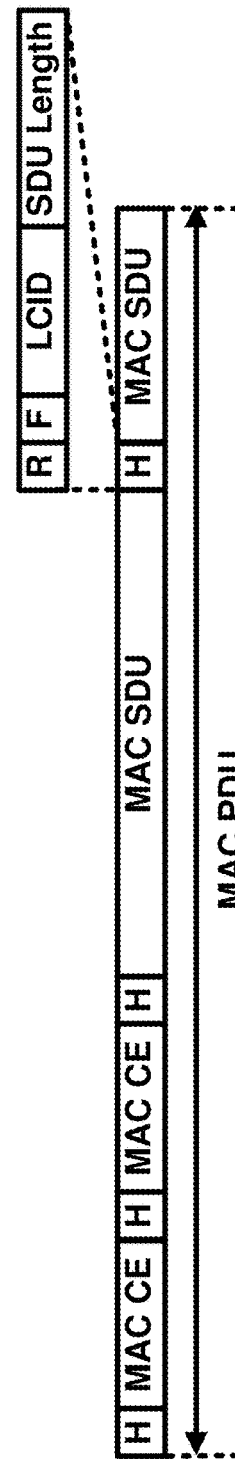
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As defined in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
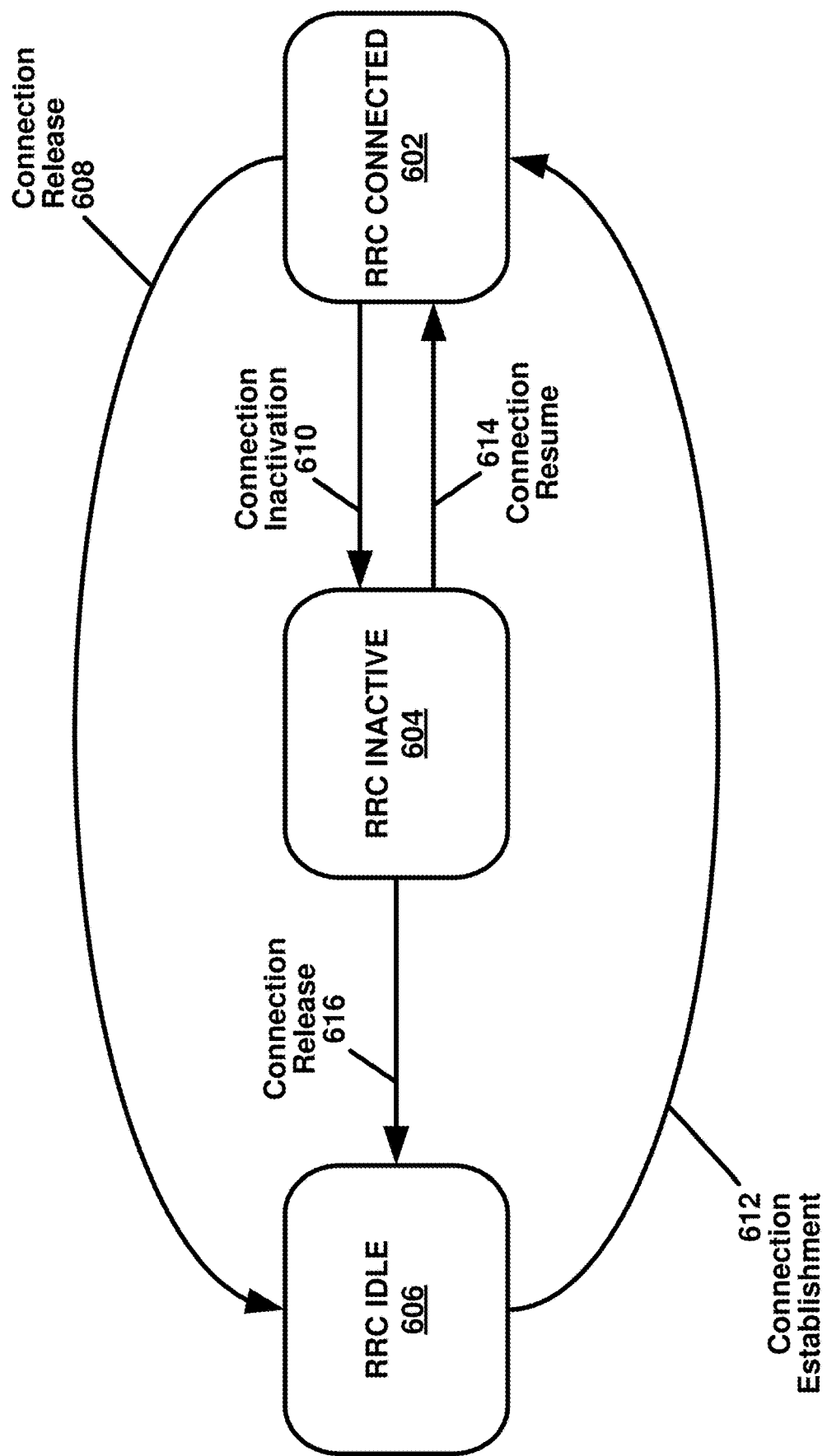
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split into two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
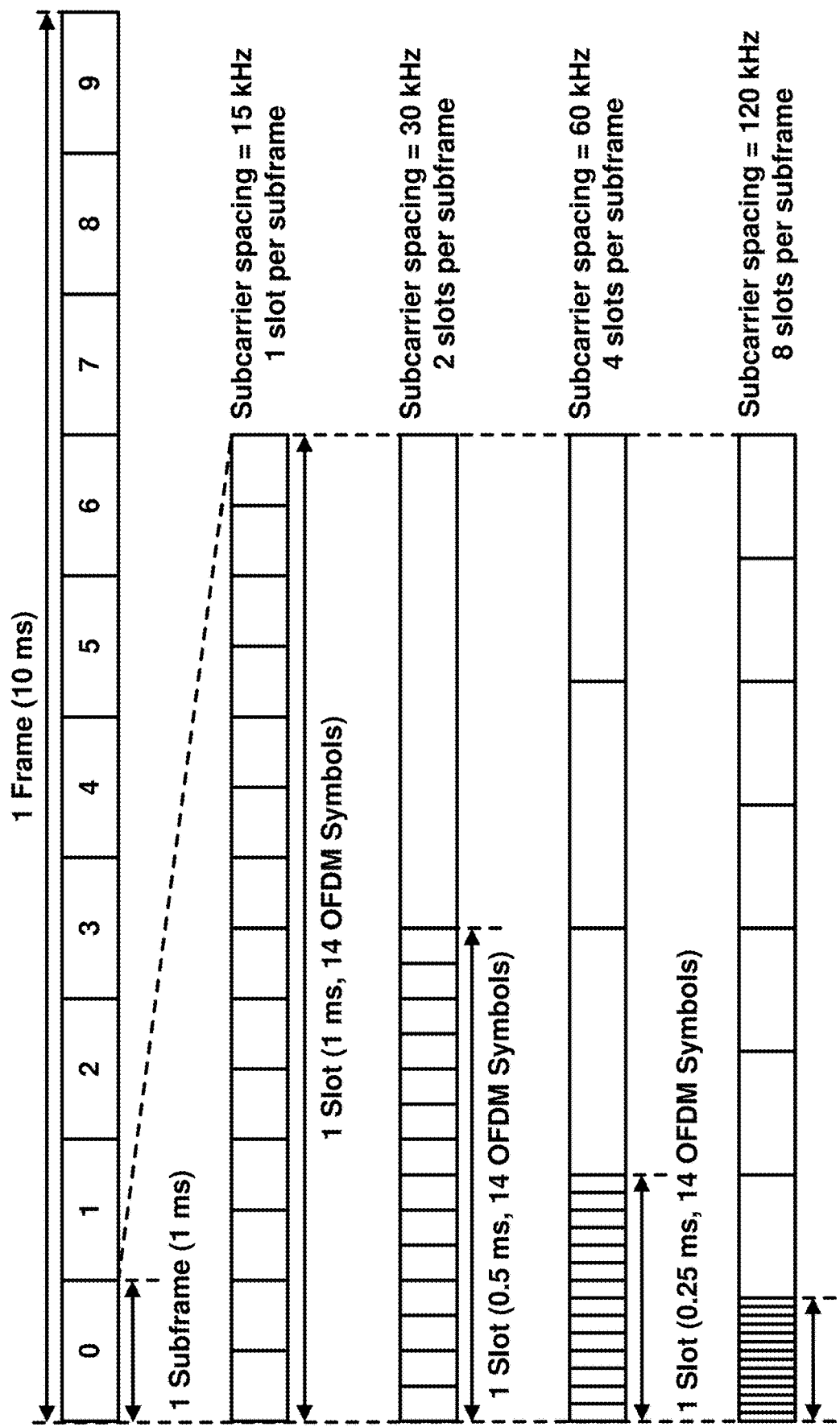
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
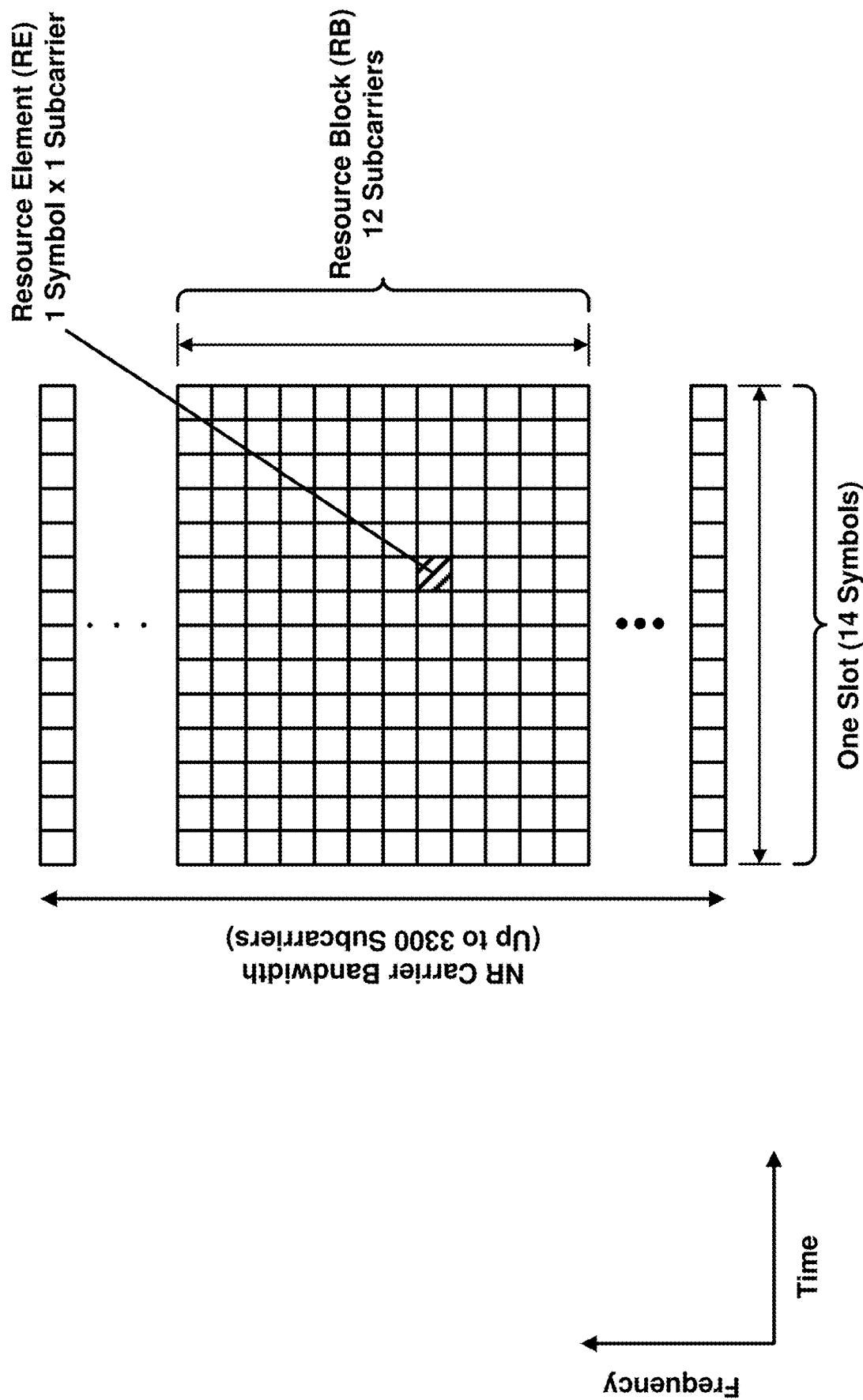
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
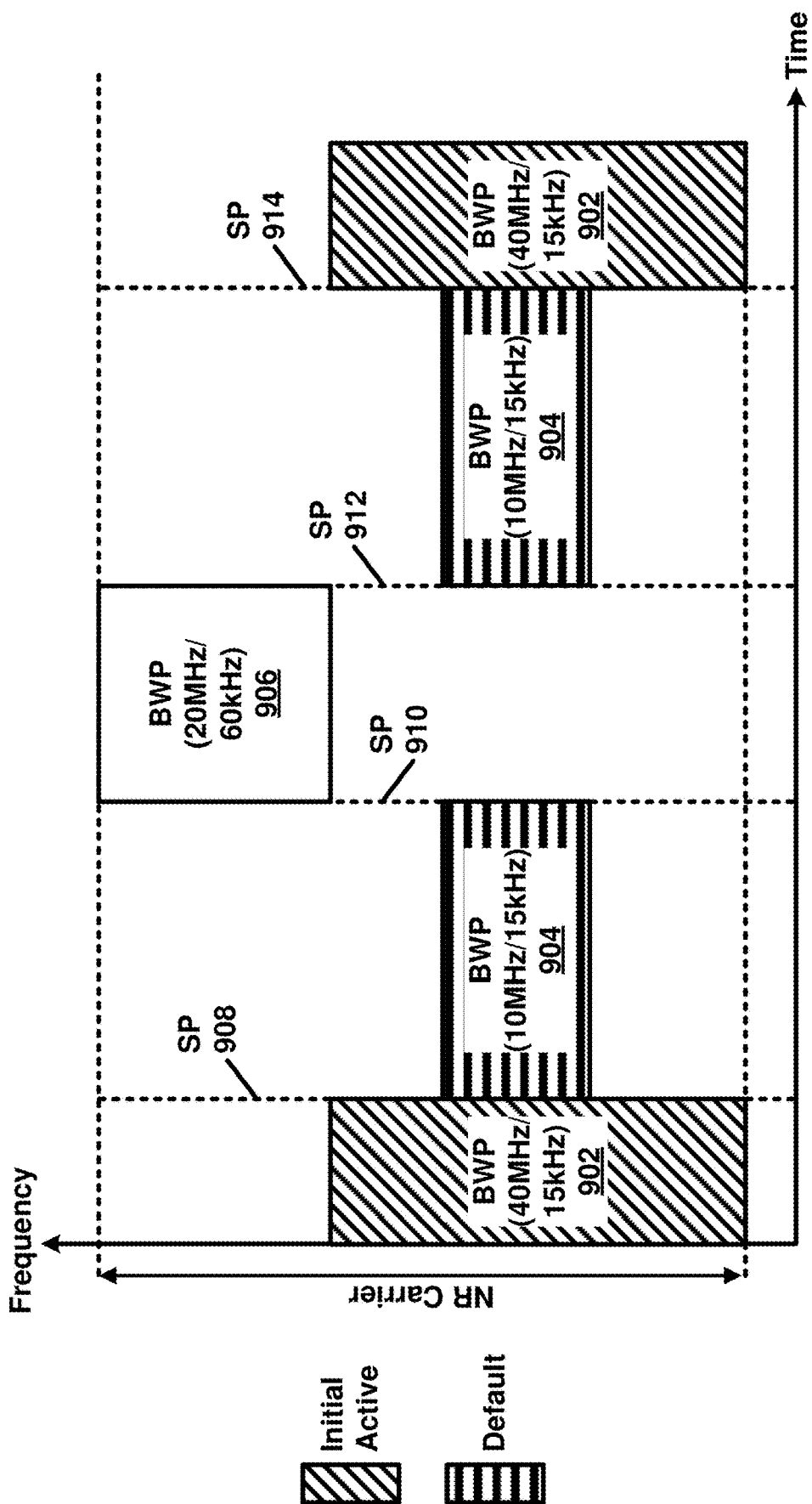
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
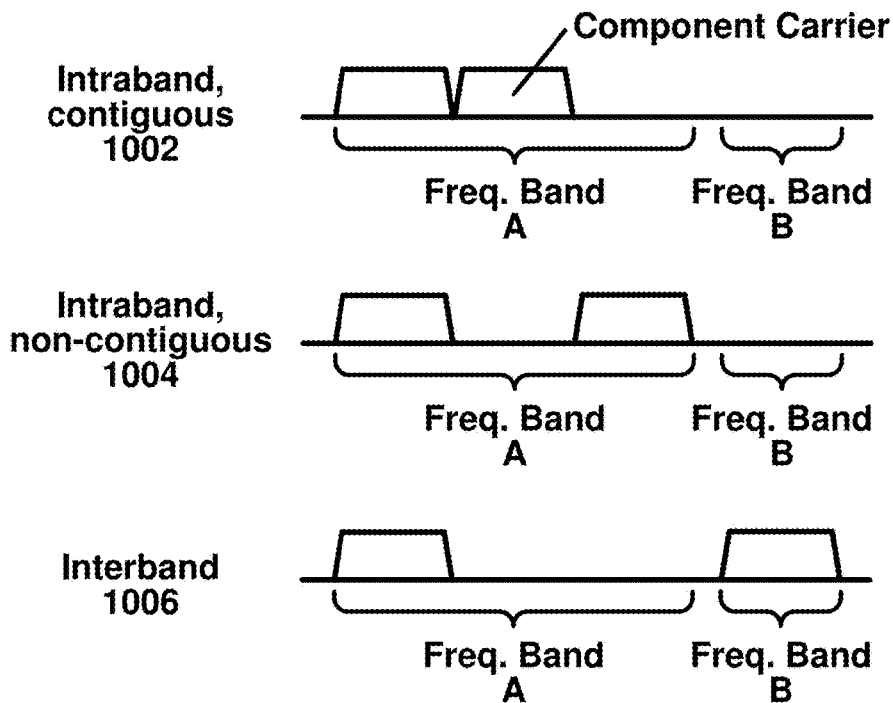
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
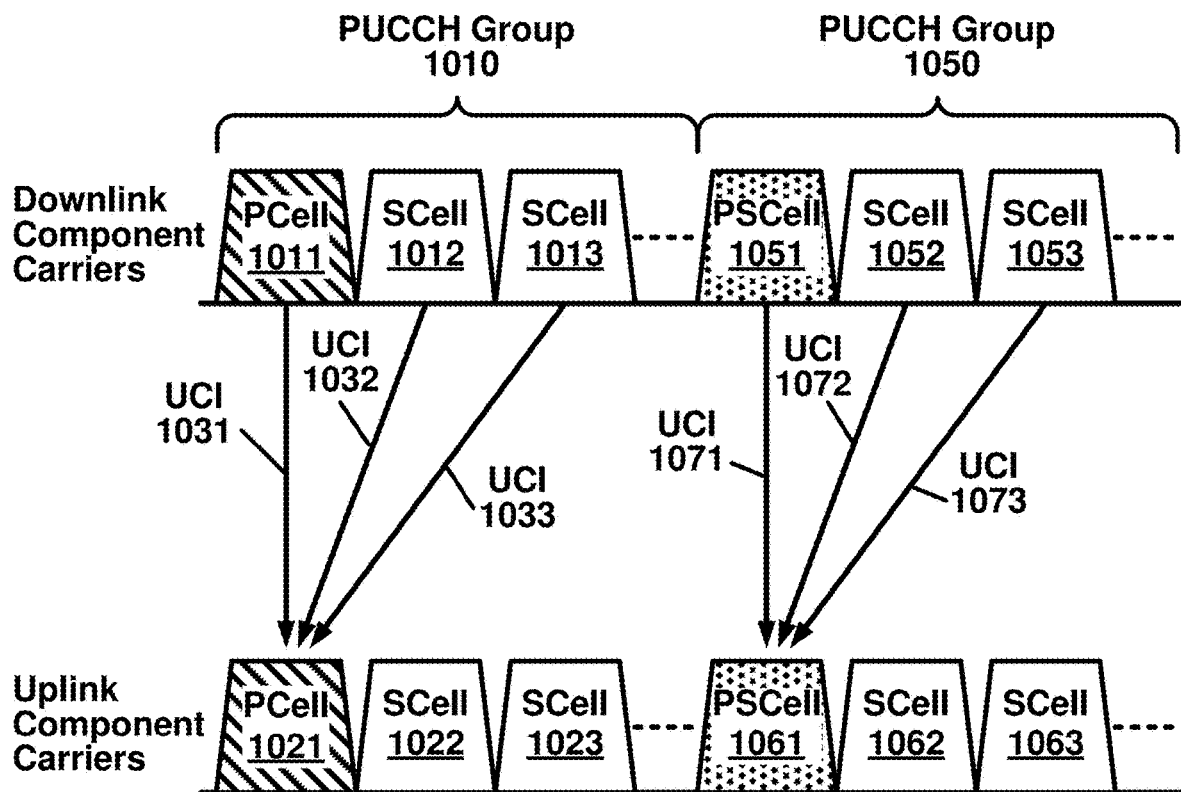
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
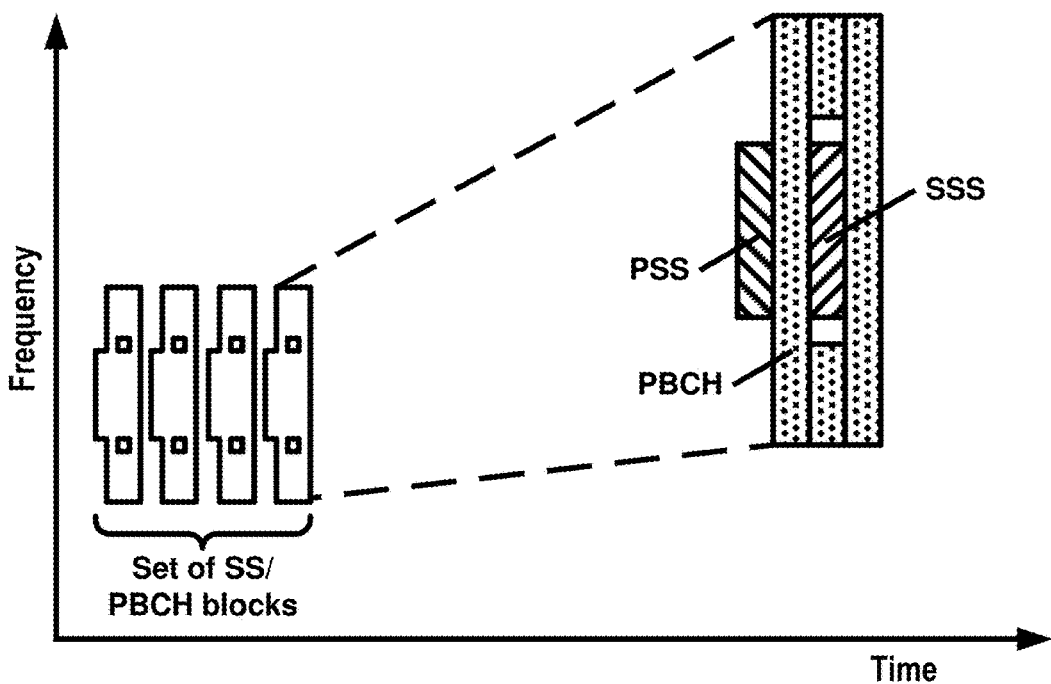
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling);

or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
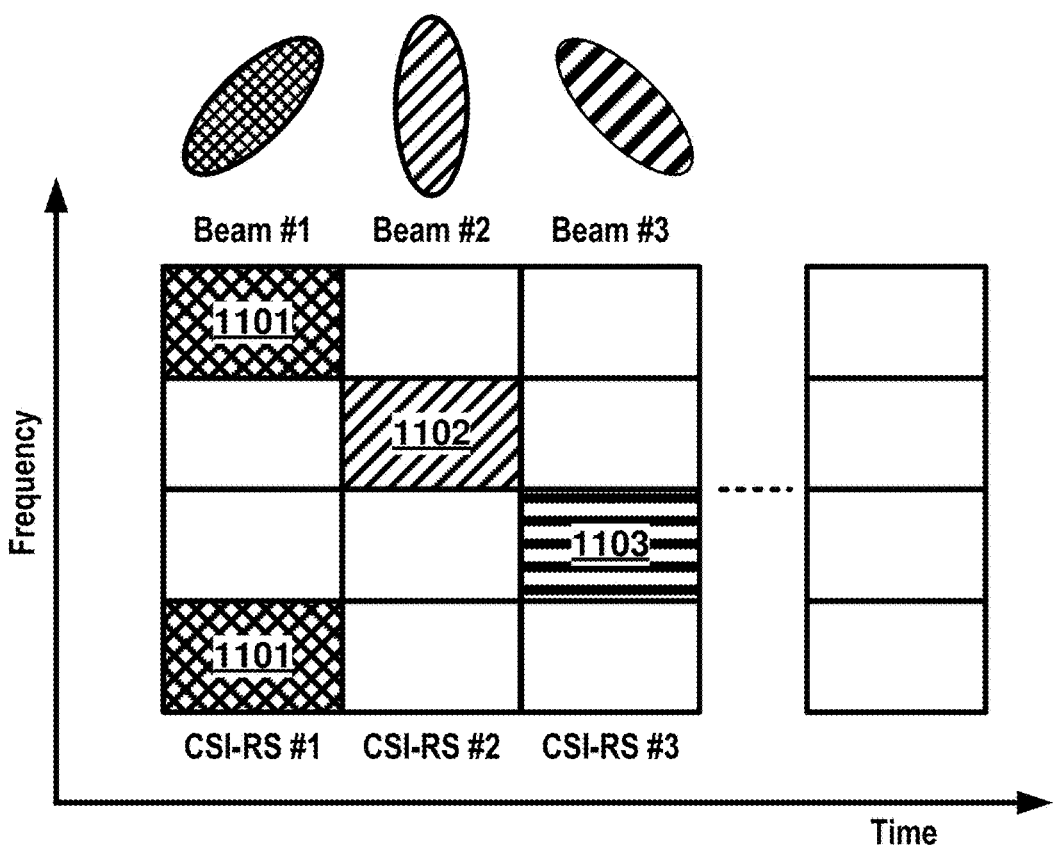
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
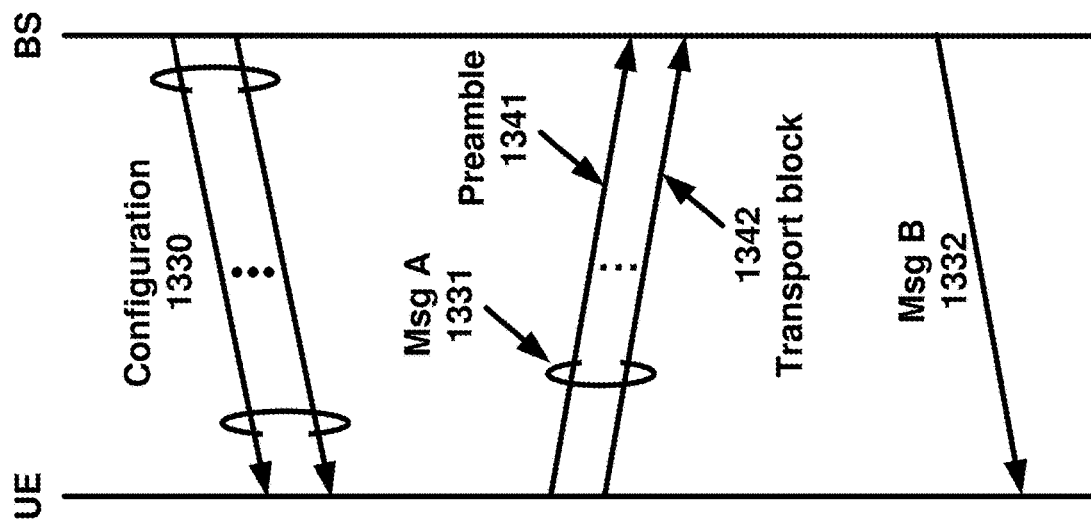
FIG. 13A, FIG. 13B, and FIG. 13C respectively illustrate a four-step contention-based random access procedure, a two-step contention-free random access procedure, and another two-step random access procedure.
Figure 13B:
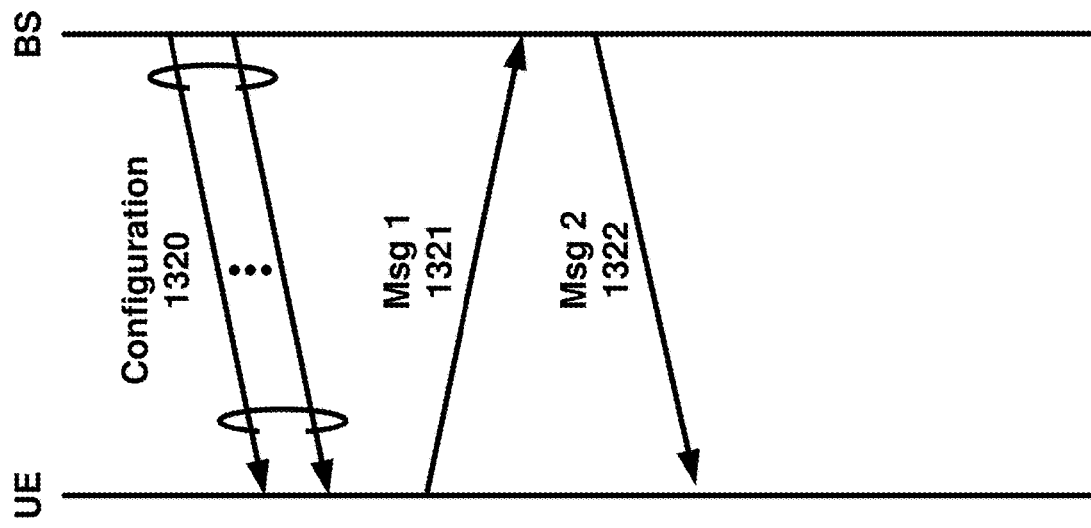
Figure 13A:
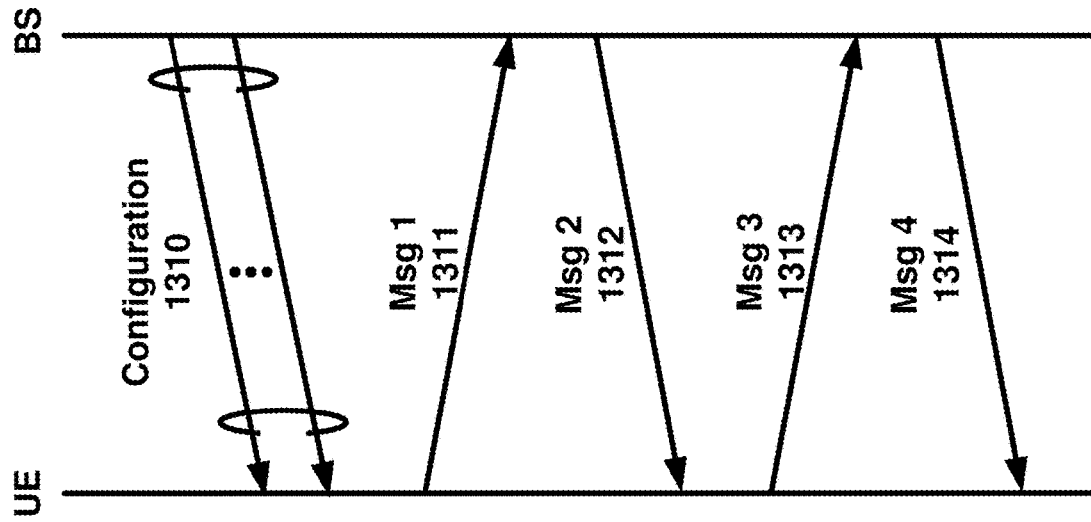

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-Configindex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows: RA-RNTI=$1+s\_id+14\times t\_id+14\times 80\times f\_id+14\times 80\times 8\times ul\_carrier\_id$, where s_id may be an index of a first OFDM symbol of the PRACH occasion (e.g., $0\le s\_id<14$), t_id may be an index of a first slot of the PRACH occasion in a system frame (e.g., $0\le t\_id<80$), f_id may be an index of the PRACH occasion in the frequency domain (e.g., $0\le f\_id<8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
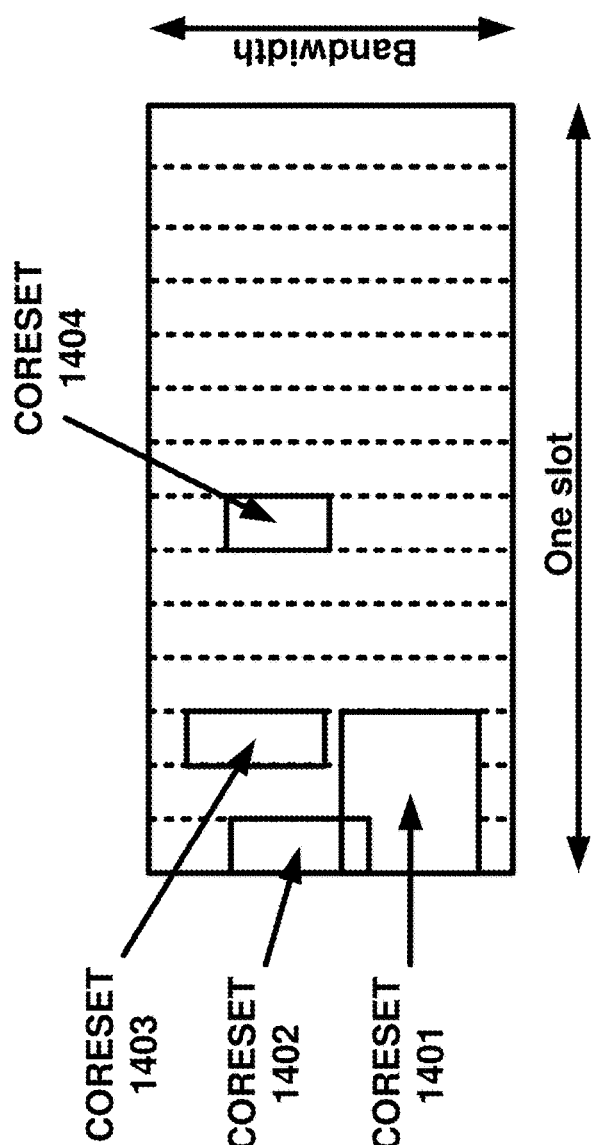
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
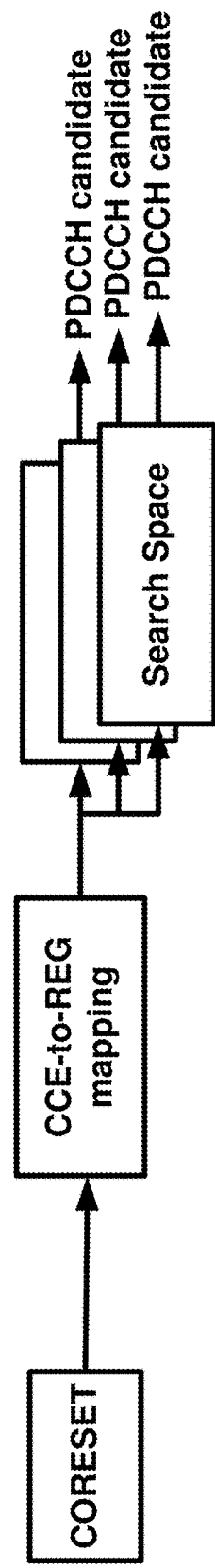
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set.

A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE m ay monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
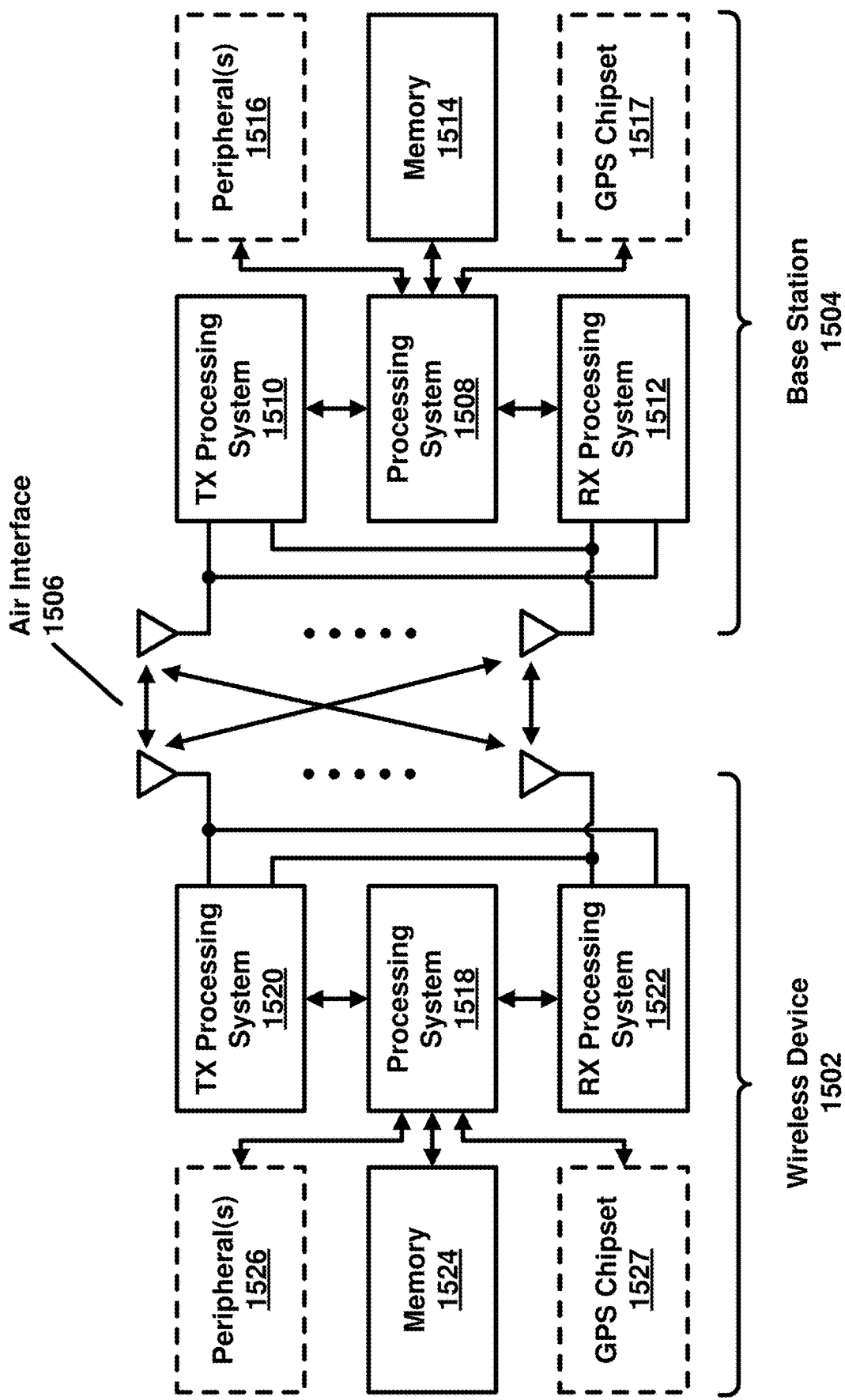
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP- OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

In an example, a MAC entity of the base station may transmit one or more MAC CEs (e.g., MAC CE commands) to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of the base station to a MAC entity of the wireless device, may have an LCID in the MAC subheader corresponding to the MAC CE. In an example, a first MAC CE may have a first LCID in the MAC subheader that may be different than the second LCID in the MAC subheader of a second MAC CE. For example, an LCID given by 111011 in a MAC subheader may indicate that the MAC CE associated with the MAC subheader is a Long DRX command MAC CE.

In an example, the MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a Short truncated BSR, and/or a Long truncated BSR. In an example, a MAC CE may have an LCID in the MAC subheader corresponding to the MAC CE. In an example, a first MAC CE may have a first LCID in the MAC subheader that may be different than the second LCID in the MAC subheader of a second MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. The wireless device may, using the technique of CA, simultaneously receive or transmit on one or more CCs, depending on capabilities of the wireless device. In an example, the wireless device may support CA for contiguous CCs and/or for non-contiguous CCs. CCs may be organized into cells. For example, CCs may be organized into one primary cell (PCell) and one or more secondary cells (SCells).

When configured with CA, the wireless device may have one RRC connection with a network. During an RRC connection establishment/re-establishment/handover, a cell providing NAS mobility information may be a serving cell. During an RRC connection re-establishment/handover procedure, a cell providing a security input may be the serving cell. In an example, the serving cell may be a PCell.

In an example, the base station may transmit, to the wireless device, one or more messages. The one or more messages may comprise one or more RRC messages. For example, the one or more RRC messages may comprise one or more configuration parameters (e.g., one or more RRC configuration parameters).

In an example, the one or more RRC configuration parameters may comprise configuration parameters of a plurality of one or more SCells, depending on capabilities of the wireless device. When configured with CA, the base station and/or the wireless device may employ an activation/deactivation mechanism of an SCell to improve battery or power consumption of the wireless device. When the wireless device is configured with one or more SCells, the base station may activate or deactivate at least one of the one or more SCells. Upon configuration of an SCell, the SCell may be deactivated unless the SCell state associated with the SCell is set to "activated" or "dormant." The wireless device may activate/deactivate the SCell in response to receiving an SCell Activation/Deactivation MAC CE.

For example, the base station may configure (e.g., via the one or more RRC messages/configuration parameters) the wireless device with uplink (UL) bandwidth parts (BWPs) and downlink (DL) BWPs to enable bandwidth adaptation (BA) on a PCell. If carrier aggregation (CA) is configured, the base station may further configure the wireless device with at least one DL BWP (i.e., there may be no UL BWP in the UL) to enable BA on an SCell. For the PCell, an initial active BWP may be a first BWP used for initial access. In paired spectrum (e.g., FDD), the base station and/or the wireless device may independently switch a DL BWP and an UL BWP. In unpaired spectrum (e.g., TDD), the base station and/or the wireless device may simultaneously switch the DL BWP and the UL BWP.

In an example, the base station and/or the wireless device may switch a BWP between configured BWPs by means of a DCI or a BWP invalidity timer. When the BWP invalidity timer is configured for the serving cell, the base station and/or the wireless device may switch the active BWP to a default BWP in response to the expiry of the BWP invalidity timer associated with the serving cell. The default BWP may be configured by the network. In an example, for FDD systems, when configured with BA, one UL BWP for each uplink carrier and one DL BWP may be active at a time in the active serving cell. In an example, for TDD systems, one DL/UL BWP pair may be active at a time in the active serving cell. Operating on one UL BWP and one DL BWP (or one DL/UL pair) may improve the wireless device battery consumption. One or more BWPs other than the active UL BWP and the active DL BWP, which the wireless device may work on, may be deactivated. On the deactivated one or more BWPs, the wireless device may: not monitor PDCCH; and/or not transmit on PUCCH, PRACH, and UL-SCH. In an example, the MAC entity of the wireless device may apply normal operations on the active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any. In an example, on the inactive BWP for each activated serving cell configured with a BWP, the MAC entity of the wireless device may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, a DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. In an example, the PDCCH may not carry the DCI.

In an example, a set of PDCCH candidates for the wireless device to monitor is defined in terms of one or more search space sets. A search space set may comprise a common search space (CSS) set, or a UE-specific search space (USS) set. The wireless device may monitor one or more PDCCH candidates in one or more of the following search space sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by the SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by a INT-RNTI, a SFI-RNTI, a TPC-PUSCH-RNTI, a TPC-PUCCH-RNTI, a TPC-SRS-RNTI, a CI-RNTI, or a power saving RNTI (PS-RNTI) and, only for the primary cell, a C-RNTI, a MCS-C-RNTI, or a CS-RNTI(s), and the USS set configured by SearchSpace in PDCCH-Config with searchSpaceType=ue-Specific for DCI formats with CRC scrambled by the C-RNTI, the MCS-C-RNTI, a SP-CSI-RNTI, the CS-RNTI(s), a SL-RNTI, a SL-CS-RNTI, or a SL-L-CS-RNTI.

In an example, the wireless device may monitor PDCCH (e.g., monitor the one or more PDCCH candidates) according to one or more configuration parameters of the search space set. For example, the search space set may comprise a plurality of search spaces (SSs). The wireless device may monitor the one or more PDCCH candidates in one or more CORESETs for detecting one or more DCIs. Monitoring the one or more PDCCH candidates may comprise decoding at least one PDCCH candidate of the one or more PDCCH candidates according to the monitored DCI formats. For example, monitoring the one or more PDCCH candidates may comprise decoding (e.g., blind decoding) a DCI content of the at least one PDCCH candidate via possible (or configured) PDCCH location(s), possible (or configured) PDCCH format(s), e.g., number of CCEs, number of PDCCH candidates in CSS set(s), and/or number of PDCCH candidates in the USS(s), and/or possible (or configured) DCI format(s).

In an example, the wireless device may receive the C-RNTI (e.g., via one or more previous transmissions) from the base station. For example, the one or more previous transmissions may comprise a Msg2 1312, Msg4 1314, or a MsgB 1332. If the wireless device is not provided the Type3-PDCCH CSS set or the USS set and if provided the Type1-PDCCH CSS set, the wireless device may monitor the one or more PDCCH candidates for DCI format 0_0 and DCI format 1_0 with CRC scrambled by the C-RNTI in the Type1-PDCCH CSS set.

For example, the one or more search space sets may correspond to one or more of searchSpaceZero, searchSpaceSIB1, searchSpaceOtherSystemInformation, paging-SearchSpace, ra-SearchSpace, and the C-RNTI, the MCS-C-RNTI, or the CS-RNTI. The wireless device may monitor the one or more PDCCH candidates for the DCI format 0_0 and the DCI format 1_0 with CRC scrambled by the C-RNTI, the MCS-C-RNTI, or the CS-RNTI in the one or more search space sets in a slot where the wireless device monitors the one or more PDCCH candidates for at least the DCI format 0_0 or the DCI format 1_0 with CRC scrambled by the SI-RNTI, the RA-RNTI, the MSGB-RNTI, or the P-RNTI.

FIG. 17 shows several DCI formats. For example, the base station may use the DCI formats to transmit downlink control information to the wireless device. In an example, the wireless device may use the DCI formats for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH in one cell. In an example, DCI format 0_1 may be used to schedule one or multiple PUSCH in one cell or indicate CG-DFI (configured grant-Downlink Feedback Information) for configured grant PUSCH, etc.

For example, the one or more configuration parameters may comprise one or more PDCCH configuration parameters (e.g., a pdcch-Config IE). The one or more PDCCH configuration parameters may comprise parameters of one or more control resource sets (CORESETs) which can be used in common search spaces and/or UE-specific search spaces, e.g., for the downlink BWP of the serving cell (or serving cells). The one or more PDCCH configuration parameters may indicate a plurality of search spaces for the DL BWP, each search space being associated with a search space ID.

A CORESET of the one or more control resource sets may be associated with a CORESET index (e.g., ControlResourceSetId). The CORESET index with a value of 0 may identify a common CORESET configured in MIB and in ServingCellConfigCommon (controlResourceSetZero) and may not be used in the ControlResourceSet IE. The CORESET index with other values may identify CORESETs configured by dedicated signaling or in SIB1. The controlResourceSetId is unique among the BWPs of the serving cell. A CORESET of the one or more control resource sets may be associated with coresetPoolIndex indicating an index of a CORESET pool for the CORESET. A CORESET of the one or more control resource sets may be associated with a time duration parameter (e.g., duration) indicating contiguous time duration of the CORESET in number of symbols.

In an example, the one or more PDCCH configuration parameters may comprise parameters for one or more search space (SS) configuration parameters. The one or more SS configuration parameters may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of PDCCH candidates (e.g., for an aggregation level, e.g., nrofCandidates), a PDCCH pattern (e.g., monitoringSlotsWithinSlotGroup) indicating a bitmap that applies per group of slots and provides a PDCCH monitoring pattern indicating slots in a group of slots for PDCCH monitoring, and/or a SS type indicating a common SS type or a UE-specific SS type (searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

The one or more PDCCH configuration parameters (and/or the one or more SS configuration parameters) may comprise one or more search space set (SSS) switching configuration parameters. For example, the one or more SSS switching configuration parameters may comprise/indicate at least one of the following: one or more cell groups for search space switching (e.g., via cellGroupsForSwitchList IE and/or searchSpaceSwitchConfig-r16/17 IE), a timer value (e.g., an integer in units of symbol/slot/subframes, or in units of ms) for a search space (SS) switch timer (e.g., searchSpaceSwitchTimer IE), one or more group indexes (e.g., a search space group list, e.g., searchSpaceGroupIdList), and/or a search space (SS) switching delay (e.g., searchSpaceSwitchDelay). The search space switch timer and the time value may be used for a search space switching operation. A group index of the one or more group indexes may correspond to a Type3-PDCCH CSS set or USS set, e.g., for PDCCH monitoring on a serving cell and/or a DL BWP with accordance to one or more SSSs (e.g., a Type3-PDCCH CSS set, a USS set, or any other type of search space set) with the group index. For example, the SS switching delay (in a number of symbols) indicate SS switching delay $P_{switch}$ based on UE processing capability (e.g., UE processing capability 1, UE processing capability 2, etc.) and SCS configuration p. In an example, $P_{switch}$=25 for UE capability 1 and p=0, $P_{switch}$=25 for UE capability 1 and p=1, $P_{switch}$=25 for UE capability 1 and p=2, $P_{switch}$=10 for UE capability 2 and p=0, $P_{switch}$=12 for UE capability 2 and p=1, and $P_{switch}$=22 for UE capability 2 and p=2, etc.

In an example, when the one or more group indexes is not indicated/configured (e.g., a searchSpaceGroupIdList is not provided for a search space set), the wireless device may monitor the PDCCH (or the search space set) on a DL BWP and/or a serving cell (of cellGroupsForSwitchList), without switching away from the search space set.

In an example, when searchSpaceGroupIdList is configured/indicated, the wireless device may reset PDCCH monitoring according to search space sets with the group index 0, if provided by searchSpaceGroupIdList.

The wireless device may decrement value of the search space switch timer by one after each slot based on a reference SCS configuration that is a smallest SCS configuration y among all configured DL BWPs in the serving cell, or in the set of serving cells. The wireless device may maintain the reference SCS configuration during the timer decrement procedure. In an example, searchSpaceSwitch-Timer may be defined as a value in unit of slots for monitoring PDCCH in the active DL BWP of the serving cell before moving to a default search space group (e.g., search space group 0). For 15 kHz SCS, a valid timer value may be one of {1, . . . , 20}. For 30 kHz SCS, a valid timer value may be one of {1, . . . , 40}. For 60 kHz SCS, a valid timer value may be one of {1, . . . , 80}. In an example, the base station may configure a same timer value for all serving cells in the same CellGroupForSwitch.

Semi-persistent scheduling (SPS) may be supported in the downlink, where the wireless device may be configured with a periodicity of the data transmission using the one or more configuration parameters (e.g., SPS-Config). Activation of semi-persistent scheduling may be done using PDCCH with CS-RNTI (e.g., receiving the PDCCH transmission addressed to/by the CS-RNTI). The PDCCH may carry necessary information in terms of time-frequency resources and other parameters. A HARQ process number/ID may be derived from a time, for example, when the downlink data transmission starts. Upon activation of semi-persistent scheduling, the wireless device may receive downlink transmission periodically according to the periodicity of the data transmission using one or more transmission parameters indicated in the PDCCH activating the semi-persistent scheduling.

In the uplink, two schemes for transmission without a dynamic grant may be supported. The two schemes may differ in the way they are activated: 1) type 1 of the configured grant (or configured grant Type 1), where an uplink grant is provided by the one or more configuration parameters (e.g., ConfiguredGrantConfig), including activation of the grant, 2) configured grant Type 2 (or type 2 of the configured grant), where the transmission periodicity is provided by the one or more configuration parameters (e.g., ConfiguredGrantConfig) and L1/L2 control signaling is used to activate/deactivate the transmission in a similar way as in the SPS. The two schemes may reduce control signaling overhead, and the latency before uplink data transmission, as no scheduling request-grant cycle is needed prior to data transmission. In an example of the configured grant Type 2, the one or more configuration parameters may indicate/configure the preconfigured periodicity and PDCCH activation may provide transmission parameters. Upon receiving the activation command, the wireless device may transmit according to the preconfigured periodicity, if, for example, there are data in the buffer. If there are no data to transmit, the wireless device may, similarly to the configured grant Type 1, not transmit anything. The wireless device may acknowledge the activation/deactivation of configured grant Type 2 by sending a MAC control element in the uplink. In both schemes, it is possible to configure multiple wireless devices with overlapping time-frequency resources in the uplink. In this case, the network may differentiate between transmissions from different wireless devices. In an example, PUSCH resource allocation may be semi-statically configured by the one or more configuration parameters (e.g., ConfiguredGrantConfig).

In an example, the wireless device may support a baseline processing time/capability. For example, the wireless device may support additional aggressive/faster processing time/capability. In an example, the wireless device may report to the base station a processing capability, e.g., per sub-carrier spacing. In an example, a PDSCH processing time may be considered to determine, by a wireless device, a first uplink symbol of a PUCCH (e.g., determined at least based on a HARQ-ACK timing K1 and one or more PUCCH resources to be used and including the effect of the timing advance) comprising the HARQ-ACK information of the PDSCH scheduled by a DCI. In an example, the first uplink symbol of the PUCCH may not start earlier than a time gap (e.g., $T_{proc,1}$) after a last symbol of the PDSCH reception associated with the HARQ-ACK information. In an example, the first uplink symbol of the PUCCH which carries the HARQ-ACK information may start no earlier than at symbol L1, where L1 is defined as the next uplink symbol with its Cyclic Prefix (CP) starting after the time gap $T_{proc,1}$ after the end of the last symbol of the PDSCH.

In an example, a PUSCH preparation/processing time may be considered for determining the transmission time of an UL data. For example, if the first uplink symbol in the PUSCH allocation for a transport block (including DM-RS) is no earlier than at symbol L2, the wireless device may perform transmitting the PUSCH. In an example, the symbol L2 may be determined, by a wireless device, at least based on a slot offset (e.g., K2), SLIV of the PUSCH allocation indicated by time domain resource assignment of a scheduling DCI. In an example, the symbol L2 may be specified as the next uplink symbol with its CP starting after a time gap with length $T_{proc,2}$ after the end of the reception of the last symbol of the PDCCH carrying the DCI scheduling the PUSCH.

A Scheduling Request (SR) may be used, by the wireless device, for requesting UL-SCH resources (e.g., from the base station) for new transmission (e.g., a new UL transmission). In an example, the MAC entity of the wireless device may be configured with zero, one or more SR configurations (e.g., via the one or more configuration parameters). For example, an SR configuration may consist of a one or more PUCCH resources for SR across different BWPs and cells. For a logical channel (LCH) or for SCell beam failure recovery and for consistent LBT failure recovery, at most one PUCCH resource for SR may be configured per BWP. For example, a SR configuration may comprise a SR prohibit timer (e.g., sr_ProhibitTimer) and a maximum number of SR transmission (e.g., sr_TransMax). In an example, the SR prohibit timer may be a duration during which the wireless device may be not allowed to transmit the SR. In an example, the wireless device may stay active while sr_ProhibitTimer is running and may monitor PDCCH for detecting DCI indicating uplink scheduling grant(s). In an example, the maximum number of SR transmission (e.g., sr_TransMax) may be a transmission number for which the wireless device may be allowed to transmit the SR at most.

In an example, each SR configuration may correspond to one or more logical channels and/or to SCell beam failure recovery and/or to consistent LBT failure recovery. Each logical channel, SCell beam failure recovery, and consistent LBT failure recovery may be mapped to zero or one SR configuration (configured by the one or more RRC configuration). The SR configuration of the logical channel that triggered a BSR or the SCell beam failure recovery or the consistent LBT failure recovery (if such a configuration exists) may be considered as corresponding SR configuration for the triggered SR. In an example, any SR configuration may be used for an SR triggered by Preemptive BSR. In an example, a first SR configuration in the plurality of SR configurations may correspond to one or more LCHs of the plurality of LCHs. For example, each SR configuration may correspond to one or more logical channels. Each logical channel may be mapped to zero or one SR configuration configured by the at least one message.

In an example, the wireless device may trigger a SR in response to a triggered BSR (e.g., SR for BSR or SR-BSR procedure). For example, the wireless device may trigger the SR based on at least one BSR having been triggered and not been cancelled, a regular BSR of the at least one BSR having been triggered and a logicalChannelSR-DelayTimer associated with a LCH for the regular BSR not being running, and no UL-SCH resource(s) being available for a new transmission (or the MAC entity being configured with configured uplink grant(s) and the regular BSR being triggered for a LCH for which logicalChannelSR-Mask is set to false, or the UL-SCH resources available for a new transmission not meeting the LCP mapping restrictions configured for the LCH that triggered the BSR.

In an example, the wireless device may determine that UL-SCH resource(s) are available if a MAC entity of the wireless device has an active configuration for either type (type 0 or type 1) of configured uplink grants, or if the MAC entity has received a dynamic uplink grant, or if both these conditions are met. In an example, the wireless device may determine that one or more UL-SCH resources are available if the MAC entity has been configured with, receives, or determines an uplink grant. If the MAC entity has determined at a given point in time that the one or more UL-SCH resource(s) are available, the one or more UL-SCH resource(s) may become unavailable for use.

In an example, the wireless device may consider a SR configuration of the LCH that triggered the BSR as a corresponding SR configuration for the triggered SR. In an example, when the SR is triggered, a wireless device may consider the SR pending until it is cancelled. In an example, when one or more UL grants accommodate one or more pending data (e.g., all pending data) available for transmission, one or more pending SRs (e.g., all pending SRs), including the triggered SR, may be cancelled.

The wireless device may determine whether there is at least one valid PUCCH resource for the triggered SR (or pending SR) at the time of the SR transmission occasion. In an example, based on determining that there is no valid PUCCH resource for the pending SR, the wireless device may initiate/trigger a random access procedure on a PCell, or a PSCell. The wireless device may cancel the pending SR based on initiating the RA procedure in. In an example, based on determining that there is at least one valid PUCCH resource for the pending SR (e.g., by determining that the PUCCH resource for the SR transmission occasion does not overlap with a measurement gap), the wireless device may instruct the physical layer to signal the SR on the at least one valid PUCCH resource for SR. In an example, for transmitting the SR, a PUCCH resource may be a PUCCH format 0 or PUCCH format 1.

In an example, based on determining that the SR prohibit timer being running, the wireless device may wait for another SR transmission occasion after the SR prohibit timer being expired/stopped. In an example, the wireless device may maintain a SR transmission counter (e.g., SR_COUNTER) associated with the SR configuration for counting the number of times that the SR being transmitted/retransmitted. For example, based on the SR being triggered and there are no other SRs pending corresponding to the SR configuration corresponding to the triggered SR, the wireless device may set/initialize the SR_COUNTER of the SR configuration to a first value (e.g., 0).

In an example, based on the SR prohibit timer being expired and the SR_COUNTER being less than the maximum number of SR transmission, the wireless device may retransmit the SR, increment the SR_COUNTER (e.g., by one), and start the SR prohibit timer. The wireless device may start monitoring PDCCH for detecting a DCI indicating one or more uplink grants when the SR prohibit timer is running. In an example, based on the one or more uplink grants being received, the wireless device may cancel the pending SR, and/or stop the SR prohibit timer if the one or more UL grants accommodate pending data (e.g., all pending data). In an example, the wireless device may cancel all pending SR(s) (including the SR) for BSR triggered before a MAC PDU assembly and/or stop each respective SR prohibit timer (including the SR prohibit timer) in response to the MAC PDU being transmitted and the MAC PDU being comprised a Long or Short BSR MAC CE which may contain buffer status up to (and including) the last event that triggered the BSR prior to the MAC PDU assembly. In an example, the wireless device may cancel all pending SR(s) (including the SR) for BSR triggered according to the BSR procedure and stop each respective SR prohibit timer (including the SR prohibit timer) by determining that the one or more UL grants may accommodate all pending data available for transmission.

In an example, based on the one or more uplink grants, which may accommodate all pending data available for transmission, not being received until the expiry of the SR prohibit timer, the wireless device may perform at least one of the following: determining the at least one valid PUCCH resource for the transmission of the SR being available; determining whether the SR prohibit timer is not running; determining the SR_COUNTER is smaller than the maximum number of the SR transmission. For example, in response to the SR_COUNTER being smaller than the maximum number of the SR transmission and the SR prohibit timer not being running, the wireless device may retransmit the SR, increment the SR_COUNTER, start the SR prohibit timer; and monitor the PDCCH. In an example, based on the SR_COUNTER being equal to or greater than the maximum number of the SR transmission, the wireless device may release PUCCH resource(s) for one or more serving cells (including the serving cell), and/or release SRS for the one or more serving cells (including the serving cell), and/or clear one or more configured downlink assignments and uplink grants, and/or initiate/trigger a random access procedure on a PCell, and/or cancel the pending SR.

In an example, the wireless device may initiate/trigger a random access (RA) procedure based on determining that a pending SR, triggered by a BSR, has no valid PUCCH resource. For example, the wireless device may stop the RA procedure due to the pending SR in response to transmitting a MAC PDU via a first UL grant other than a second UL grant provided by a RAR (or a MsgA payload) of the RA procedure; and the MAC PDU comprising a BSR MAC CE which contains buffer status up to (and comprising) a last event that triggered the BSR prior to the MAC PDU assembly. In an example, the wireless device may stop the RA procedure due to the pending SR if the first UL grant can accommodate all pending data available for transmission.

In an example, the wireless device may initiate/trigger a random access (RA) procedure based on determining that a pending SR, triggered by a beam failure recovery on a SCell, has no valid PUCCH resource. For example, the wireless device may stop the RA procedure due to the pending SR in response to transmitting a MAC PDU via a first UL grant other than a second UL grant provided by a RAR (or a MsgA payload) of the RA procedure; and the MAC PDU comprising a BFR MAC CE or Truncated BFR MAC CE which contains the beam failure recovery information on the SCell.

In an example, the wireless device may initiate/trigger a random access (RA) procedure based on determining that a pending SR, triggered for a consistent LBT recovery on a SCell, has no valid PUCCH resource. For example, the wireless device may stop the RA procedure due to the pending SR in response to transmitting a MAC PDU via a first UL grant other than a second UL grant provided by a RAR (or a MsgA payload) of the RA procedure; and the MAC PDU comprising a LBT failure MAC CE that indicates consistent LBT failure for all the SCells that triggered consistent LBT failure.

In an example, the wireless device may trigger a SR by Pre-emptive BSR procedure prior to a MAC PDU assembly. Based on the MAC PDU containing the relevant Pre-emptive BSR MAC CE being transmitted, the wireless device may cancel the pending SR and stop the corresponding SR prohibit timer, if running.

For example, the wireless device may trigger a SR by beam failure recovery of an SCell. Based on a MAC PDU being transmitted, and a BFR MAC CE or a Truncated BFR MAC CE (containing beam failure recovery information for the SCell) being included in the MAC PDU, the wireless device may cancel the pending SR and stop the corresponding SR prohibit timer, if running. In another example, based on the SCell being deactivated, the wireless device may cancel the pending SR and stop the corresponding SR prohibit timer, if running.

For example, the wireless device may trigger a SR by consistent LBT failure recovery of an SCell. Based on a MAC PDU (comprising an LBT failure MAC CE that indicates consistent LBT failure for this SCell) being transmitted, the wireless device may cancel the pending SR and stop the corresponding SR prohibit timer if running. In an example, if the triggered consistent LBT failure for the SCell being cancelled, the wireless device may cancel the pending SR and stop the corresponding SR prohibit timer if running.

In an example, the one or more configuration parameters may comprise one or more DRX configuration parameters (e.g., DRX-Config). The one or more DRX configuration parameters may configure the wireless device with DRX operation. In an example, the one or more DRX configuration parameters may indicate monitoring the PDCCH for the DRX operation. For example, when in an RRC_CONNECTED state, if the DRX operation is configured (e.g., the DRX is configured or a DRX cycle is configured), for all the activated Serving Cells (e.g., the serving cell), the MAC entity of the wireless device may monitor the PDCCH discontinuously using the DRX operation. Otherwise, the MAC entity may monitor the PDCCH continuously.

For example, the wireless device may, based on the DRX operation being configured, use the DRX operation while communicating with the base station in the serving cell. For example, a MAC entity (or the MAC layer) of the wireless device, based on the DRX operation being configured, may control the PDCCH monitoring activity of the MAC entity. When the DRX operation is configured, the wireless device may monitor the PDCCH for at least one RNTI. The at least one RNTI may comprise one or more of the following: C-RNTI, cancelation indication RNTI (CI-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control physical uplink control channel RNTI (TPC-PUCCH-RNTI), transmit power control physical shared channel RNTI (TPC-PUSCH-RNTI), transmit power control sounding reference signal RNTI (TPC-SRS-RNTI), or availability indicator RNTI (AI-RNTI).

In an example, the one or more DRX configuration parameters may comprise: DRX on duration timer/period/window (e.g., drx-onDurationTimer) indicating a duration at the beginning of a DRX cycle, drx-SlotOffset indicating a delay before starting the DRX on duration timer, DRX inactivity timer/period/window (e.g., drx-InactivityTimer) indicating a duration after a PDCCH occasion in which the PDCCH indicates a new UL or DL transmission for the MAC entity, DRX retransmission timer of DL (e.g., drx-RetransmissionTimerDL), per DL HARQ process except for the broadcast process, indicating a maximum duration until a DL retransmission is received, DRX retransmission timer of UL (e.g., drx-RetransmissionTimerUL), per UL HARQ process, indicating a maximum duration until a grant for UL retransmission is received, drx-LongCycleStartOffset indicating a Long DRX cycle and drx-StartOffset which defines a subframe where a Long and Short DRX cycle starts, drx-ShortCycle for a Short DRX cycle, drx-ShortCycle Timer indicating a duration the wireless device may follow the Short DRX cycle, drx-HARQ-RTT-TimerDL (per DL HARQ process except for the broadcast process) indicating a minimum duration before a DL assignment for HARQ retransmission is expected by the MAC entity, drx-HARQ-RTT-TimerUL (per UL HARQ process) indicating a minimum duration before an UL HARQ retransmission grant is expected by the MAC entity.

In an example, the one or more DRX configuration parameters may configure the Serving Cells (e.g., the serving cell) two DRX groups with separate DRX parameters. When a secondary DRX group is not configured, there may be only one DRX group (e.g., a DRX group) and the Serving Cells (e.g., the serving cell) may belong to the DRX group. When the two DRX groups are configured (e.g., the DRX group and a second DRX group), each Serving Cell (e.g., the serving cell) is uniquely assigned (or belong) to either of the DRX group or the second DRX group. The DRX configuration parameters that are separately configured for each DRX group are: the DRX on duration timer (e.g., the drx-onDurationTimer) and/or the DRX inactivity timer (e.g., the drx-InactivityTimer). The one or more DRX configuration parameters that are common to the two DRX groups are: drx-SlotOffset, drx-RetransmissionTimerDL, drx-RetransmissionTimerUL, drx-LongCycleStartOffset, drx-ShortCycle (optional), drx-ShortCycle Timer (optional), drx-HARQ-RTT-TimerDL, and drx-HARQ-RTT-TimerUL.

For example, when the DRX operation is configured, the wireless device may be in an on duration of the DRX operation (e.g., a DRX on duration) or an off duration of the DRX operation (e.g., a DRX off duration). For example, the DRX on duration may start based on starting the DRX on duration timer/period. For example, when the wireless device is not in the DRX on duration, the wireless device may be in the DRX off duration (e.g., outside of the DRX on duration). For example, the DRX off duration may stop based on starting the DRX on duration timer. For example, the wireless device may switch/transit from the DRX on duration to the DRX off duration based on stopping the DRX on duration timer. For example, the wireless device may switch/transit from the DRX off duration to the DRX on duration based on starting the DRX on duration.

In an example, when the DRX operation is configured, the wireless device may determine whether the wireless device is in an active time (or a DRX active state or Active Time) of the DRX operation. For example, the active time of the DRX operation may specify the active time for the serving cell (or the Serving Cells) in the DRX group. For example, the wireless device may determine that the active time of the DRX operation (e.g., the active time for the serving cell in the DRX group) comprises the DRX on duration.

For example, the wireless device may determine that the active time for the serving cell in the DRX group comprises the time while: the DRX on duration timer (e.g., drx-onDurationTimer) or the DRX inactivity timer (e.g., drx-InactivityTimer) configured for the DRX group is running, or the DRX retransmission timer of DL (e.g., drx-RetransmissionTimerDL) or the DRX retransmission timer of the UL (e.g., drx-RetransmissionTimerUL) is running on any of the Serving Cells (e.g., the serving cell) in the DRX group, or a contention resolution timer (e.g., ra-ContentionResolutionTimer) or a message B (MsgB) response window (e.g., msgB-ResponseWindow) is running, or a scheduling request (SR) is sent/transmitted on PUCCH and is pending, or a PDCCH indicating a new transmission addressed to the C-RNTI not being received after successful reception of a random access response (RAR) for a Random Access Preamble (or a preamble 1311/1321/1341) that is not selected by the MAC entity among the contention-based Random Access Preamble(s).

For example, when the wireless device is outside the active time for the serving cell in the DRX group, the wireless device may be in a DRX inactive state (or a DRX non-active time or a DRX non-active state). For example, when the wireless device is in the active time for the serving cell in the DRX group, the wireless device may be in a DRX active state.

For example, the wireless device may evaluate one or more DRX active time conditions (or one or more DRX Active Time conditions) to determine whether the wireless device is in the active time of the DRX group (for the serving cell in the DRX group) or not. For example, based on evaluating the one or more DRX active time conditions, the wireless device may determine that the wireless device is in active time of the DRX group based on the one or more DRX active time conditions being satisfied.

For example, the one or more DRX active time conditions may be satisfied based on the DRX on duration timer (e.g., drx-onDurationTimer) configured for the DRX group being running, or the DRX inactivity timer (e.g., drx-InactivityTimer) configured for the DRX group being running, or the DRX retransmission timer for DL (e.g., drx-RetransmissionTimerDL), on any of the Serving Cells (including the serving cell) in the DRX group, being running, or the DRX retransmission timer for UL (e.g., drx-RetransmissionTimerUL), on any of the Serving Cells (including the serving cell) in the DRX group, being running, or the contention resolution timer (e.g., ra-ContentionResolutionTimer) being running, or the MsgB response window (e.g., msgB-Response Window) being running, or the PDCCH indicating the new transmission addressed to the C-RNTI (after successful reception of RAR for preamble that is not selected by the MAC entity among the contention-based preamble(s)) has been received, or the SR being sent/transmitted on PUCCH, where in the SR is pending.

For example, the wireless device may, by evaluating the one or more DRX active time conditions, determine whether a current symbol is in active time of the DRX operation or not. For example, to evaluate the one or more DRX active time conditions the wireless device may consider at least one of the following: whether an UL grant (or UL grants) is received until a predefined gap prior to the current symbol, whether a DL assignment (or DL assignments) is received until the predefined gap milliseconds prior to the current symbol, or whether a (Long) DRX command MAC CE is received until the predefined gap prior to the current symbol, or whether the SR sent/transmitted until the predefined gap prior to the current symbol. For example, the UL grant may be an UL grant indicated/scheduled based on detecting a DCI format. For example, the assignment may be a DL assignment indicated/scheduled based on detecting a DCI format. For example, the predefined gap may be 4 milliseconds in NR. For example, the predefined gap may be 5 milliseconds in LTE.

In an example, when the DRX operation is configured, if a MAC PDU is received in a configured downlink assignment, the MAC entity of the wireless device may start the drx-HARQ-RTT-TimerDL for a corresponding HARQ process in a first symbol after the end of a corresponding transmission carrying a DL HARQ feedback and/or stop the drx-RetransmissionTimerDL for the corresponding HARQ process.

In an example, when the DRX operation is configured, if a MAC PDU is transmitted in a configured uplink grant and listen before talk (LBT) failure indication is not received from lower layers (e.g., the physical layer) of the wireless device, the MAC entity of the wireless device may start the drx-HARQ-RTT-TimerUL for the corresponding HARQ process in the first symbol after the end of the first transmission (e.g., within a bundle) of the corresponding PUSCH transmission and/or stop the drx-Retransmission TimerUL for the corresponding HARQ process at the first transmission (within a bundle) of the corresponding PUSCH transmission.

In an example, when the DRX operation is configured, if the drx-HARQ-RTT-TimerDL expires and if the data of the corresponding HARQ process was not successfully decoded, the MAC entity of the wireless device may start the drx-RetransmissionTimerDL for the corresponding HARQ process in the first symbol after the expiry of drx-HARQ-RTT-TimerDL.

In an example, when the DRX operation is configured, if the drx-HARQ-RTT-TimerUL expires, the MAC entity of the wireless device may start the drx-RetransmissionTimerUL for the corresponding HARQ process in the first symbol after the expiry of drx-HARQ-RTT-TimerUL.

In an example, when the DRX operation is configured, if a DRX Command MAC CE or a Long DRX Command MAC CE is received, the MAC entity of the wireless device may stop the drx-onDurationTimer for each DRX group (e.g., the DRX group) and/or stop the DRX inactivity timer (e.g., drx-InactivityTimer) for each DRX group (e.g., the DRX group).

In an example, when the DRX operation is configured, if the drx-InactivityTimer for the DRX group expires, the MAC entity of the wireless device may start or restart the drx-ShortCycle Timer for the DRX group in the first symbol after the expiry of the drx-InactivityTimer and/or use the Short DRX cycle for the DRX group, if the Short DRX cycle is configured. If the drx-InactivityTimer for the DRX group expires, the MAC entity of the wireless device may use the Long DRX cycle for the DRX group, if the Short DRX cycle is not configured.

In an example, when the DRX operation is configured, if a DRX Command MAC CE is received, the MAC entity of the wireless device may start or restart the drx-ShortCycle Timer for each DRX group (including the DRX group) in the first symbol after the end of the DRX Command MAC CE reception and/or use the Short DRX cycle for each DRX group (including the DRX group), if the Short DRX cycle is configured. If the DRX Command MAC CE is received, the MAC entity of the wireless device may use the Long DRX cycle for the DRX group, if the Short DRX cycle is not configured.

In an example, when the DRX operation is configured, if the drx-ShortCycle Timer for the DRX group expires, the MAC entity of the wireless device may use the Long DRX cycle for the DRX group. If the Long DRX Command MAC CE is received, the MAC entity of the wireless device may stop the drx-ShortCycle Timer for each DRX group (e.g., including the DRX group) and/or use the Long DRX cycle for each DRX group (e.g., including the DRX group).

In an example, when the DRX operation is configured, if the DRX group is in the active time (or the DRX active state), the MAC entity of the wireless device may monitor PDCCH for the at least one RNTI on the Serving Cells (e.g., the serving cell) in the DRX group. If the PDCCH indicates a DL transmission, the MAC entity of the wireless device may start the drx-HARQ-RTT-TimerDL for the corresponding HARQ process in the first symbol after the end of the corresponding transmission carrying the DL HARQ feedback and/or stop the drx-Retransmission TimerDL for the corresponding HARQ process. The MAC entity may start the drx-Retransmission TimerDL in the first symbol after the PDSCH transmission for the corresponding HARQ process if the PDSCH-to-HARQ_feedback timing indicates a non-numerical k1 value. When HARQ feedback is postponed by PDSCH-to-HARQ_feedback timing indicating a non-numerical k1 value, the corresponding transmission opportunity to send the DL HARQ feedback is indicated in a later PDCCH requesting the HARQ-ACK feedback.

In an example, if the PDCCH indicates a UL transmission, the MAC entity may start the drx-HARQ-RTT-TimerUL for the corresponding HARQ process in the first symbol after the end of the first transmission (within a bundle) of the corresponding PUSCH transmission and/or stop the drx-Retransmission TimerUL for the corresponding HARQ process.

In an example, if the PDCCH indicates a new transmission (DL or UL) on the serving cell in the DRX group, the MAC entity may start or restart the DRX inactivity timer (e.g., drx-InactivityTimer) for the DRX group in the first symbol after the end of the PDCCH reception. If a HARQ process receives downlink feedback information and acknowledgement is indicated, the MAC entity may stop the drx-Retransmission TimerUL for the corresponding HARQ process.

In an example, when DRX operation is configured, if the Short DRX cycle is used for the DRX group, and [(SFN×10)+subframe number]modulo (drx-ShortCycle)=(drx-StartOffset) modulo (drx-ShortCycle), the MAC entity of the wireless device may start drx-onDurationTimer for the DRX group after drx-SlotOffset from the beginning of the subframe.

In an example, the one or more configuration parameters may comprise one or more power saving configuration parameters (e.g., DCP-Config-r16). For example, the one or more power saving configuration parameters may configure a wakeup duration/occasion (or at least one power saving occasion). For example, the one or more power saving configuration parameters may configure the wireless device for monitoring PDCCH addressed to the PS-RNTI corresponding to the at least power saving occasion. For example, the one or more power saving configuration parameters may indicate to the wireless device the PS-RNTI (e.g., ps-RNTI) for detecting a DCI format 2_6. The DCI format 2_6 may be with/having CRC scrambled by the PS-RNTI (DCP). For example, the one or more power saving configuration parameters may configure the wireless device to monitor at least one DCP occasion in the active DL BWP, e.g., to monitor the at least one power saving occasion. The one or more configuration parameters may indicate/configure a number of search space sets (e.g., by dci-Format2-6 in SearchSpace) for monitoring the PDCCH addressed to the PS-RNTI. When the DCP monitoring is configured in the active DL BWP, the wireless device may monitor the PDCCH for detection of the DCI format 2_6 on the active DL BWP according to a common search space (CSS) in the at least one DCP occasion. For example, the DCP-Config-r16 may indicate a location in DCI format 2_6 of a wake-up indication bit by ps-PositionDCI-2-6. For example, the wake-up indication bit may correspond to the wireless device.

The at least one DCP occasion may be located at a number of slots (or symbols) before the DRX on duration of a DRX cycle. For example, the one or more power saving occasion may indicate an offset (e.g., by ps-Offset) that indicates a time, where the wireless device may start monitoring the PDCCH for detection of DCI format 2_6 according to the number of search space sets, prior to a slot where the DRX on duration timer (e.g., drx-onDurationTimer) is expected to start on the PCell or on the SpCell. The number of slots (or symbols), referred to as a DCP gap between the at least one DCP occasion (e.g., a wakeup duration/occasion) and the DRX on duration, may be configured in the one or more power saving configuration parameters or predefined as a fixed value. The DCP gap may be used for at least one of: synchronization with the base station; measuring reference signals; and/or retuning RF parameters. The DCP gap may be determined based on a capability of the wireless device and/or the base station.

For example, based on a DCI format 2_6 being detected, the physical layer of the wireless device may report the value of the wake-up indication bit (a first value or a second value) for the wireless device to the higher layers (e.g., the MAC layer) for the next Long DRX cycle. For example, if the wireless device does not detect the DCI format 2_6, the physical layer of the wireless device may not report the value of the wake-up indication bit to the higher layers for the next Long DRX cycle.

When the wireless device is provided search space sets (e.g., by dci-Format2-6) to monitor the PDCCH for detection of the DCI format 2_6 in the active DL BWP, the physical layer of the wireless device may report a value of '1' (or the first value) for the wake-up indication bit to the higher layers (e.g., the MAC layer) of the wireless device for the next Long DRX cycle. For example, in response to the wireless device not being required to monitor PDCCH for detection of the DCI format 2_6 for all corresponding PDCCH monitoring occasions outside the active time prior to a next Long DRX cycle, the physical layer of the wireless device may report the first value. In an example, based on the at least one DCP occasion not being outside the active time of the next long DRX cycle (e.g., the wireless device not having any PDCCH monitoring occasions for detection of the DCI format 2_6 outside the active time of the next long DRX cycle), the physical layer of the wireless device may report the first value.

In an example, the wireless device may not monitor the at least one DCP occasion (e.g., the PDCCH for detecting the DCI format 2_6) during the active time of the DRX operation (e.g., the active time for the serving cell in the DRX group). On PDCCH monitoring occasions associated with a same Long DRX cycle, the wireless device may not expect to detect more than one DCI format 2_6 with different values of the wake-up indication bit for the wireless device.

When the DCP monitoring is configured for the active DL BWP, the wireless device may monitor the wake-up signal during the wake-up duration/occasion, e.g., monitoring the at least one DCP occasion. In an example, when the DCP monitoring is configured for the active DL BWP, the lower layers (e.g., the physical layer) of the wireless device may send/report/transmit a DCP indication that indicates starting the DRX on duration timer for the next Long DRX cycle (e.g., staring the DRX on duration). In an example, the DCP indication may comprise/indicate the wake-up indication bit being set to the first value.

In an example, the first value for the wake-up indication bit, when reported to the higher layers of the wireless device, may indicate to start the DRX on duration timer (e.g., drx-onDurationTimer) for the next Long DRX cycle. When the wireless device receives the DCP indication that indicates starting the DRX on duration timer for the next Long DRX cycle (e.g., the wake-up indication bit indicating the first value), the wireless device may start the DRX on duration timer (e.g., switching to the DRX on duration) associated with the DRX operation after the drx-SlotOffset from the beginning of the subframe. In an example, if ps-Wakeup is configured with value true and the DCP indication associated with the current DRX cycle has not been received from lower layers (e.g., the physical layer), the wireless device may start the DRX on duration timer (e.g., switching to the DRX on duration) associated with the DRX operation after the drx-SlotOffset from the beginning of the subframe. For example, in response to receiving the DCP indication indicating starting the DRX on duration timer for the next Long DRX cycle, the wireless device may monitor the PDCCH for the at least one RNTI while/during the DRX on duration timer is running. When the DRX on duration timer expires (or the DRX switching to an off duration of the DRX operation), the wireless device may stop monitoring the PDCCH for the at least one RNTI.

In an example, the second value for the wake-up indication bit (e.g., '0'), when reported from the physical layer to the higher layers (e.g., the MAC layer) of the wireless device, may indicate to not start the DRX on duration timer (e.g., drx-onDurationTimer) for the next Long DRX cycle. For example, based on receiving the second value for the wake-up indication bit from the lower layers (e.g., the physical layer) of the wireless device, the wireless device may not start the DRX on duration timer for the next Long DRX cycle. For example, based on not receiving the DCP indication indicating starting the DRX on duration timer for the next Long DRX cycle at the MAC layer from the lower layers (e.g., the physical layer) of the wireless device, the wireless device may not start the DRX on duration timer for the next Long DRX cycle.

In an example, when the DRX operation is configured and [(SFN×10)+subframe number]modulo(drx-LongCycle) =drx-StartOffset, the Long DRX cycle may be used for the DRX group. In response to the DCP monitoring not being configured for the active DL BWP, the MAC entity of the wireless device may start the DRX on duration timer (e.g., drx-onDurationTimer) after the drx-SlotOffset from the beginning of the subframe. For example, in response to the DCP monitoring being configured for the active DL BWP and the DCP indication (associated with the current DRX cycle) indicating to start the drx-onDurationTimer (e.g., the first value of the wake-up indication bit) being received from the lower layers (e.g., the physical layer) of the wireless device, the MAC entity of the wireless device may start the DRX on duration timer after the drx-SlotOffset from the beginning of the subframe. For example, the MAC entity of the wireless device may start the drx-onDurationTimer after the drx-SlotOffset from the beginning of the subframe in response to the DCP monitoring being configured for the active DL BWP, the DCP monitoring being configured for the active DL BWP, the DCP indication to start the drx-onDurationTimer (e.g., the first value of the wake-up indication bit) associated with the current DRX cycle not being received from the lower layers (e.g., the physical layers) of the wireless device, and the ps-Wakeup being configured with value true.

Extended reality (XR) may be referred to all real-and-virtual combined environments and human-machine interactions generated by computer technology and wearables. XR may be an umbrella term for different types of realities, e.g., Virtual reality (VR), Augmented reality (AR), Mixed reality (MR), and/or Cloud Gaming, and the like. XR application(s) may provide a sense of being surrounded by the virtual environment (e.g., Immersion) and/or a feeling of being physically and spatially located in the virtual environment (e.g., Presence). In some examples, the acronym XR may refer to equipment(s), application(s) and function (s) used for VR, AR, Cloud Gaming, and/or MR, e.g., to HMDs for VR, optical see-through glasses and camera see-through HMDs for AR and MR and mobile devices with positional tracking and camera. An XR device may be a wireless device that run/use/perform one or more XR functions/applications/use cases (e.g., AR). For example, an XR device may be a wireless device that has XR equipment's to perform one or more XR services.

Some XR uses cases (e.g., Cloud Gaming and/or VR) may be characterized by quasi-periodic traffic, e.g., 45/60/90/120 frames per second (FPS), with possible jitter and/or a non-integer periodicity. For example, the frame rate for XR video varies from 30 frames per second up to 90 or even 120 frames per second, with a typical minimum of 60 for VR. In some other cases, a jitter may be up to couple of milliseconds (e.g., 4 ms, 8 ms, 10 ms, or higher, depending on application, network delay, and/or video coding standards). XR use cases may require high data rate in DL (e.g., for transmission of video steam and/or audio data) combined with the frequent UL data (i.e., pose/control update or pose Information) and/or UL video stream. Both DL and UL traffic are also characterized by relatively strict packet delay budget (PDB). For example, PDB of pose/control update may be around 4 ms. In some applications, PDB of DL/UL video steam may be 10 ms or 20 ms or 30 ms. For example, the latency of action of the angular or rotational vestibulo-ocular reflex is known to be of the order of 10 ms or in a range from 7-15 milliseconds. In another example, a motion-to-photon latency of less than 10-20 milliseconds may be required (e.g., the PDB of less than 10-20 ms).

The bit rates of XR use cases (or applications) may be between 10 and 200 Mbps, e.g., depending on frame rate, resolution and codec efficiency. In some applications, volume of DL/UL data (or bit rate) across traffic periods (or burst of data or data burst or PDU set) may change. For example, in a first traffic period (or burst of data) the volume of DL video stream may be a first value (e.g., 100 Mbyte) and in a second traffic period (or burst of data) the volume of DL video stream may be a second value (e.g., 50 Mbyte). Data burst m ay comprise a set of multiple PDUs (PDCP/RLC/MAC PDU) generated and sent by the application in a short period of time (e.g., within a traffic period). In some examples, a data burst may comprise one or multiple PDU Sets and/or one or more data packets (e.g., IP packets). The PDU Set may comprise one or more PDUs carrying the payload of one unit of information generated at the application level (e.g., a frame or video slice for XRM Services). A PDU Set information (e.g., corresponding to a PDU) may indicate/comprise at least one of the following: a PDU Set Identifier; and/or a Start (or earliest/starting/initial) PDU and an End (or latest/final/ending) PDU of the PDU Set; and/or a PDU serial number (SN) of a PDU within the PDU Set; and/or a PDU Set size; and/or a PDU Set importance; and/or an End of Data Burst indication (e.g., indicating an end of the data burst).

In practice, the network (e.g., base station) and/or the wireless device may not be aware of (or accurately measure) instantaneous jitter value/range in advance and/or volume of UL/DL traffic (e.g., within each traffic period). In some implementations, the network (e.g., base station) and/or the wireless device may determine/measure via statistical measurements (and/or AI/ML methods) one or more statistics/characteristics (e.g., average, variance, probability density function, and the like) of the jitter and/or the volume of UL/DL data (or bit rate).

For example, a PDU Set related assistance information (e.g., provided via control plane to user plane of the wireless device and/or the base station) may define/indicate one or more assistance information corresponding to a PDU Set. The PDU Set information and/or the PDU Set related assistance information may allow an XR aware operation of RAN (e.g., user plane of the base station and/or the wireless device). In an example, the PDU Set related assistance information may comprise a PDU-Set QoS parameters and/or a burst periodicity, e.g., a periodicity of a quasi-periodic traffic, e.g., 45/60/90/120 FPS. A PDU-Set QoS parameters (e.g., provided via control plane to user plane of the wireless device and/or the base station) corresponding to a PDU Set may comprise at least one of the following a PDU-Set Delay Budget (PSDB); a PDU-Set Error Rate (PSER); and/or a PDU Set Integrated Indication (PSII). The PDU-Set Delay Budget (PSDB) of a PDU Set may indicate/define/measure delay of the PDU Set (or PDU-Set) between a wireless device and an N6 termination point at the UPF. For a certain 5QI the value of the PSDB is the same in UL and DL. In the case of 3GPP access, the PSDB may be used to support the configuration of scheduling and link layer functions (e.g., the setting of scheduling priority weights and HARQ target operating points). For example, when a PDU-Set is delayed more than the PSDB, the PDU-Set may be considered/determined as lost (e.g., if the corresponding QoS Flow is not exceeding the GFBR and/or for GBR QoS Flows using the Delay-critical resource type). In some implementations, the PSDB of a PDU Set may depend on a PDB of a PDU of the PDU Set (e.g., smallest/largest PDB or the like).

A PDU-Set Error Rate (PSER) of a PDU Set may define/indicate an upper bound for an error rate of the PDU-Set. For example, an upper layer (e.g., the RLC/PDCP/SDAP layer) of a sender (e.g., the base station and/or the wireless device) may process a PDU-Set to determine whether all of the PDUs in the PDU-Set are successfully delivered by the corresponding receiver to the upper layers (e.g., the PDCP/RLC/SDAP layer).

The PSII of a PDU Set may define/indicate/measure whether all PDUs of the PDU Set are needed for the usage of PDU Set by application layer. In some implementations all PDUs in a PDU Set are needed by the application layer to use the corresponding unit of information. In other implementations, the application layer can still recover parts all or of the information unit, when some PDUs of the PDU set are missing. For example, a PDU sets may comprise one or more data packets (e.g., IP packets).

For example, there may be different methods/procedures/alternatives to map PDU sets onto QoS flows (e.g., in the NAS) and/or to map the QoS flows onto DRBs (e.g., in the AS), e.g., one-to-one mapping between types of PDU sets and QoS flows in the NAS and one-to-one mapping between QoS flows and DRBs in the AS; or one-to-one mapping between types of PDU sets and QoS flows in the NAS and multiplexing of QoS flows in one DRB in the AS; and/or a multiplexing of PDU sets in one QoS flow in the NAS and one-to-one mapping between QoS flows and DRBs in the AS; or N multiplexing of PDU sets in one QoS flow in the NAS and demultiplexing of PDU sets from one QoS flow on multiple DRBs in the AS. In some examples, the wireless device and/or the base station may map one or more PDU Sets in DRBs to logical channels, e.g., 1-to-1 mapping wherein the PDCP layer maps the one or more PDU Sets to one logical channel or 1-to-many wherein the PDCP layer maps the one or more PDU Sets to one or more logical channels.

The base station may configure the wireless device with DRX operation (e.g., via the one or more DRX configuration parameters) to reduce consumed power of the wireless device for the PDCCH monitoring. When there is an uncertainty in arrival time of data (e.g., XR packets/PDU-Sets/data bursts, e.g., because of jitter between PDU-Sets/data bursts or across PDUs of a PDU-Set in XR applications), e.g., at the base station, the base station may configure the length of the DRX on duration timer based on (average/estimated/expected) jitter range/value (e.g., 10 ms), e.g., the length of the DRX on duration timer may be equal or larger than the (average/estimated) jitter range/value. The wireless device may unnecessarily monitor the PDCCH during the DRX on duration timer (e.g., of the DRX operation), e.g., when XR packets/PDU-Sets arrive with delay and/or there is jitter between PDUs of a PDU-Set. Based on existing technologies, in XR applications, when the (average/estimated) jitter range/value is large (e.g., larger than 4 ms or around 10 ms) and/or periodicity of XR packet is short (e.g., 60/90/120 frames per second (FPS)), the DRX operation may have limited/vanishing impact on reducing the consumed power of the wireless device.

Improvements in DRX operation and/or the PDCCH monitoring (or PDCCH adaptation) may reduce possibility of unnecessarily monitoring the PDCCH and/or reduce consumed power of the wireless device, e.g., when due to jitter there is an uncertainty in arrival time of DL data (e.g., XR packets/PDU-Sets).

A base station may configure a wireless device (e.g., via PDCCH-Config in the one or more configuration parameters) to skip/avoid/stop/terminate monitoring control channels (e.g., to skip monitoring PDCCH or to skip PDCCH monitoring). For example, the PDCCH-Config may comprise at least one time duration (e.g., pdcch-SkippingDurationList). In response to receiving a fourth DCI (e.g., the DCI) indicating skipping PDCCH monitoring for a time duration (e.g., in a number of slots/symbols/frames/subframes or in ms), of the at least one time duration, the wireless device may skip monitoring PDCCH during the time duration. The fourth DCI may comprise the first filed (e.g., a 'PDCCH monitoring adaptation indication' filed) indicating the time duration for skipping monitoring PDCCH. The skipping monitoring PDCCH (e.g., indicated by the DCI), e.g., for the time duration, may reduce consumed power of the wireless device.

Based on existing technologies, in response to/after transmitting the uplink signal, the wireless device may terminate/stop the PDCCH skipping and resume monitoring the PDCCH. For example, the wireless device may resume monitoring the PDCCH with accordance to a default search space set (SS) group (e.g., the group index 0). Based on existing technologies, monitoring the PDCCH according to the default SS group (e.g., when the wireless device resumes the PDCCH monitoring) may increase latency of UL/DL transmissions, e.g., when the first/second TB has a strict delay budget (e.g., a PDB of 4 ms or 10 ms or 20 ms, e.g., in XR applications). In another example, monitoring the PDCCH according to the default SS group may increase consumed power of the wireless device, e.g., for XR applications with restricted/limited battery resources.

Improvements in control channel monitoring when the wireless device (e.g., an XR device) is configured with at least one/two SS groups may reduce the consumed power of the wireless device and/or improve delay/latency of UL/DL transmissions.

According to example embodiments of the present disclosure, the base station may configure the wireless device with at least two search space set (SS) groups (e.g., via the one or more PDCCH/SS configuration parameters). A first SS group (e.g., with a first group index) of at least two SS groups may correspond to a sparse SS group (e.g., a small SSS duration, e.g., 1 slot, and/or a large PDCCH monitoring periodicity, e.g., 4 slots). A second SS group (e.g., with a first group index) of at least two SS groups may correspond to a dense SS group (e.g., a large SSS duration, e.g., 4 slots, and/or a small PDCCH monitoring periodicity, e.g., 1 slots). The second SS group may be an XR-dedicated SS group (e.g., comprising DCI format(s) with XR-dedicated RNTIs, e.g., XR-RNTI or XR-CS-RNTI). For example, the first group index may not be the group index 0. In an example embodiment, the wireless device may, in response to/based on starting the DRX on duration timer of the DRX operation, may (implicitly) start monitoring the PDCCH according to the first SS group. In some cases, the wireless device may prepare to switch (or switch) to the first SS group at least the SS switching delay, e.g., $P_{switch}$, symbols prior to the starting symbol/slot of the DRX on duration timer. In response to (or based on) one or more SS switching conditions being satisfied and/or one or more DRX conditions being satisfied, the wireless device may switch from the first group index to a second group index. For example, the wireless device may start monitoring the PDCCH according to the second SS group (e.g., with the group index) of the at least two SS groups and stop monitoring the PDCCH according to the first SS group. The second group index may be 0 (e.g., the second SS group is a default SS group) or greater than 0 (e.g., the second SS group is different than the default SS group).

In an example embodiment, in response to starting the DRX on duration timer, the wireless device may start a first timer. The length of the first timer may indicate for how long the PDCCH monitoring is based on the first SS group. For example, when the DRX on duration timer is running, the one or more SS switching condition may be satisfied based on an expiry of the first timer. For example, the first timer may be a search space (SS) switch timer (e.g., a searchSpaceSwitchTimer). In another example, the first timer may be different than the search space switch timer (e.g., compared to the SS switch timer, starting the first timer may not be based on an indication from the base station).

In an example embodiment, the wireless device may determine the one or more SS switching conditions being satisfied based on at least one of the following: arrival of a PDU (e.g., a Start PDU) of the PDU-Set from the base station; starting of a DRX inactivity timer of the DRX operation; receiving an indication for BWP switching or expiry of a BWP inactivity timer; and/or a receiving an indication for SSSG switching.

In an example embodiment, the wireless device may, at a beginning of a DRX cycle of a DRX operation, start the DRX on duration timer. For example, the wireless device may, in response to the starting the DRX timer, monitor the PDCCH according to a first SS group of the at least two SS groups. The wireless device may, in response to one or more DRX conditions being satisfied (e.g., during the DRX cycle), monitor PDCCH according a second SS group of the at least two SS groups. For example, the wireless device may determine the one or more DRX conditions being satisfied, e.g., based on at least one of the following: partially receiving the PDU-Set from the base station (e.g., a number of received PDUs of the PDU-Set being smaller than a threshold, e.g., 1, and/or not receiving an End PDU of the PDU Set and/or not receiving an End of data burst indication); restarting the DRX on duration timer during/within the DRX cycle; starting a new DRX on duration timer within/during the DRX cycle.

In an example embodiment, the one or more DRX configuration parameters may configure at least two DRX configurations (e.g., per a DRX group). For example, the wireless device may, during a DRX active time, monitor the PDCCH according to at least one SS group of the at least two SS groups (e.g., the first SS group and/or the second SS group) based on whether the DRX active time corresponding to a first DRX configuration of the at least two DRX configurations or a second DRX configuration of the at least two DRX configurations. In an example embodiment, the wireless device may, during a first DRX active time of the first DRX configuration of the at least two DRX configurations, monitor the PDCCH according to the first SS group of the at least two SS groups. In an example embodiment, the wireless device may, during a second DRX active time of the second DRX configuration of the at least two DRX configurations, monitor the PDCCH according to the second SS group of the at least two SS groups.

In an example embodiment, the wireless device may determine the first SS group of the at least two SS groups being associated (or corresponding to) the first DRX configuration of the at least two DRX configurations and/or the second SS group of the at least two SS groups being associated (or corresponding to) the second DRX configuration of the at least two DRX configurations. For example, the first DRX configuration may correspond to a first type of traffic (e.g., with a non-integer data burst periodicity) and/or a DRX cycle of the first DRX configuration may be a non-integer value. For example, the second DRX configuration may correspond to a second type of traffic (e.g., with an integer data burst periodicity) and/or or a DRX cycle of the second DRX configuration may be an integer value.

In an example embodiment, the wireless device may activate the first DRX configuration in response to receiving the one or more configuration parameters. For example, the wireless device may receive an activation command (e.g., a MAC CE or a DCI or an RRC) activating the second DRX configuration. The wireless device may activate the second DRX configuration in response to the activation command. For example, the wireless device may deactivate the first DRX configuration in response to the activation command.

In an example embodiment, the wireless device may, using a first pre-defined formula, determine a first occasion for starting a first discontinuous reception (DRX) on-duration timer of the first DRX configuration based on a first DRX cycle of the first DRX configuration being an integer number. For example, the wireless device may start the first DRX on-duration timer of the first DRX configuration at the first occasion. The wireless device may, using a second pre-defined formula, determine a second occasion for starting a second discontinuous reception (DRX) on-duration timer of the second DRX configuration based on a second DRX cycle of the second DRX configuration being a non-integer number. The wireless device may start the second DRX on-duration timer of the second DRX configuration at the second occasion. The above-example method, further comprising determining, using the first per-defined formula, the first occasion based on the first DRX configuration corresponding to a first traffic type with an integer data burst periodicity.

In an example embodiment, in response to the DRX cycle having the non-integer value, the wireless device may adjust one or more PDCCH monitoring occasions based on: a periodicity and a slot offset (of the one or more PDCCH configuration parameters) and/or and an occasion for starting a DRX on-duration timer. For example, the wireless device may, while the DRX on-duration timer is running, monitor the PDCCH using the one or more PDCCH monitoring occasions.

In an example embodiment, for the PDCCH monitoring (e.g., on the DL active BWP of the serving cell) in response to (or after or based on) a transmission of the UL signal after receiving a DCI indicating the SSSG switching (e.g., the DCI comprising the first filed 'PDCCH monitoring adaptation indication' indicating a second group index), the wireless device may determine whether to switch from the second SS group (e.g., with the second group index) to a third SS group (e.g., with a third group index). For example, the wireless device may monitor the PDCCH for receiving the DCI with accordance to a first SS group. The wireless device may switch to the second SS group (e.g., in a first/starting/earliest/initial slot that is at least the SS switching delay, e.g., $P_{switch}$, symbols after a last/final/ending/latest symbol of the PDCCH carrying the DCI) from the first SS group in response to/based on the DCI. In an example embodiment, the wireless device may, in response to/after/based on the transmitting the UL signal and while monitoring the PDCCH according to the second SS group, switch to the third SS group for monitoring the PDCCH (e.g., in a first/starting/earliest/initial slot that is at least a first offset (e.g., in symbols corresponding to numerology of the DL BWP) symbols after a last/final/ending/latest symbol of the UL signal).

For example, the third SS group may not be the default SS group (e.g., with the group index 0). For example, the third SS group may be the first SS group, e.g., the first group index is equal to the third group index. For example, the one or more SSS switching configuration parameters may configure at least one of the first SS group, the second SS group, the third SS group and the default SS group.

For example, the UL signal may be the PUCCH for (or corresponding to or conveying) the (positive) SR. In another example, the UL signal may convey (or be for transmitting) a downlink (DL) hybrid automatic repeat request (HARQ) acknowledgement. For example, the DL HARQ process may be a feedback-enabled DL HARQ process. In yet another example, the UL signal may convey (or be for transmitting) a transport block (TB) corresponding to an UL HARQ process. For example, a state/mode of the UL HARQ process may be a HARQ mode A.

When the DRX operation is configured, the first offset (e.g., in symbols/ms) may be based on a length/value of a timer, e.g., a DRX timer (e.g., drx-HARQ-RTT-TimerUL or drx-HARQ-RTT-TimerDL) and/or $P_{switch}$. For example, the first offset may be $\max(P_{switch}, L-P_{switch})$ where L is the length of the timer (e.g., in number of symbols corresponding to the SCS of the DL BWP).

In an example embodiment, in response to resuming the PDCCH monitoring (e.g., after or based on the transmission of the UL signal) after receiving a DCI indicating the PDCCH skipping (e.g., the DCI comprising the first filed 'PDCCH monitoring adaptation indication' indicating a time duration for skipping monitoring PDCCH), the wireless device may determine a SS group (e.g., a group index) for the PDCCH monitoring (e.g., on the DL active BWP of the serving cell). For example, the wireless device may resume monitoring the PDCCH with accordance to the third SS group. The wireless device may switch to the third SS group in a first/starting/earliest/initial slot that is at least $P_{switch}$ symbols after a last/final/ending/latest symbol of the UL signal). In another example, when the DRX operation is configured, the wireless device may switch to the third SS group in a first/starting/earliest/initial slot that is at least the first offset after a last/final/ending/latest symbol of the UL signal.

When there is an uncertainty in arrival time of XR packets/PDU-Sets (e.g., due to jitter), some example embodiments may reduce the consumed power of the wireless device for monitoring the PDCCH.

In the present disclosure, when the wireless device monitors the PDCCH according to a SS group (and/or one or more SSSs), the wireless device may monitor one or more PDCCH candidates according to the SS group (and/or the one or more SSSs) on an active DL BWP of at least on a serving cell (e.g., a serving cell).

In the present disclosure, when the wireless device switches (e.g., at/in/on a switching occasion, e.g., a symbol/slot/subframe) from a first SS group (with a first group index) to a second SS group (with a second group index), the wireless device may stop monitoring the PDCCH according to the first SS group and start monitoring the PDCCH according to the second SS group in/at/on a first/starting/earliest/initial slot (or a slot group X_s) that is at least $P_{switch}$ symbols after/from the switching occasion.

In an example, a search space group (or a group index of the one or more group indexed) may correspond to (or for) sparsely monitoring PDCCH (e.g., the group index may correspond to a sparse SSSG or a sparse SS group), e.g., to reduce consumed power of the wireless device. For example, corresponding to one or more SSSs with the group index a time duration of a CORESET and/or a search space time duration may not be greater than a threshold (e.g., 1 symbol). In some cases, the PDCCH pattern corresponding to one or more SSSs with the group index may indicate sparse monitoring of PDCCH within a group of slots (e.g., 1 slot in a group of 4 slots). In another example, a number of PDCCH candidates for an aggregation level of the one or more SSSs may not be greater than a threshold (e.g., 2 or 4). For example, monitoring PDCCH with accordance to a sparse SS group may comprise monitoring a first number of PDCCH candidates (e.g., 2) during a first number of symbols (e.g., 1 symbol) during/within each first number of slots (e.g., each 4 slots).

In an example, a search space group (or a group index of the one or more group indexed) may correspond to densely monitoring PDCCH (e.g., the group index may correspond to a dense SSSG or a dense SS group), e.g., to reduce UL/DL latency. For example, corresponding to one or more SSSs with the group index a time duration of a CORESET and/or a search space time duration may be greater than a threshold (e.g., 1 symbol). In some cases, the PDCCH pattern corresponding to one or more SSSs with the group index may indicate dense monitoring of PDCCH within a group of slots (e.g., 4 slots in a group of 6 slots). In another example, a number of PDCCH candidates for an aggregation level of the one or more SSSs may be greater than a threshold (e.g., 2 or 4). For example, monitoring PDCCH with accordance to a dense SS group may comprise monitoring a second number of PDCCH candidates (e.g., 8) during a second number of symbols (e.g., 2-3 symbol) within/during each second number of slots (e.g., each 1 slot or 2 slots). For example, the second number of slots may be larger than the first number of slots. Consumed power (or complexity) of the wireless device for monitoring the PDCCH according to the dense SS group may be higher than consumed power (or complexity) of the wireless device for monitoring the PDCCH according to the sparse SS group.

Figure 18:
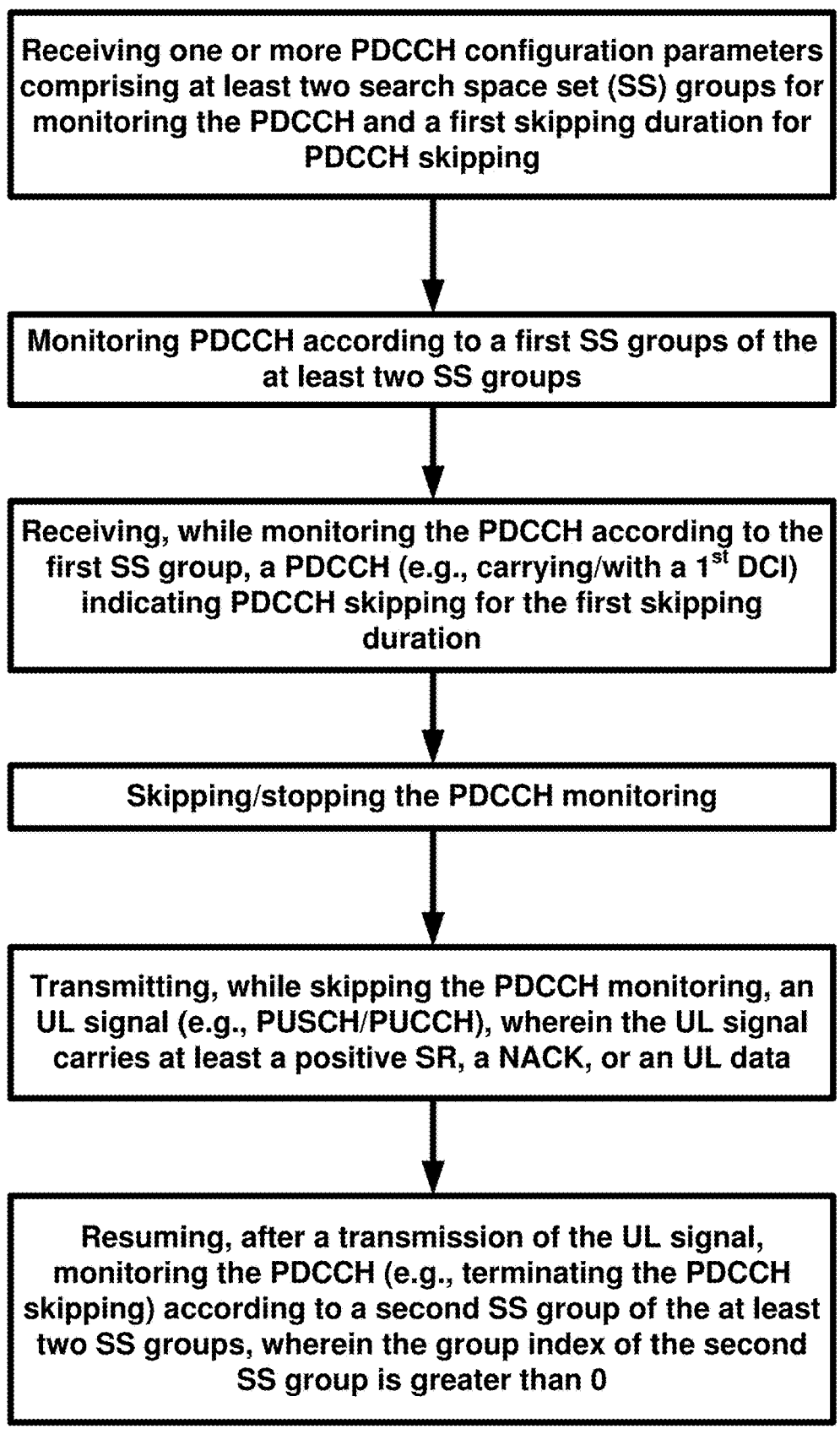
FIG. 18 shows a flowchart of a method/procedure for PDCCH monitoring in wireless communication systems.
Figure 19:
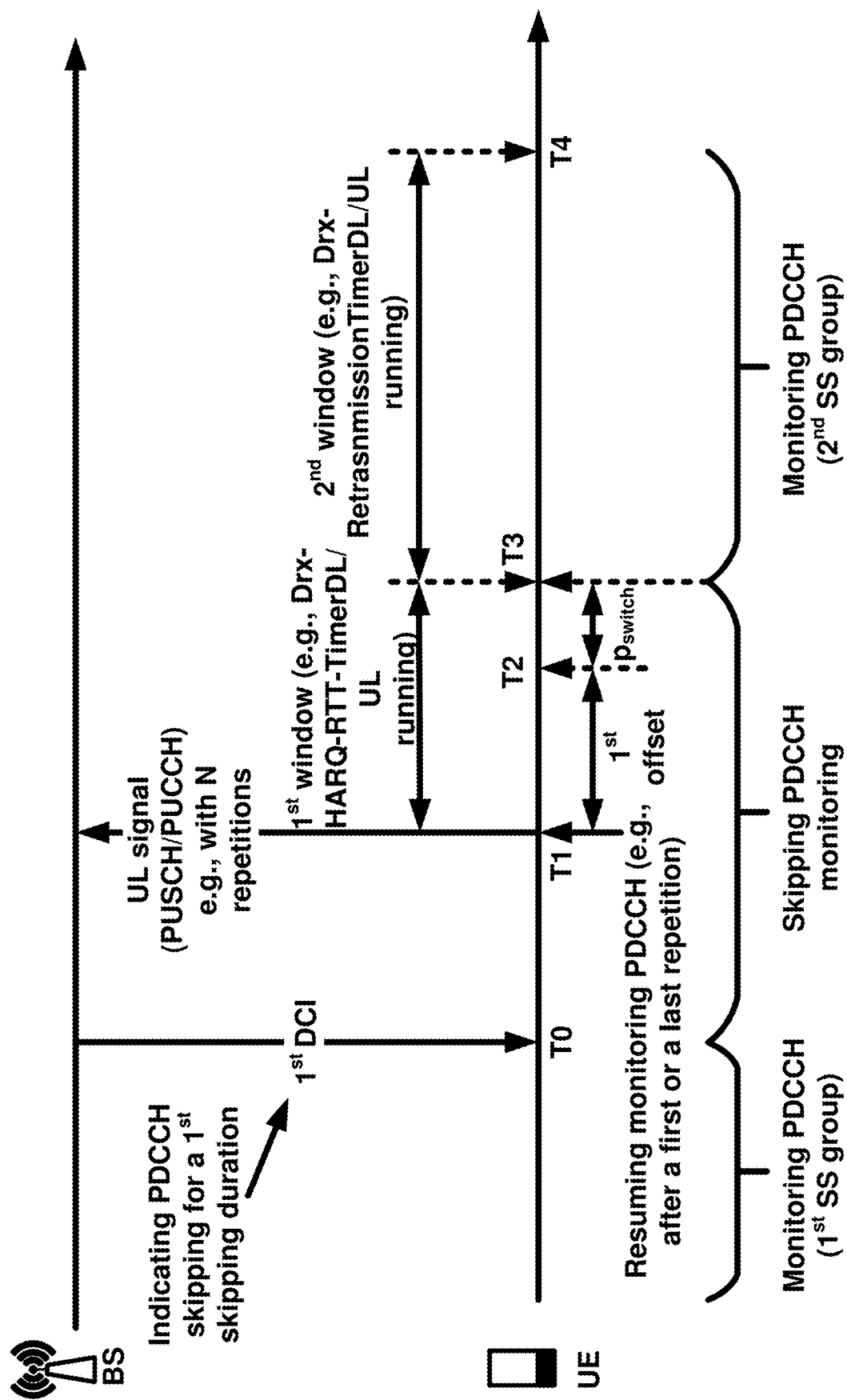
FIG. 19 shows an example embodiment of a PDCCH monitoring procedure in wireless communications systems per an aspect of the present disclosure.
Figure 20:
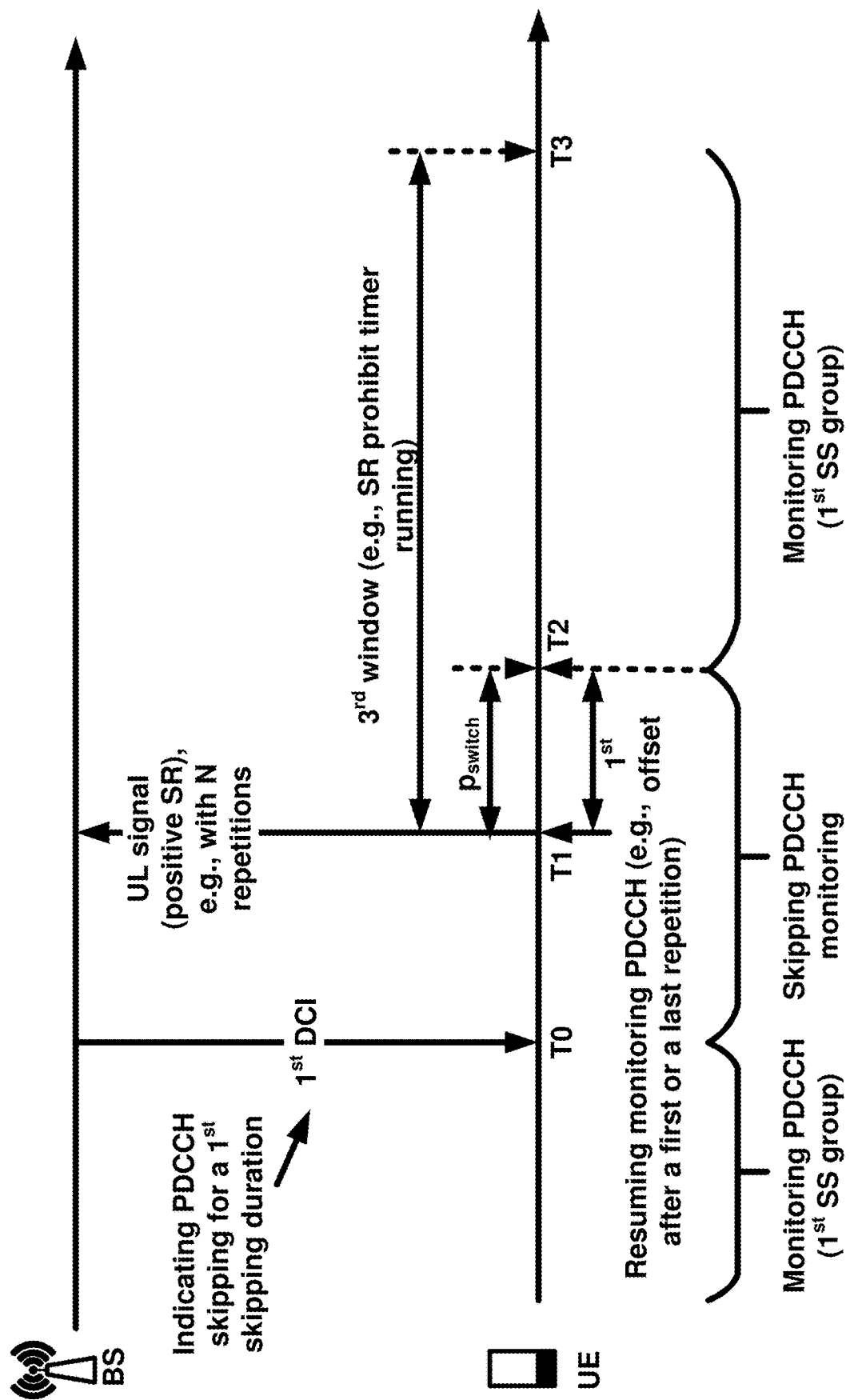
FIG. 20 shows an example embodiment of a PDCCH monitoring procedure in wireless communications systems per an aspect of the present disclosure.

FIG. 18 shows a flowchart of a method/procedure for PDCCH monitoring in wireless communication systems. FIG. 19 shows an example embodiment of a PDCCH monitoring procedure in wireless communications systems per an aspect of the present disclosure. FIG. 20 shows an example embodiment of a PDCCH monitoring procedure in wireless communications systems per an aspect of the present disclosure. For example, FIG. 19 and FIG. 20 may show example implementations of the method/procedure of the FIG. 18 at/in a wireless device (e.g., an XR device) and/or the base station. In some scenarios, FIGS. 18-20 may show example embodiments for determining a SS group for monitoring the PDCCH, e.g., on an active DL BWP for at least one serving cell, e.g., the serving cell. In some other scenarios, FIGS. 18-20 may show a procedure for implicitly/explicitly switching across multiple SS groups (e.g., switching from a first SS group to a second SS group), e.g., after transmission of an UL signal (e.g., PUCCH/PUSCH) and when the wireless device is skipping the PDCCH monitoring. For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 18, the wireless device may, from the base station, receive the one or more configuration parameters (e.g., the one or more RRC configuration parameters). The one or more configuration parameters may, for example, comprise one or more serving cell (e.g., the one or more Serving Cells or the one or more cells) configuration parameters (e.g., ServingCellConfigCommon, ServingCellConfigCommonSIB, and/or ServingCellConfig) for configuring one or more cells (e.g., one or more serving cells, e.g., the one or more Serving Cells). For example, the one or more cells may comprise a master (or primary) cell group (MSG) and/or a secondary cell group (SCG). In some cases, a cell of the one or more cells may be a primary secondary cell (PSCell), or a primary cell (PCell), or a secondary cell (SCell), or a special cell (SpCell). In some other cases, a cell of the one or more cells may belong to a first cell group corresponding to a primary TAG (pTAG) or a second cell group corresponding to a secondary TAG (sTAG). For example, the one or more configuration parameters may configure the wireless device for multi-cell communication and/or carrier aggregation (CA).

The one or more configuration parameters (e.g., the one or more RRC configuration parameters) may comprise one or more BWP configuration parameters (e.g., BWP-DownlinkDedicated IE), e.g., of a downlink (DL) BWP (e.g., initial downlink BWP) of a serving cell and/or of an UL BWP of the serving cell. The one or more WBP configuration parameters (e.g., of the downlink BWP) may comprise: one or more PDCCH configuration parameters (e.g., for PDCCH of the downlink BWP, e.g., in pdcch-Config IE and/or PDCCH-ServingCellConfig IE applicable for all downlink BWPs of the serving cell), and one or more other parameters. In an example, the one or more PDCCH configuration parameters may comprise the one or more SSS switching configuration parameters and/or the one or more SS configuration parameters.

The one or more configuration parameters may indicate/configure at least two SS groups for monitoring PDCCH (e.g., on an active DL BWP for at least one serving cell, e.g., the serving cell). The wireless device may determine a slot and a symbol in a slot to start or stop PDCCH monitoring according to SSSs (e.g., corresponding a SS group of the at least two SS groups) for a serving cell that the wireless device is provided searchSpaceGroupldList or, if cellGroupsForSwitchList is provided, for a set of serving cells, based on the smallest SCS configuration μ among all configured DL BWPs in the serving cell or in the set of serving cells and, if any, in the serving cell where the wireless device receives a PDCCH. The one or more configuration parameters may configure/provide/indicate group indexes for a Type3-PDCCH CSS set or USS set (e.g., by searchSpaceGroupldList-r17) for PDCCH monitoring on an active DL BWP of the at least one serving cell.

As shown in FIG. 18, the one or more PDCCH configuration parameters may comprise a set of skipping durations (e.g., by PDCCHSkippingDurationList), e.g., a first skipping duration, for PDCCH skipping. The set of skipping durations (or skipping windows) may comprise at least one skipping duration (e.g., the first skipping duration). The PDCCHSkippingDurationList may indicate one or more skipping values corresponding to the set of skipping durations in unit of slots (or symbols or ms). For the 15 kHz SCS, for each value of the one or more skipping values, only a first 26 skipping values may be valid (or applicable/allowable), e.g., corresponding to {1, 2, 3, . . . , 20, 30, 40, 50, 60, 80, 100} slots (or symbols or ms). For the 30 kHz SCS, for each value of the one or more skipping values, only a first 46 skipping values may be valid (or applicable/allowable), e.g., corresponding to {1, 2, 3, . . . , 40, 60, 80, 100, 120, 160, 200} slots (or symbols or ms). For the 60 kHz SCS, for each value of the one or more skipping values, only the first 86 skipping values may be valid (or applicable/allowable), e.g., corresponding to {1, 2, 3, . . . , 80, 120, 160, 200, 240, 320, 400}. For the 120 kHz SCS, for each value of the one or more skipping values, the 166 skipping values correspond to {1, 2, 3, . . . , 160, 240, 320, 400, 480, 640, 800} slots (or symbols or ms). For the 480 kHz SCS, for each value of the one or more skipping values, the 166 skipping values correspond to {4, 8, 12, . . . , 640, 960, 1280, 1600, 1920, 2560, 3200}. For the 960 kHz SCS, for each value of the one or more skipping values, the 166 values correspond to {8, 16, 24, . . . , 1280, 1920, 2560, 3200, 3840, 5120, 6400} slots (or symbols or ms).

As shown in FIG. 18, the wireless device may monitor the PDCCH according to a first SS group of the at least two SS groups (e.g., prior to receiving a second DCI at time/occasion T0 in FIG. 19 and FIG. 20), e.g., for the at least one serving cell. The wireless device may monitor the PDCCH (or according to) on the first SS group (e.g., with a first group index) based on configuration of SS groups (e.g., the one or more SS configuration parameters) of a BWP of a cell (e.g., the active DL BWP of the serving cell). In an example, the first SS group may comprise at least one or more first SSSs, e.g., one or more Type3-PDCCH CSS sets and/or one or more USS sets, on the active DL BWP of the at least one serving cell (e.g., the serving cell). In an example, the second SS group may comprise at least one or more second SSSs, e.g., one or more Type3-PDCCH CSS sets and/or one or more USS sets, on the active DL BWP of the at least one serving cell (e.g., the serving cell).

As shown in FIGS. 18-20, the wireless device may, while monitoring the PDCCH according to the first SS group (e.g., for the at least one serving cell), receive (e.g., from the base station on a DL (active) BWP of the serving cell) a first DCI, e.g., at time/occasion/interval T0. For example, T0 in FIG. 20 may indicate a last/final/ending/latest symbol of a PDCCH reception (e.g., comprising repetition) time/occasion/resource carrying/with the first DCI. The first DCI may indicate skipping PDCCH (e.g., skipping/stopping/avoiding/aborting/cancelling monitoring PDCCH or skipping/stopping/avoiding/aborting/cancelling monitoring control channels, and/or skipping/stopping/avoiding/aborting/cancelling monitoring PDCCH candidates), e.g., within/during/for the first skipping window/duration (e.g., $T_{skip}$ slots/symbols/milliseconds), e.g., on the DL BWP of the serving cell. In some examples, a time value for (or a length of) the first skipping window may be indicated by the first DCI. For example, the first DCI may comprise a first filed with a plurality of bits (e.g., with a bit-width of 0, 1, or 2 bits, or greater than 2 bits). The first field may be a PDCCH skipping indication field (e.g., a 'PDCCH monitoring adaptation indication' field). The first filed may be a PDCCH skipping/stopping/aborting/avoiding/cancelling filed. The first field may be a SSSG switching field. A codepoint of the PDCCH skipping indication field may indicate a number of slots for the wireless device to skip monitoring the PDCCH (e.g., the length of the first skipping duration). The wireless device may determine the first skipping duration (or the time value) from the 'PDCCH monitoring adaptation indication' field of the first DCI and/or the one or more configuration parameters (e.g., PDCCHSkippingDurationList). For example, the serving cell may be a SpCell.

In some cases (e.g., when searchSpaceGroupIdList-r17 is not configured by the one or more PDCCH configuration parameters), the set of skipping durations may have cardinality of one (e.g., PDCCHSkippingDurationList may indicate one skipping value). The bit-width of the PDCCH skipping indication field of the DCI may be 1 bit. The wireless device may determine the first skipping duration (e.g., $T_{skip}$ slots/symbols/milliseconds) being equal to the one skipping value indicated by the PDCCHSkippingDurationList. For example, the set of skipping durations may have cardinality of larger than one (e.g., PDCCHSkippingDurationList may indicate more than one skipping values). The bit-width of the PDCCH skipping indication field of the DCI may be 2 bits. The wireless device may determine the first skipping duration (e.g., $T_{skip}$ slots/symbols/milliseconds) based on the field value of the PDCCH skipping indication field of the DCI, e.g., by selecting one skipping value from the more than one skipping value indicated by the PDCCHSkippingDurationList.

In some other cases (e.g., when searchSpaceGroupIdList-r17 is configured by the one or more PDCCH configuration parameters), the bit-width of the PDCCH skipping indication field of the DCI may be 2 bits. A '10' value for the bits of the PDCCH skipping indication field of the DCI may indicate skipping the PDCCH monitoring for the first skipping duration provided/indicated by a first skipping value in the set of skipping durations (e.g., initial/starting time duration of the at least one time duration). A '11' value for the bits of the PDCCH skipping indication field of the DCI may indicate skipping the PDCCH monitoring for the first skipping duration provided/indicated by a second skipping value in the set of skipping durations.

In some implementations, the DCI may schedule/indicate transmission of UL/DL data (e.g., TBs and/or MAC PDUs). In other implementations, the DCI may be a non-scheduling DCI (e.g., not scheduling transmission of UL/DL data and/or scheduling transmission of dummy data). The first DCI may have a DCI format 0_1 and a DCI format 0_2 (e.g., scheduling PUSCH transmissions) or may have a DCI format 11 and a DCI format 12 (scheduling PDSCH receptions).

As shown in FIGS. 18-20, in response to/based on/after receiving the first DCI, the wireless device may stop/skip/avoid monitoring PDCCH (candidates) on the DL (active) BWP, e.g., of the serving cell or a set of serving cells of the one or more serving cells. For example, in response to the receiving the first DCI, the wireless device may start skipping of PDCCH monitoring (e.g., stop/skip/avoid monitoring the PDCCH) at a beginning/starting (or a first/initial/earliest symbol) of a first/earliest/starting/initial slot that is after the reception time/occasion of a PDCCH carrying/with the first DCI. Stopping/skipping monitoring PDCCH on the DL (active) BWP of the serving cell may comprise stopping/skipping monitoring the PDCCH on the one or more SSS groups configured on the BWP of the serving cell (e.g., corresponding to the first SS group and/or the at least two SS groups). In an example, during the first skipping duration (or when a timer associated with the first skipping duration is running), the base station may not transmit PDCCH to the wireless device.

As shown in FIG. 20, while the wireless device is skipping PDCCH monitoring (e.g., prior to an expiry of the first skipping duration of ongoing PDCCH skipping) on the DL (active) BWP of the serving cell, the wireless device may transmit an UL signal/channel at time/occasion T2 (e.g., to the base station). The UL signal may be for transmitting a positive SR (e.g., via a PUCCH) and/or for transmitting a NACK (e.g., a HARQ-ACK with negative acknowledgement), corresponding to a PDSCH, and/or for transmitting at least one TB (e.g., via at least one PUSCH). For example, the time/occasion T2 may correspond to a last/final/ending/lates symbol of the UL signal.

The NACK may correspond to a downlink (DL) hybrid automatic repeat request (HARQ). For example, the DL HARQ process may have a DL HARQ process ID/index/ number. The wireless device may, from the base station, receive (e.g., prior to the transmission time/occasion of the UL signal) a first TB (or a first MAC PDU) associated with the DL HARQ process. When the wireless device unsuccessfully decodes the first TB, the wireless device may transmit UCI comprising a negative HARQ acknowledgment (e.g., HARQ-NACK or the NACK) corresponding/associated with the first TB/MAC PDU via the UL signal. For example, the base station may schedule a transmission of the first TB (e.g., via a PDSCH or a PDSCH bundle) based on transmitting a second DCI to the wireless device. In an example, the second DCI may be the first DCI. In another example, the first DCI may be different than the second DCI. In some other examples, the wireless device may receive the first TB based on (or via/using) a DL SPS PDSCH or a DL SPS PDSCH bundle. For example, the one or more configuration parameters (e.g., SPS-Config) may configure the wireless device for receiving the first TB via/using the DL SPS PDSCH or the DL SPS PDSCH bundle. For example, the DL HARQ process may be a feedback enabled HARQ process. The one or more configuration parameters (e.g., PDSCH-ServingCellConfig) may configure the DL HARQ process as feedback-enabled (e.g., via downlinkHARQ-FeedbackDisabled).

In yet another example, the UL signal may carry (or be for transmitting) a second TB (or a second MAC PDU) via/using a PUSCH or a PUSCH bundle, by the wireless device to the base station, corresponding to an UL HARQ process with an UL HARQ process ID/index/number. For example, the wireless device may receive a dynamic UL grant (e.g., prior to the transmission time/occasion of the UL signal) for transmitting the second TB (e.g., based on detecting/receiving a second DCI). For example, the base station may transmit a second DCI indicating/scheduling the dynamic UL grant. In some examples, the second DCI may be the first DCI. In some other examples, the second DCI may be different than the first DCI. For example, the wireless device may transmit the second TB (or the MAC PDU) via/using a configured UL grant (e.g., a configured grant Type 1 or a configured grant Type 2). For example, the one or more configuration parameters (e.g., ConfiguredGrantConfig) may configure the configured UL grant. In an example, the one or more configuration parameters (e.g., via uplinkHARQ-Mode in PUSCH-ServingCellConfig IE) may configure/indicate the UL HARQ process with a HARQ mode A (e.g., HARQmodeA).

In an example, the UL signal may correspond to a PDU (e.g., a MAC/RLC/PDCP PDU) of a PDU Set or a logical channel corresponding to the PDU Set. For example, the wireless device may trigger the SR due to arrival of a PDU Set or one or more PDUs of the PDU Set (e.g., corresponding to the logical channel). In another example, the first MAC PDU (and/or a second MAC PDU) may belong to a PDU Set (or correspond to the logical channel). For example, the first MAC PDU (and/or a second MAC PDU) may correspond to an XR traffic and/or a data burst.

In an example embodiment, as shown in FIG. 18, in response to/based on (or after) the transmission of the UL signal, the wireless device may resume/start the PDCCH monitoring (e.g., terminate the PDCCH skipping). For example, the wireless device may determine an SS group of the at least two SS groups for the PDCCH monitoring. For example, the wireless device may determine whether to switch from the first SS group to the second SS group of the at least two SS groups, e.g., after a first offset from the transmission occasion of the UL signal (see, e.g., FIG. 19 and FIG. 20). As shown in FIG. 18 (see also FIG. 19 and FIG. 20), the wireless device may monitor the PDCCH (after the transmission of the UL signal), e.g., on the active BWP of the at least one serving cell, according to the second SS group. For example, a group index of the second SS group may be greater than 0. In some examples, the second SS group may be the first SS group (e.g., the group index of the second SS group is equal to the group index of the first SS group). For example, the group index of the first SS group may be greater than 0.

The wireless device may, based on a PDU Set information and/or a PDU Set related assistance information, determine whether to resume/start the PDCCH monitoring (or terminate the PDCCH skipping) after the transmission of the UL signal. For example, the wireless device may determine an SS group (and/or an index group of the SS group) of the at least two SS groups for the PDCCH monitoring (e.g., in response to terminating the PDCCH skipping). In another example, the wireless device may determine whether to switch from the first SS group to the second SS group (e.g., in response to terminating the PDCCH skipping). For example, the UL signal may correspond to a PDU of the PDU Set (e.g., an End PDU of the PDU Set). In another example, a delay budget (PDB or remaining time) of the UL signal (or corresponding to a PDU of the PDU Set) may be smaller than a threshold. In one example, based on the PDU of the PDU Set being the End PDU of the PDU Set and/or the delay budget of the PDU being smaller than the threshold, the wireless device may, after transmitting the UL signal, resume the PDCCH monitoring (e.g., according to the first SS group). For example, the first SS group may be a dense SS group. In another example, based on the PDU of the PDU Set not being the End PDU of the PDU Set (or not receiving the End of the data burst indication) and/or the delay budget of the PDU being greater than the threshold, the wireless device may not resume the PDCCH monitoring after the transmission of the UL signal. In yet other example, based on the PDU of the PDU Set not being the End PDU of the PDU Set (or not receiving the End of the data burst indication) and/or the delay budget of the PDU being greater than the threshold, the wireless device may, after the transmission of the UL signal, resume the PDCCH monitoring according to the second SS group. For example, the second SS group may be a sparce SS group or the default SS group. The one or more configuration parameters may configure the threshold.

In some implementations, in response to/based on the transmission of the UL signal, the wireless device may resume/start monitoring the PDCCH (e.g., for the at least one serving cell) according to the first SS group, e.g., the wireless device may not switch from the first SS group (e.g., the wireless device may keep monitoring the P DCCH according to the first SS group). In some cases, the wireless device may determine a SS switch timer (e.g., searchSpaceSwitchTimer IE) being running at the time/occasion of the UL signal transmission and/or an occasion for resuming the PDCCH monitoring (e.g., when the first group index is greater than 0). In one example, the wireless device may decrement (or keep decrementing) the SS switch timer by one after each slot based on a reference SCS. In another example, the wireless device may reset (or restart) the SS switch timer.

In some other cases, the wireless device may determine the SS switch timer (e.g., searchSpaceSwitchTimer IE) being running at the time/occasion of receiving the first DCI (e.g., indicating the PDCCH skipping). For example, the wireless device may skip/avoid/stop decrementing the SS switch timer during the first skipping duration (e.g., after receiving the first DCI). In an example, the wireless device may resume/start decrementing (or keep decrementing) the SS switch timer by one after each slot based on a reference SCS after transmitting the UL signal.

In other implementations, the wireless device may determine the SS switch timer not being running. For example, the SS switch timer may be expired prior to the transmission occasion of the UL signal. For example, the first group index may be greater than 0. In an example embodiment, in response to/based on the transmission of the UL signal, the wireless device may resume/start monitoring the PDCCH (e.g., for the at least one serving cell) according to the first SS group. For example, the wireless device may not switch to the second SS group.

In yet other implementations, the wireless device may determine the SS switch timer not being running. For example, the first group index may be 0. In an example embodiment, in response to/based on the transmission of the UL signal, the wireless device may resume/start monitoring the PDCCH (e.g., for the at least one serving cell) according to the second SS group. For example, the second group index may be greater than 0. For example, the wireless device may start the SS switch timer.

In an example embodiment, the wireless device may determine the first offset based on the SS switching delay and/or a first value. For example, the first value may be based on (or equal to) the round-trip transmission delay (RTT) between the wireless device and the base station. FIG. 19 shows one example of the first offset and FIG. 20 shows another example of the first offset.

As shown in FIG. 18, when the wireless device transmits the NACK or the at least one TB via the PUSCH, the first offset may be based on the length of a timer or a first duration (e.g., the first value) and the SS switching delay. For example, the timer may be a drx-HARQ-RTT-TimerUL (e.g., corresponding to a first UL HARQ process for UL transmission) or drx-HARQ-RTT-TimerDL (e.g., corresponding to a first DL HARQ process for DL transmission). The first duration may correspond to a duration that the timer is running. For example, when the first value is greater than the SS switching delay, the first offset may be a distraction of the SS switching delay from the first value (e.g., the length of the timer). In another example, when the when the first value is smaller than the SS switching delay, the first offset may be equal to the SS switching delay.

As shown in FIG. 20, the wireless device may prepare for switching (or switch) to the first SS group a first/starting/initial/earliest slot (or of a group of slots) that is at least the first offset from/after a last/final/ending/latest symbol of the UL signal transmission occasion. For example, the wireless device may start/resume monitoring the PDCCH (e.g., for the at least one serving cell), when a second duration is started (e.g., at time T3 in FIG. 19), according to the second SS group. The second duration may correspond to a duration of a drx-Retransmission TimerUL (e.g., corresponding to the first UL HARQ process) is running or a drx-RetransmissionTimerDL (e.g., corresponding to the first DL HARQ process) is running. As shown in FIG. 19, the wireless device may monitor the PDCCH (e.g., for the at least one serving cell) according to the second SS group during the second duration, e.g., between time T3 and T4 in FIG. 19 (e.g., when the drx-Retransmission TimerUL (e.g., corresponding to the first UL HARQ process) is running and/or a drx-RetransmissionTimerDL (e.g., corresponding to the first DL HARQ process) is running.

As shown in FIG. 20, when the wireless device transmits the positive SR via the PUCCH, the first offset may be the SS switching delay. As shown in FIG. 20, the wireless device may prepare for switching (or switch) to the second SS group a first/starting/initial/earliest slot (or of a group of slots) that is at least the first offset from/after a last/final/ending/latest symbol of the UL signal transmission occasion. For example, the wireless device may start monitoring the PDCCH (e.g., for the at least one serving cell), when a third duration is started (e.g., at time T2 in FIG. 20), according to the first SS group. The third duration may correspond to a duration of an SR prohibit timer corresponding to the transmitted SR. As shown in FIG. 20, the wireless device may monitor the PDCCH (e.g., for the at least one serving cell) according to the second SS group during the third duration, e.g., between time T2 and T3 in FIG. 20 (e.g., when the SR prohibit timer is running).

In some cases, transmission of the UL signal may comprise transmitting N>1 repetitions of the UL signal/channel. The wireless device may determine the number of repetitions (e.g., N) from the one or more configuration parameters (e.g., higher layer parameters and/or a DCI triggering the transmission of the UL signal). For example, the wireless device may determine the number of repetitions (e.g., N) of the PUCCH transmission (e.g., for transmission of the positive SR or the NACK) based on a configuration parameter, e.g., nrofSlots (e.g., a higher layer parameter $N_{PUCCH}^{repeat}$) indicated/configured by the one or more configuration parameters (e.g., PUCCH-Config). In other examples, the wireless device may determine the number of repetitions N (e.g., for PUSCH repetition Type B/A) based on a configuration parameter (e.g., numberOfRepetitions and/or pusch-AggregationFactor) indicated/configured by the one or more configuration parameters (e.g., PUSCH-Config).

In an example embodiment, as shown in FIG. 19 and FIG. 20, when the transmission of the UL signal/channel (e.g., PUCCH/PUSCH) comprises N>1 repetitions, the wireless device may resume the PDCCH monitoring (or terminate the PDCCH skipping) after a last/final/ending/latest symbol of a last/final/ending/latest PUCCH/PUSCH transmission of/among the N repetitions of the UL signal (e.g., PUCCH/PUSCH), e.g., the UL transmission occasion corresponds to the first PUCCH/PUSCH transmission of the N repetitions. For example, the base station may configure the wireless device (e.g., via the one or more configuration parameters) with a parameter, e.g., to determine an occasion for resuming the PDCCH monitoring. For example, the parameter may be a drx-LastTransmissionUL or the like. In another example, the parameter may be different than the drx-LastTransmissionUL (e.g., may be configured by the one or more PDCCH configuration parameters). Based on the parameter being configured/indicated (or being enabled), the wireless device may consider the last/final/ending/lates repletion of the UL signal among/of the N repetitions (or bundle) to determine an occasion/resource (e.g., symbol/slot) for resuming the PDCCH monitoring.

In an example embodiment, as shown in FIG. 19 and FIG. 20, when the transmission of the UL signal/channel (e.g., PUCCH/PUSCH) comprises N>1 repetitions, the wireless device may resume the PDCCH monitoring from/after a last/final/ending/latest symbol of a first/initial/starting/earliest PUCCH/PUSCH transmission of/among the N repetitions (or bundle) of the UL signal (e.g., PUCCH/PUSCH), e.g., UL transmission occasion corresponds to the last PUCCH/PUSCH transmission of the N repetitions. For example, the wireless device may determine the parameter not being configured (or not being enabled or being disabled).

For example, the base station may, after receiving the UL signal, transmit one or more PDCCHs (e.g., based on the second SS group) to the wireless device. In some examples, the base station may wait for receiving the N repetitions of the UL signal to resume transmitting the one or more PDCCHs (e.g., when the parameter is configured/enabled). In some other examples, the base station may start transmitting the one or more PDCCHs after detecting/decoding the UL signal (e.g., after a first/initial repetition of the UL signal), e.g., when the parameter is not configured/enabled or is disabled.

Some example embodiments may allow reducing UL/DL transmission delay by switching to the first SS group after the transmission of an UL signal.

Figure 21:
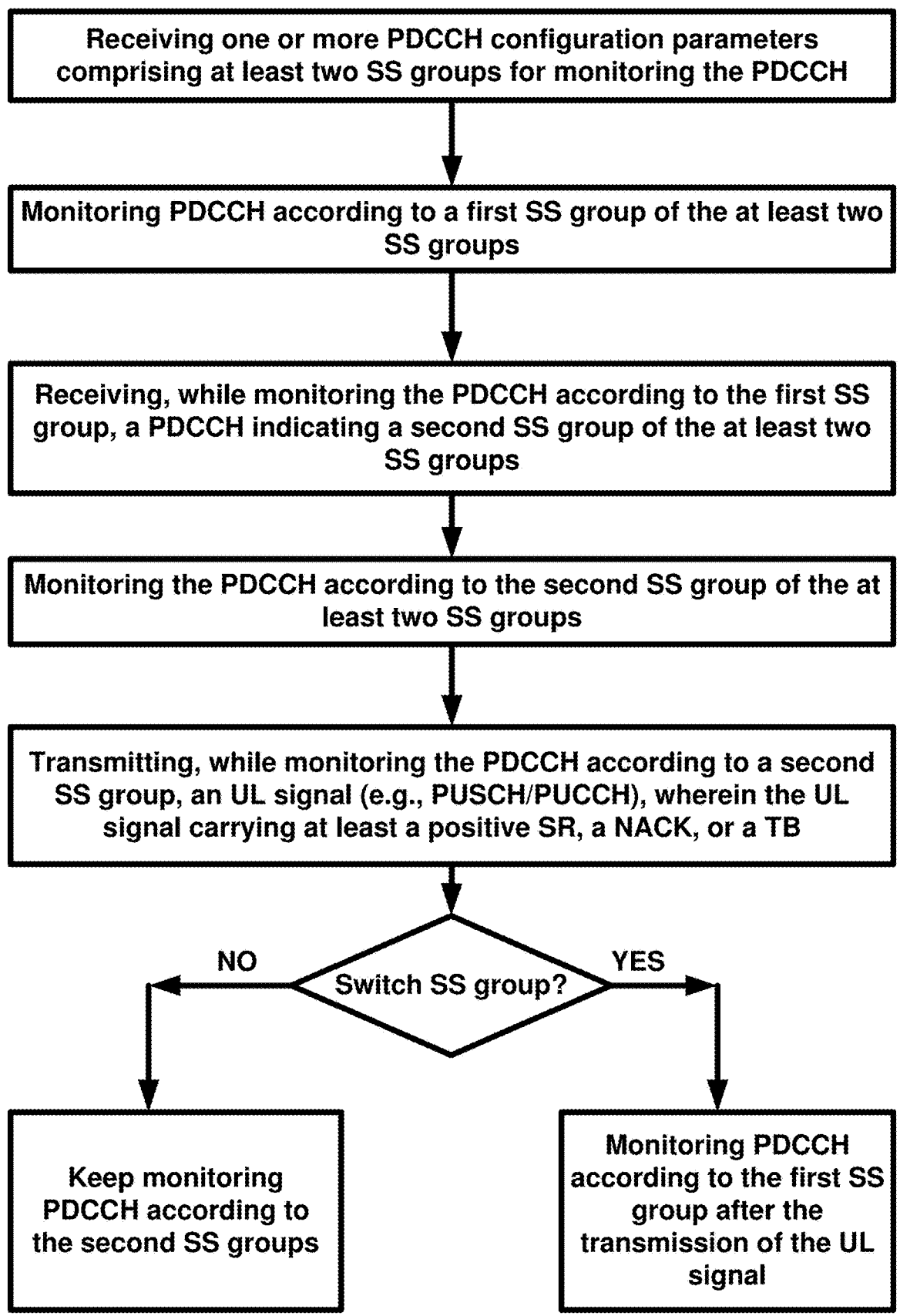
FIG. 21 shows a flowchart of a method/procedure for PDCCH monitoring in wireless communication systems.
Figure 22:
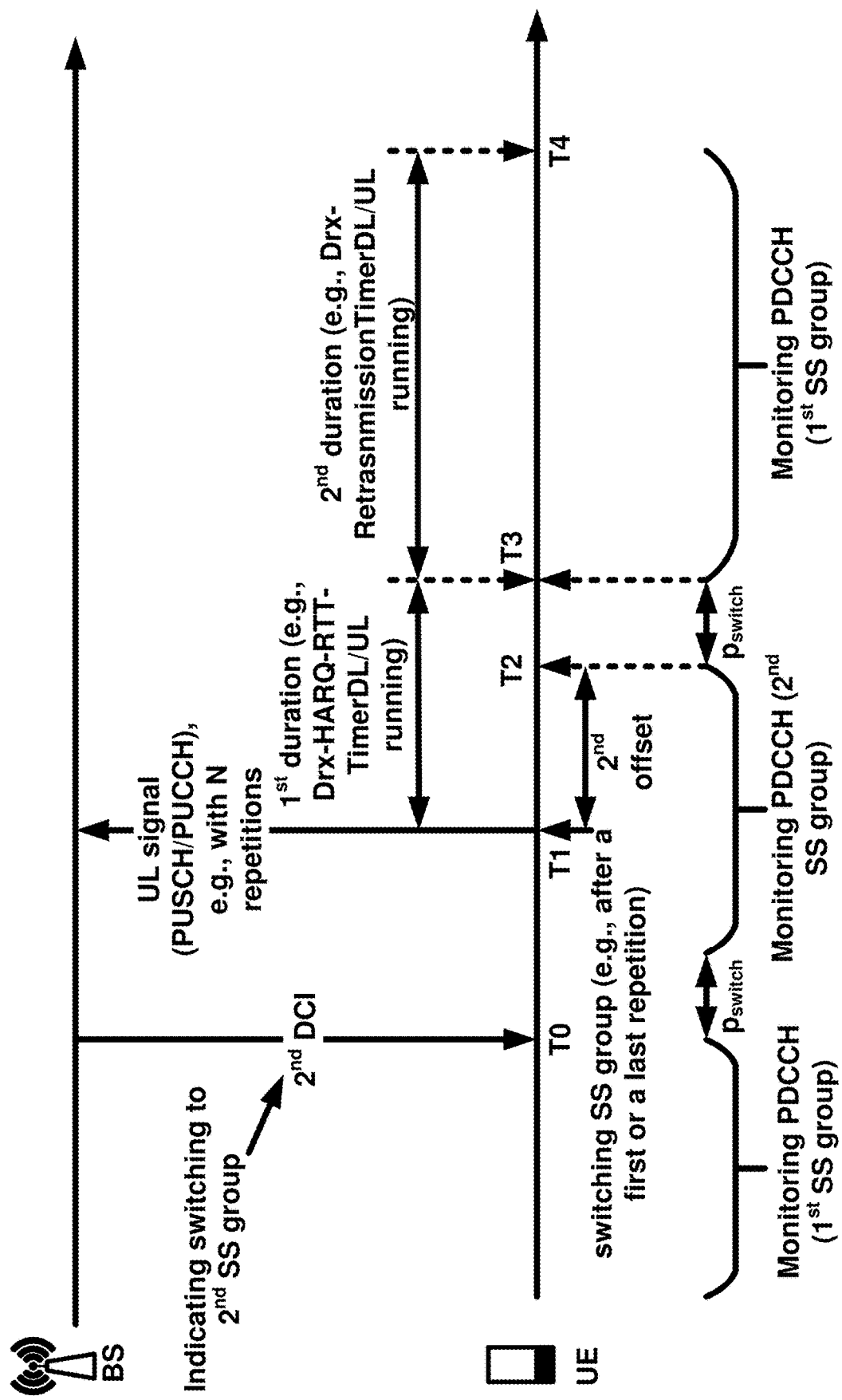
FIG. 22 shows an example embodiment of a PDCCH monitoring in wireless communication systems per an aspect of the present disclosure.
Figure 23:
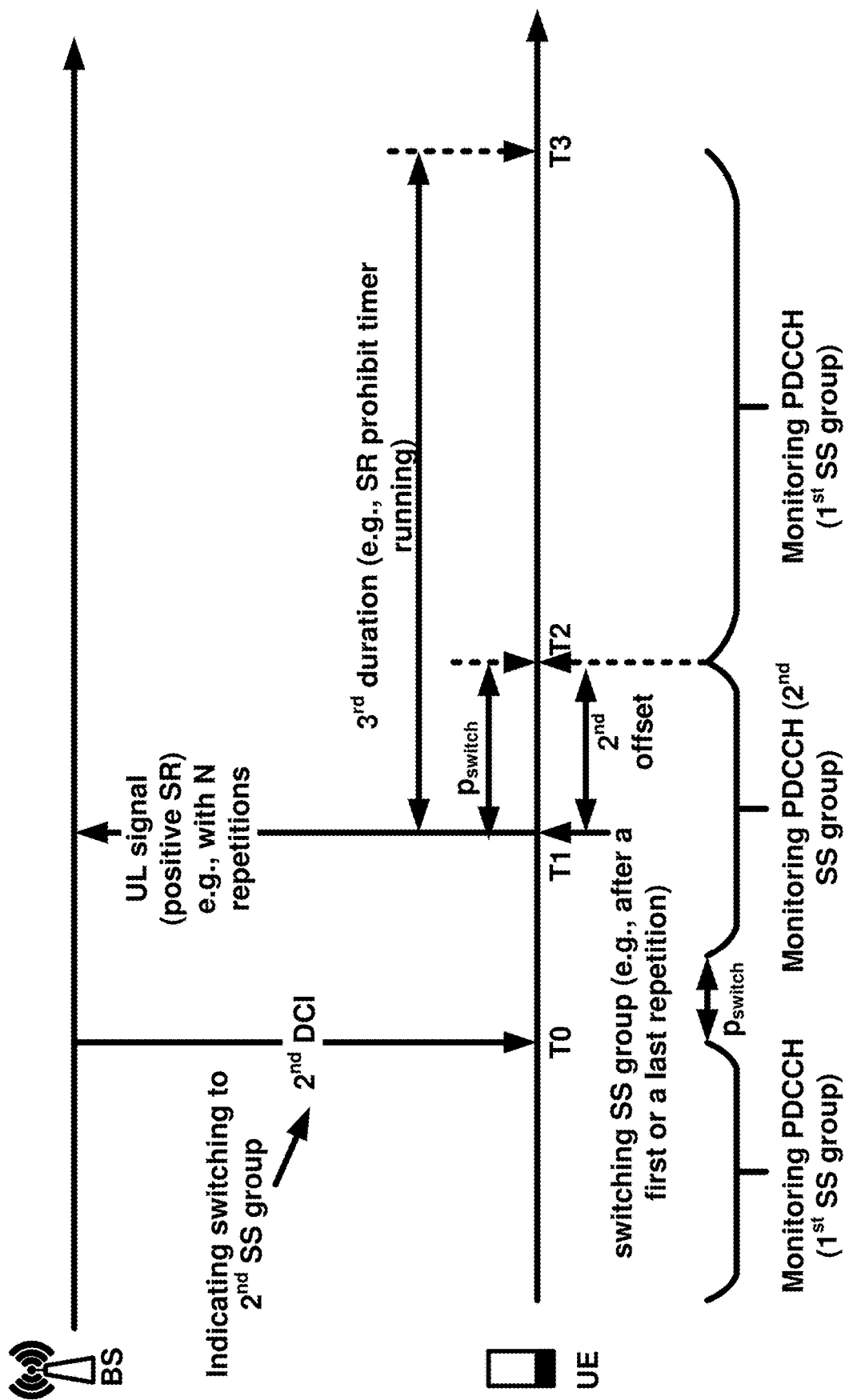
FIG. 23 shows an example embodiment of a PDCCH monitoring in wireless communication systems per an aspect of the present disclosure.

FIG. 21 shows a flowchart of a method/procedure for PDCCH monitoring in wireless communication systems. FIG. 22 shows an example embodiment of a PDCCH monitoring in wireless communication systems per an aspect of the present disclosure. FIG. 23 shows an example embodiment of a PDCCH monitoring in wireless communication systems per an aspect of the present disclosure. For example, FIG. 22 and FIG. 23 may show example implementations of the method/procedure of the FIG. 21 at/in a wireless device (e.g., an XR device) and/or the base station. In some scenarios, FIGS. 21-23 may show example embodiments for determining a SS group for monitoring the PDCCH, e.g., on an active DL BWP for at least one serving cell, e.g., the serving cell. In some other scenarios, FIGS. 21-23 may show a procedure for implicitly/explicitly switching across multiple SS groups (e.g., switching from a first SS group to a second SS group), e.g., after transmission of an UL signal (e.g., PUCCH/PUSCH). For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 21, the wireless device may, from the base station, receive the one or more configuration parameters (e.g., the one or more RRC configuration parameters). The one or more configuration parameters may, for example, comprise the one or more serving cell (e.g., the one or more Serving Cells or the one or more cells) configuration parameters (e.g., ServingCellConfigCommon, ServingCellConfigCommonSIB, and/or ServingCellConfig) for configuring one or more cells (e.g., one or more serving cells, e.g., the one or more Serving Cells). The one or more configuration parameters may comprise the one or more BWP configuration parameters (e.g., BWP-DownlinkDedicated IE), e.g., of a downlink (DL) BWP (e.g., initial downlink BWP) of a serving cell and/or of an UL BWP of the serving cell. For example, the one or more configuration parameters may comprise the one or more PDCCH configuration parameters (e.g., for PDCCH of the downlink BWP, e.g., in pdcch-Config IE and/or PDCCH-ServingCellConfig IE applicable for all downlink BWPs of the serving cell), and/or the one or more SSS switching configuration parameters, and/or the one or more SS configuration parameters.

As shown in FIG. 21, the one or more configuration parameters may comprise the one or more PDCCH configuration parameters, e.g., indicating/configuring at least two SS groups for monitoring PDCCH (e.g., on an active DL BWP for at least one serving cell, e.g., the serving cell). The wireless device may determine a slot and a symbol in a slot to start or stop PDCCH monitoring according to SSSs (e.g., corresponding a SS group of the at least two SS groups) for a serving cell that the wireless device is provided searchSpaceGroupIdList or, if cellGroupsForSwitchList is provided, for a set of serving cells, based on the smallest SCS configuration μ among all configured DL BWPs in the serving cell or in the set of serving cells and, if any, in the serving cell where the wireless device receives a PDCCH. The one or more configuration parameters may configure/provide/indicate group indexes for a Type3-PDCCH CSS set or USS set (e.g., by searchSpaceGroupIdList-r17) for PDCCH monitoring on an active DL BWP of the at least one serving cell.

For example, the wireless device may monitor the PDCCH according to a first SS group of the at least two SS groups (e.g., prior to receiving a second DCI at time/occasion T0 in FIG. 22 and FIG. 23), e.g., for the at least one serving cell. The wireless device may monitor the PDCCH (or according to) on the first SS group (e.g., with a first group index) based on configuration of SS groups (e.g., the one or more SS configuration parameters) of a BWP of a cell (e.g., the active DL BWP of the serving cell). In an example, the first SS group may comprise at least one or more first SSSs, e.g., one or more Type3-PDCCH CSS sets and/or one or more USS sets, on the active DL BWP of the at least one serving cell (e.g., the serving cell).

As shown in FIGS. 21-23, the wireless device may, while monitoring the PDCCH according to the first SS group, e.g., for the at least one serving cell, receive the second DCI (e.g., at time/occasion T0 in FIG. 22 and FIG. 23). For example, the second DCI may indicate the second SS group and/or switching to the second SS group. For example, the second DCI may comprise the first field (e.g., a PDCCH monitoring adaption indication field), e.g., indicating a second SS group of the at least two SS groups. In an example, the second SS group may comprise at least one or more second SSSs, e.g., one or more Type3-PDCCH CSS sets and/or one or more USS sets, on the active DL BWP of the at least one serving cell (e.g., the serving cell).

The second DCI may have a DCI format 0_1 and a DCI format 0_2 (e.g., scheduling PUSCH transmissions) or may have a DCI format 1_1 and a DCI format 1_2 (scheduling PDSCH receptions). For example, the PDCCH monitoring adaptation field (e.g., the first field) of the second DCI may be 1 bit or 2 bits, e.g., corresponding to/for the at least one serving cell (e.g., the serving cell).

In some examples, the one or more configuration parameters may not indicate/comprise PDCCHSkippingDurationList, e.g., for the active DL BWP of the serving cell. The second group index may be 0, e.g., when the first field of the second DCI has 1 bit with a '0' value or when the first field of the second DCI has 2 bits with a '00' value. The second group index may, for example, be 1, e.g., when the first field of the second DCI has 1 bit with a '1' value or when the first field of the second DCI has 2 bits with a '01' value. In another example, the second group index may, for example, be greater than 1 (e.g., 2), e.g., when the first field of the second DCI has 2 bits with a '10' value or '11'.

In some other examples, the one or more configuration parameters may indicate/comprise PDCCHSkippingDurationList, e.g., for the active DL BWP of the serving cell. The second group index may be 0, e.g., when the first field of the second DCI has 2 bits with a '00' value. The second group index may, for example, be 1, e.g., when the first field of the second DCI has 2 bits with a '01' value.

The wireless device may be provided by SearchSpaceSwitch Trigger (e.g., via the one or more configuration parameters) with a location of a search space set group (SSG) switching flag field for a serving cell in a DCI format 2_0. When switchTriggerToAddModList is configured, the second DCI (e.g., with a DCI format 2_0) may indicate the second SS group (e.g., via a location of a SSG switching flag field). For example, a bit, of a search space switching indication bitmap of the second DCI (e.g., DCI format 2_0), may indicate a first value corresponding to the second SS group. The wireless device may switch to the second SS group for at least one serving cell (e.g., the serving cell and/or all cells in a cell group of the one or more cell groups) corresponding to the bit. For example, a DCI (e.g., a DCI format 2_0) may comprise one or more search space set group (or SSG) switching indications (or Search space set group switching flags). The DCI format 2_0 may comprise one or more slot format indicator (e.g., slot format indicator 1, slot format indicator 2, . . . slot format indicator N), one or more available RB set indicators, one or more COT duration indications, the one or more SSG switching flags. In an example, each of the one or more SSG switching flags may correspond to a respective cell group of a plurality of cell groups. Each cell group of the plurality of cell groups may comprise one or more cells (e.g., comprising the serving cell). A SSG switching flag, of the one or more SSG switching flags, corresponding to a cell group, may indicate, when setting to the first value, switching from the first SS group to the second SS group for each cell of the cell group. The SSG switching flag may indicate, when setting to a second value, switching from the second SS group to the first SS group for each cell of the cell group. In response to receiving the second DCI, the wireless device may, for the at least one serving cell, start monitoring PDCCH according to the second SS group (e.g., with a second group index) and stops monitoring the PDCCH on (or according to) the first SS group for the serving cell (e.g., at a first/initial/starting/earliest slot (of a group of slots) that is at least $P_{switch}$ (e.g., the SS switching delay) symbols after a last symbol of the PDCCH with/carrying the DCI format 2_0.

In response to receiving the second DCI the wireless device may switch from the first SS group to the second SS group (e.g., at a first/starting/earliest slot that is at least the switching delay from a last/final/ending/latest symbol of a PDCCH with/carrying the second DCI). For example, the wireless device may monitor, based on the second DCI, the PDCCH monitoring (e.g., for the at least one serving cell) according to the second SS group of the at least two SS groups.

As shown in FIGS. 21-23, the wireless device may, while monitoring the PDCCH (e.g., for the at least one serving cell) according to the second SS group (e.g., after receiving the second DCI), transmit the UL signal/channel (e.g., PUCCH/PUSCH), e.g., to the base station. For example, the UL signal may be for transmitting a positive SR (e.g., via a PUCCH) and/or for transmitting a NACK (e.g., a HARQ-ACK with negative acknowledgement) and/or for transmitting at least one TB (e.g., via a PUSCH).

In an example embodiment, as shown in FIG. 21, in response to/based on (or after) the transmission of the UL signal, the wireless device may determine whether to switch from the second SS group or not, e.g., for the at least one serving cell. In an example embodiment, in response to/based on (or after) the transmission of the UL signal, the wireless device may determine a SS group for monitoring the PDCCH for the at least one serving cell. For example, similar to embodiments of FIGS. 18-20, the wireless device may determine whether to switch from the second SS group or not based on the PDU Set information and/or the PDU Set related assistance information.

In one example, as shown in FIG. 21, in response to/based on (or after or regardless of) the transmission of the UL signal, the wireless device may keep monitoring the PDCCH (e.g., for the at least one serving cell) according to the second SS group. The wireless device may not switch from the second SS group. In some cases, the wireless device may determine a SS switch timer (e.g., searchSpaceSwitchTimer IE) being running at the time/occasion of the UL signal transmission (e.g., when the second group index is greater than 0). For example, the wireless device may decrement (or keep decrementing) the SS switch timer by one after each slot based on a reference SCS. In some other cases, the wireless device may determine the group index of the second SS group (e.g., the second group index) being greater than 0 (e.g., the second SS group not being the default SS group).

In another example, as shown in FIG. 21, in response to/based on (or after) the transmitting the UL signal after the receiving the second DCI, the wireless device may switch to the first SS group. The wireless device may switch to the first SS group after a second offset from the transmission occasion of the uplink signal. For example, the wireless device may monitor the PDCCH (e.g., for the at least one serving cell) according to the first SS group of the at least two SS groups. For example, the second group index may be equal to 0. In some examples, the wireless device may determine the SS switch timer not being running.

In an example embodiment, the wireless device may determine the second offset based on the SS switching delay and/or a first value. For example, the first value may be based on (or equal to) the round-trip transmission delay (RTT) between the wireless device and the base station.

FIG. 22 shows one example of the second offset and FIG. 23 shows another example of the second offset.

As shown in FIG. 22, when the wireless device transmits the NACK or the at least one TB via the PUSCH, the second offset may be based on the length of a timer or a first duration (e.g., the first value) and the SS switching delay. For example, the timer may be a drx-HARQ-RTT-TimerUL (e.g., corresponding to a first UL HARQ process for UL transmission) or drx-HARQ-RTT-TimerDL (e.g., corresponding to a first DL HARQ process for DL transmission). The first duration may correspond to a duration that the timer is running. For example, when the first value is greater than the SS switching delay, the second offset may be a distraction of the SS switching delay from the first value (e.g., the length of the timer). In another example, when the when the first value is smaller than the SS switching delay, the second offset may be equal to the SS switching delay.

As shown in FIG. 22, the wireless device may prepare for switching (or switch) to the first SS group a first/starting/initial/earliest slot (or of a group of slots) that is at least the second offset from/after a last/final/ending/latest symbol of the UL signal transmission occasion. For example, the wireless device may start monitoring the PDCCH (e.g., for the at least one serving cell), when a second duration is started (e.g., at time T3 in FIG. 22), according to the first SS group. The second duration may correspond to a duration of a drx-RetransmissionTimerUL (e.g., corresponding to the first UL HARQ process) is running or a drx-Retransmission TimerDL (e.g., corresponding to the first DL HARQ process) is running. As shown in FIG. 21, the wireless device may monitor the PDCCH (e.g., for the at least one serving cell) according to the first SS group during the second duration, e.g., between time T3 and T4 in FIG. 22 (e.g., when the drx-Retransmission TimerUL (e.g., corresponding to the first UL HARQ process) is running and/or a drx-RetransmissionTimerDL (e.g., corresponding to the first DL HARQ process) is running.

As shown in FIG. 23, when the wireless device transmits the positive SR via the PUCCH, the second offset may be the SS switching delay. As shown in FIG. 23, the wireless device may prepare for switching (or switch) to the first SS group a first/starting/initial/earliest slot (or of a group of slots) that is at least the second offset from/after a last/final/ending/latest symbol of the UL signal transmission occasion. For example, the wireless device may start monitoring the PDCCH (e.g., for the at least one serving cell), when a third duration is started (e.g., at time T2 in FIG. 23), according to the first SS group. The third duration may correspond to a duration of an SR prohibit timer corresponding to the transmitted SR. As shown in FIG. 23, the wireless device may monitor the PDCCH (e.g., for the at least one serving cell) according to the first SS group during the third duration, e.g., between time T2 and T3 in FIG. 21 (e.g., when the SR prohibit timer is running.

In some cases, transmission of the UL signal may comprise transmitting N>1 repetitions of the UL signal/channel. The wireless device may determine the number of repetitions (e.g., N) from the one or more configuration parameters (e.g., higher layer parameters and/or a DCI triggering the transmission of the UL signal). For example, the wireless device may determine the number of repetitions (e.g., N) of the PUCCH transmission (e.g., for transmission of the positive SR or the NACK) based on a configuration parameter, e.g., nrofSlots (e.g., a higher layer parameter $N_{PUCCH}^{repeat}$) indicated/configured by the one or more configuration parameters (e.g., PUCCH-Config). In other examples, the wireless device may determine the number of repetitions N (e.g., for PUSCH repetition Type B/A) based on a configuration parameter (e.g., numberOfRepetitions and/or pusch-AggregationFactor) indicated/configured by the one or more configuration parameters (e.g., PUSCH-Config).

In an example embodiment, as shown in FIG. 22 and FIG. 23, when the transmission of the UL signal/channel (e.g., PUCCH/PUSCH) comprises N>1 repetitions, the wireless device may prepare for switching (or switch) to the first SS group a first/starting/initial/earliest slot (or of a group of slots) that is at least the second offset from/after a last/final/ending/latest symbol of a last/final/ending/latest PUCCH/PUSCH transmission of/among the N repetitions of the UL signal (e.g., PUCCH/PUSCH), e.g., the UL transmission occasion may correspond to the last PUCCH/PUSCH transmission of the N repetitions of the UL signal. For example, the base station may configure the wireless device (e.g., via the one or more configuration parameters with a parameter. For example, the parameter may be a drx-LastTransmissionUL or the like. In another example, the parameter may be different than the drx-LastTransmissionUL (e.g., may be configured by the one or more PDCCH/SS configuration parameters). Based on the parameter being configured/indicated (or being enabled), the wireless device may consider the last/final/ending/lates repletion of the UL signal among/of the N repetitions (or bundle) to determine an occasion/resource (e.g., symbol/slot) for performing the SSSG switching.

In an example embodiment, as shown in FIG. 22 and FIG. 23, when the transmission of the UL signal/channel (e.g., PUCCH/PUSCH) comprises N>1 repetitions, the wireless device may prepare for switching (or switch) to the first SS group a first/starting/initial/earliest slot (or of a group of slots) that is at least the second offset from/after a last/final/ending/latest symbol of a first/initial/starting/earliest PUCCH/PUSCH transmission of/among the N repetitions (or bundle) of the UL signal (e.g., PUCCH/PUSCH), e.g., UL transmission occasion may correspond to the first PUCCH/PUSCH transmission of the N repetitions of the UL signal. For example, the wireless device may determine the parameter not being configured (or not being enabled or being disabled).

In some cases, the wireless device may determine a SS switching timer being running, e.g., at the time/occasion that the UL signal is transmitted (e.g., at time T1 in FIG. 22 and FIG. 23). The wireless device may start the SS switching timer based on receiving the second DCI indicating the second SS group (e.g., when an index of the second SS group is greater than 0, e.g., the second SS group is not the default SS group). Based on receiving the second DCI, the wireless device may set a timer value of the SS switching timer to the value provided by the one or more SS configuration parameters (e.g., searchSpaceSwitchTimer). The wireless device may monitor the PDCCH (e.g., for the at least one serving cell) according to one or more SSSs with the second group index (e.g., the second SS group) for a window (e.g., the length of the window, e.g., in units of symbol/slot, or in units of ms, may be indicated by the SS switch timer, e.g., searchSpaceSwitchTimer IE). For example, the wireless device may determine to switch to the first SS group despite/regardless of the SS switching timer is running. In some examples, the first group index may be greater than 0. In some other examples, the first group index may be 0.

In an example embodiment, based on switching from the second SS group to the first SS group (e.g., at time T2 in FIG. 23 or at time T3 in FIG. 22), the wireless device may reset the SS switching timer. For example, an index of the first SS group is greater than 0 (e.g., the first SS group is not the default SS group). The wireless device may set a timer value of the SS switching timer to the value provided by the one or more SS configuration parameters (e.g., searchSpaceSwitchTimer). The wireless device may monitor the PDCCH (e.g., for the at least one serving cell) according to one or more SSSs with the first group index (e.g., the first SS group) for a window (e.g., the length of the window, e.g., in units of symbol/slot, or in units of ms, may be indicated by the SS switch timer, e.g., searchSpaceSwitchTimer).

In another example, based on switching from the second SS group to the first SS group (e.g., at time T2 in FIG. 23 or at time T3 in FIG. 22), the wireless device may stop the SS switching timer (e.g., searchSpaceSwitchTimer IE). For example, an index of the first SS group is equal to 0 (e.g., the first SS group is the default SS group).

In an example embodiment, when the SS switching timer is running and the wireless device is monitoring the PDCCH according to the first SS group (or the second SS group), e.g., on the active DL BWP of the at least one serving cell, the wireless device may reset the SS switching timer after a slot of the active DL BWP of the serving cell based on detecting a third DCI format in a PDCCH reception in the slot for with CRC scrambled by C-RNTI/CS-RNTI/MCS-C-RNTI or an XR-dedicated RNTI (e.g., XR-RNTI or XR-CS-RNTI). In another example, the wireless device may decrement the SS switching timer value by one after a slot of the active DL BWP of the serving cell.

In an example embodiment, the wireless device may, in response to/based on an expiry of the SS switching timer in a first slot (e.g., in a group of slots), monitor the PDCCH on the at least one serving cell according to a SS group with a group index n1, e.g., starting from a second slot. For example, the group index n1 may be 0, e.g., when the expiry occasion of the SS switching timer is outside of a DRX Active Time of a DRX configuration or outside of an XR-dedicated PDCCH monitoring window. In another example, the group index n1 may be greater than 0, e.g., when the expiry occasion of the SS switching timer is within/in a DRX Active Time of a DRX configuration or within/in an XR-dedicated PDCCH monitoring window. For example, the one or more configuration parameters configure/indicate a third SS group (e.g., with the group index n1) of the at least two SS groups. For example, the wireless device may switch to the third SS group in the first slot. The second slot may be at least the SS switching delay after the first slot.

In some examples, the base station may configure/indicate a parameter (e.g., via the one or more configuration parameters) for enabling/configuring the wireless device to switch to the third SS group (e.g., different than the default SS group with the group index 0) in response to the expiry of the SS switch timer. When the parameter is absent (or not configured) or is disabled, the wireless device may switch to the default SS group with the group index 0 in response to the expiry of the SS switch timer. For example, the wireless device may transmit one or more capability messages to the base station, indicating a capability of switching to the third SS group in response to the expiry of the SS switch timer.

Some example embodiments may allow reducing UL/DL transmission delay by switching to the first SS group after the transmission of an UL signal.

Figure 24:
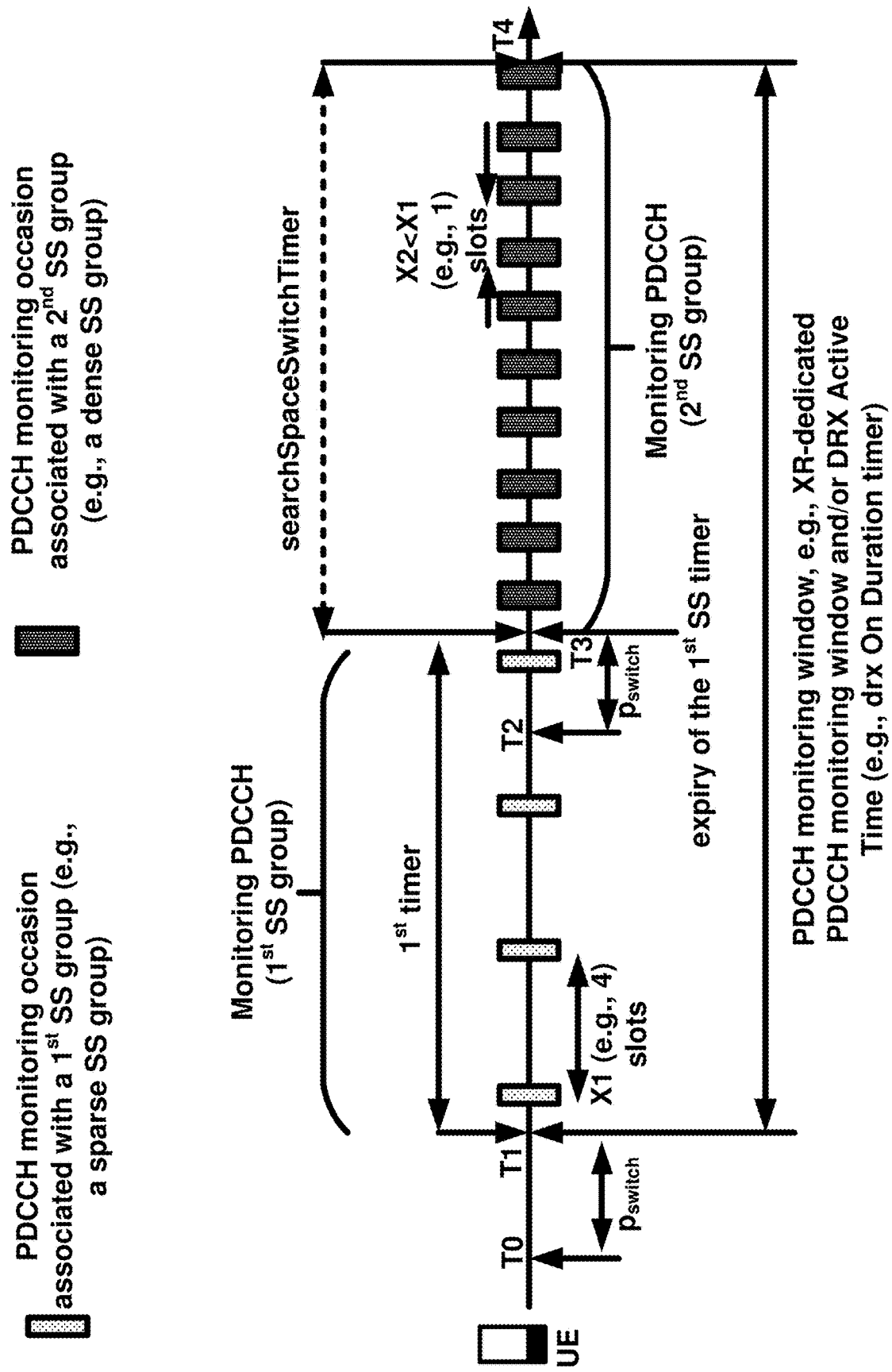
FIG. 24 shows an example embodiment of a PDCCH monitoring in wireless communication systems per an aspect of the present disclosure.

FIG. 24 shows an example embodiment of a PDCCH monitoring in wireless communication systems per an aspect of the present disclosure. For example, FIG. 24 may show an implementation of the method/procedure at/in a wireless device (e.g., an XR device) and/or the base station. In some scenarios, FIG. 24 may show example embodiments for determining a SS group for monitoring the PDCCH during a DRX Active Time of a DRX operation (or an XR-dedicated PDCCH monitoring window), e.g., on an active DL BWP for at least one serving cell, e.g., the serving cell. In some other scenarios, FIG. 24 may show a procedure for implicitly/explicitly switching across multiple SS groups (e.g., switching from a first SS group to a second SS group) during the DRX Active Time of the DRX operation. For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

The wireless device may, from the base station, receive the one or more configuration parameters. The one or more configuration parameters may, for example, comprise the one or more serving cell (e.g., the one or more Serving Cells or the one or more cells) configuration parameters (e.g., ServingCellConfigCommon, ServingCellConfigCommon-SIB, and/or ServingCellConfig) for configuring one or more cells (e.g., one or more serving cells, e.g., the one or more Serving Cells). The one or more configuration parameters may comprise the one or more BWP configuration parameters (e.g., BWP-DownlinkDedicated IE), e.g., of a downlink (DL) BWP (e.g., initial downlink BWP) of a serving cell and/or of an UL BWP of the serving cell. For example, the one or more configuration parameters may comprise the one or more PDCCH configuration parameters (e.g., for PDCCH of the downlink BWP, e.g., in pdcch-Config IE and/or PDCCH-ServingCellConfig IE applicable for all downlink BWPs of the serving cell), and/or the one or more SSS switching configuration parameters, and/or the one or more SS configuration parameters. The one or more configuration parameters may, for example, indicate/configure at least two SS groups for monitoring PDCCH (e.g., on an active DL BWP for at least one serving cell, e.g., the serving cell).

The one or more configuration parameters may, for example, comprise the one or more DRX configuration parameters configuring at least one DRX configuration (e.g., multiple DRX configurations), e.g., per a DRX group. For example, a DRX configuration of the at least one DRX configuration may comprise a value for a DRX ODT.

As shown in FIG. 24, the wireless device may start the DRX ODT (e.g., at a beginning of a DRX cycle (e.g., a Short DRX cycle or a Long DRX cycle) of the DRX configuration, e.g., at time/slot/symbol T1 in FIG. 24. For example, the wireless device may determine a starting occasion (e.g., a subframe/slot/symbol) to start the DRX ODT, e.g., depending on whether the Short DRX cycle is used for the DRX configuration or the DRX group or the Long DRX cycle is used for the DRX configuration or the DRX group. In some examples, the wireless device may determine the starting occasion of the DRX ODT by determining whether [(SFN× 10)+subframe number]modulo (drx-ShortCycle)=(drx-StartOffset) modulo (drx-ShortCycle) and/or whether [(SFN× 10)+subframe number]modulo (drx-ShortCycle)=(drx-StartOffset) modulo (drx-LongCycle). The wireless device may start the DRX ODT after drx-SlotOffset from the beginning of the determined/calculated subframe (e.g., the starting occasion of the DRX ODT). For example, the DRX configuration may correspond to an XR-dedicated PDCCH monitoring window.

In response to the starting the DRX timer, the wireless device may monitor the PDCCH (e.g., for the at least one serving cell) according to a first SS group of the at least two SS groups. As shown in FIG. 24, in an example embodiment, the wireless device may start a first timer. The first timer may control for how long (e.g., in unit of slots/symbols or ms) the wireless device is monitoring the PDCCH (e.g., on the at least one serving cell and/or on the active BWP) according to the first SS group. The wireless device may set a timer value of the first timer to the value provided by the one or more SS configuration parameters (e.g., searchSpaceSwitch-Timer). The wireless device may monitor the PDCCH (e.g., for the at least one serving cell) according to one or more SSSs with the first group index (e.g., corresponding to the first SS group) for a window (e.g., the length of the window, e.g., in units of symbol/slot, or in units of ms, may be indicated by the first timer). For example, the first timer may be a BWP inactivity timer.

In an example embodiment, based on/in response to an expiry of the first timer and while the DRX ODT is running (e.g., at time T3 in FIG. 24), the wireless device may monitor the PDCCH (e.g., for the at least one serving cell) according to a second SS group of the at least two SS groups. For example, the wireless device may stop, based on the expiry of the first timer, the PDCCH monitoring (e.g., for the at least one serving cell) according to the first group of the at least two SS groups. In an example embodiment, in response to the expiry of the first timer (e.g., during the DRX ODT is running), the wireless device may switch from the first SS group to the second SS group. In some examples, the wireless device may prepare for switching (or switch) to the first SS group the SS switching delay prior to the starting occasion of the DRX ODT (e.g., at time T0 in FIG. 24). In some other examples, the wireless device may prepare for switching (or switch) to the second SS group (from the first SS group) the SS switching delay prior to the expiry of the first timer (e.g., at time T2 in FIG. 24). In some cases, the wireless device may switch the BWP based on the expiry of the first timer.

The first SS group may be a sparse SS group. For example, the first SS group may have a periodicity of X1

(e.g., 4 in the example of FIG. 24) slots. In some examples, a first SS duration corresponding to the first SS group (e.g., one or more first SSSs associated with the first SS group) may be 1 or 2 symbols. An index of the first SS group of the at least two SS groups may be greater than 0 (e.g., the first SS group may not be the default SS group, e.g., with the group index 0). In some examples, the first SS group may be the default SS group (e.g., with the group index 0).

The second SS group may be a dense SS group. As shown in FIG. 24, PDCCH monitoring occasions corresponding to the first SS group may have a longer periodicity (X1 slots) than the PDCCH monitoring occasions corresponding to the second SS group (e.g., with periodicity of X2<X1 slots). In some examples, a second SS duration corresponding to the second SS group (e.g., one or more second SSSs associated with the second SS group) may larger than 2 symbols (e.g., the second SS duration may be larger than the first SS duration). In some other examples, an aggregation level (e.g., a maximum aggregation level or a minimum aggregation level) of a second SSS associated with the second SS group may be different (e.g., larger or smaller) than an aggregation level (e.g., a maximum aggregation level or a minimum aggregation level) of a first SSS associated with the first SS group. An index of the second SS group (e.g., the second group index) of the at least two SS groups may be greater than 0 (e.g., the second SS group may not be the default SS group, e.g., with the group index 0). In some examples, an index of the first SS group (e.g., the first group index) of the at least two SS groups may be 0. The index of the second SS group may be different than the index of the first SS group.

In some scenarios, the first timer may be different than the SS switching timer (e.g., searchSpaceSwitchTimer IE). For example, the one or more configuration parameters (e.g., the one or more SS configuration parameters) may indicate at least two values. The first value may correspond to (or be for) length of the SS switching timer and the second value may correspond to (or be for) the length of the first timer. For example, when the first SS group is the default SS group, the base station may configure the first timer and/or the SS switching timer. Compared to legacy systems (e.g., release 16-17), the wireless device may implicitly (e.g., without receiving a DCI indicating the first SS group) start the first timer based on/in response to starting the DRX ODT (e.g., the switching delay prior to the starting occasion of the DRX ODT).

The base station may configure/determine the length of the DRX ODT equal to an average/expected value/range of jitter of the XR traffic. For example, the base station may configure/determine the second value based on an average/expected value/range of jitter of the XR traffic (e.g., half of the average/expected value/range of jitter, or ⅔ of the average/expected value/range of jitter, or ⅓ of the average/expected value/range of jitter). For example, the base station by configuring the first timer may balance between the PDU-Set QoS parameters (e.g., PSDB requirement) and consumed power for monitoring the PDCCH. Configuring the first timer and the SS switching timer may improve flexibility of base station for scheduling the wireless device and balancing the consumed power of the wireless device.

In some other scenarios, the first timer may be the SS switching timer (e.g., searchSpaceSwitchTimer IE). For example, the one or more configuration parameters (e.g., the one or more SS configuration parameters) may indicate only the first value corresponding to (or be for) length of the SS switching timer. For example, when the first SS group is different than the default SS group, the base station may only configure the SS switching timer. Compared to legacy systems (e.g., release 16-17), the wireless device may implicitly (e.g., without receiving a DCI indicating the first SS group) start the first timer (e.g., the SS switching timer) based on starting the DRX ODT (e.g., the switching delay prior to the starting occasion of the DRX ODT).

In an example embodiment, in response to receiving a DCI (e.g., the second DCI), the wireless device may stop the first timer. For example, the DCI may schedule a transmission of at least one physical uplink shared channel (PUSCH), e.g., for transmission of one or more TBs. The DCI may schedule a transmission of at least one PDSCH, e.g., for receiving one or more TBs.

For example, the DCI may be scrambled by an XR-dedicated RNTI (e.g., XR-RNTI or XR-CS-RNTI). In some examples, the wireless device may transmit the at least one PUSCH based on the XR-dedicated RNTI. For example, the wireless device may initialize a pseudo-random sequence generator (e.g., c_init) with/based on the XR-dedicated RNTI. In some cases, the one or more configuration parameters (e.g., DMRS-UplinkConfig) may indicate/configure scramblingID0 IE, e.g., when the DCI is with (or has) a DCI format 0_0 with the CRC scrambled by C-RNTI, MCS-C-RNTI, CS-RNTI, or the XR-dedicated RNTI. In some other cases, the one or more configuration parameters (e.g., DMRS-DownlinkConfig) may indicate/configure scramblingID0 IE or scramblingID1 IE, e.g., when the DCI is with (or has) a DCI format 1_1/1_2 with the CRC scrambled by C-RNTI, MCS-C-RNTI, CS-RNTI, or the XR-dedicated RNTI. In yet some other cases, the one or more configuration parameters (e.g., DMRS-DownlinkConfig) may indicate/configure scramblingID0 IE, e.g., when the DCI is with (or has) a DCI format 0_1 with the CRC scrambled by C-RNTI, MCS-C-RNTI, CS-RNTI, or the XR-dedicated RNTI.

In some scenarios, the DCI may indicate the second SS group, e.g., the DCI may comprise the first filed, e.g., a PDCCH monitoring adaptation indication. In some cases, when switchTriggerToAddModList is configured, the DCI (e.g., with DCI format 2_0) may indicate a location of the SSG switching flag field with a value corresponding to the second SS group. In response to receiving the DCI the wireless device may switch from the first SS group to the second SS group (e.g., at a first/starting/earliest slot that is at least the switching delay from a last/final/ending/latest symbol of a PDCCH carrying/with the DCI).

In an example embodiment, when the DRX ODT is running, the wireless device may start a DRX inactivity timer (e.g., in response to receiving the DCI scheduling a new UL/DL transmission). The wireless device may stop the first timer based on the starting of the DRX inactivity timer. In response to starting the DRX inactivity timer (IAT), the wireless device may switch from the first SS group to the second SS group (e.g., at a first/starting/earliest slot that is at least the switching delay from a starting occasion/symbol of the DRX IAT).

In an example embodiment, the wireless device may switch from the first SS group to the second SS group based on a PDU Set information of a PDU Set. For example, in response to receiving a Start (or an earliest/starting/initial) PDU of the PDU Set, the wireless device may switch from the first SS group to the second SS group. The wireless device may stop the first timer based on the Start PDU of the PDU Set. For example, the base station may schedule the Start PDU of the PDU Set by a first DCI (e.g., the DCI). In some examples, the first DCI may not comprise the first field (e.g., the PDCCH monitoring adaptation indication field).

For example, the DCI may be scrambled by an XR dedicated radio network temporary identifier (RNTI), e.g., XR-RNTI, XR-CS-RNTI, or the like.

In an example, the wireless device may start the SS switch timer in response to switching from the first SS group to the second SS group (e.g., at time T3 in FIG. 24). While the SS switch timer is running and/or the DRX ODT is running, the wireless device may monitor the PDCCH (e.g., for the at least one serving cell) according to the second SS group. In an example embodiment, while the SS switch timer is running, the wireless device may reset the SS switch timer in response to receiving a second DCI with a CRC scrambled by at least one of a C-RNTI, CS-RNTI, or the XR-dedicated RNTI, otherwise the wireless device may decrement the SS switch timer.

In an example embodiment, in response to receiving an End PDU of a PDU Set or an End of the Data Burst indication, the wireless device may switch from the second SS group to a third SS group of the at least two SS groups. For example, the third SS group may be the first SS group. In another example, the third SS group may be different than the first SS group. For example, the third SS group may be the default SS group. In some cases, the wireless device may stop a SS switch timer (if running). The SS switch timer may be started, by the wireless device, in response to switching from the first SS group to the second SS group (e.g., at time T3 in FIG. 24).

Some example embodiments may improve consumed power of the wireless device by reducing PDCCH processing energy/resource. Example embodiments may improve robustness of PDCCH monitoring during the DRX ODT, e.g., when arrival of PDU set is uncertain (due to jitter).

FIG. 25A shows a flowchart of a method for PDCCH monitoring in wireless communication systems. FIG. 25B shows an example embodiment of a PDCCH monitoring in wireless communication systems per an aspect of the present disclosure. For example, FIG. 25B may show an implementation of the method/procedure of the FIG. 25A for/at/in a wireless device (e.g., an XR device) and/or the base station. In some scenarios, FIG. 25A and FIG. 25B may show example embodiments for determining a SS group for monitoring the PDCCH (e.g., on an active DL BWP for at least one serving cell, e.g., the serving cell) during at least two DRX Active Times of a DRX operation within/during a DRX cycle. In some other scenarios, examples of FIG. 25A and FIG. 25B may show a procedure for implicitly/explicitly switching across multiple SS groups (e.g., switching from a first SS group to a second SS group). For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 25A, the one or more configuration parameters (e.g., received from the base station) may comprise the one or more DRX configuration parameters configuring at least one DRX configuration (e.g., multiple DRX configurations), e.g., per a DRX group. The one or more configuration parameters may, for example, comprise the one or more PDCCH configuration parameters, e.g., indicating/configuring at least two SS groups for monitoring PDCCH (e.g., on an active DL BWP for the at least one serving cell, e.g., the serving cell).

According to an example embodiment, as shown in FIG. 25A, in response to/after/based on starting a DRX Active Time (e.g., starting a DRX ODT), the wireless device may determine a SS group of the at least two SS groups for monitoring PDCCH (e.g., for the at least one serving cell) during the DRX Active Time based on whether the DRX Active Time being started at a beginning of a DRX cycle (of a DRX configuration of at least one DRX configuration) or not. For the example of FIG. 25B, during the DRX cycle (e.g., a Long DRX cycle) of the DRX configuration, the wireless device may start two DRX Active Times. A first DRX Active Time of the two DRX Active Times may correspond to a first duration that a first DRX ODT of the DRX configuration is running. A second DRX Active Time of the two DRX Active Times may correspond to a second duration that a second DRX ODT of the DRX configuration is running. For example, the second duration may correspond to restarting the first DRX ODT, e.g., the second DRX ODT of the DRX configuration may be the first DRX ODT of the DRX configuration. In some other examples, the wireless device may extend the first DRX Active Time by starting the second DRX ODT after an expiry of the first DRX ODT.

In an example, the wireless device may start the second DRX ODT based on one or more conditions. The one or more conditions may be satisfied based on/in response to receiving an indication (e.g., a DCI or a MAC CE) from the base station indicating restarting the first DRX ODT and/or starting the second DRX ODT and/or extending the first DRX Active Time. In some cases, the wireless device may start the second DRX ODT based on a PDU Set information. For example, The one or more conditions may be satisfied based on/in response to at least one of the following: receiving no PDU of a PDU Set during the first duration (e.g., due to jitter of the XR traffic), e.g., not receiving a Start (or earliest/starting/initial) PDU of a PDU Set during the first duration (e.g., due to jitter of the XR traffic); and/or not receiving an End (or latest/final/ending) PDU of a PDU Set during the first duration (e.g., due to jitter of the XR traffic); and/or not receiving an End of Data Burst indication during the first duration (e.g., due to jitter of the XR traffic). In yet another cases, the one or more conditions may be satisfied based on/in response to the first duration overlapping with an (active) measurement gap, e.g., when the first DRX Active Time starts during the measurement gap and/or when the first DRX Active Time stops during the measurement gap and/or when overlapping portion of the first duration with the measurement gap being larger than a preconfigured threshold.

The wireless device may determine not receiving the Start PDU of a PDU Set, e.g., during the first duration. For example, a DCI scheduling the Start PDU of the PDU Set may comprise an indication (e.g., a field) for indicating whether a PDU (e.g., a MAC PDU or a PDSCH or TB) corresponds to (or is) the Start PDU of the PDU Set. In another example, the wireless device may determine whether a PDU of the PDU Set is the Start PDU of the PDU Set based on an ID/index/(serial) number/counter (e.g., corresponding to the PDU Set) or flag of a header (e.g., MAC/RLC/PDCP header) of the PDU. For example, a PDSCH carrying/with the Start PDU of the PDU Set may be scrambled by a certain identity/scrambling (initial) number/value. In other examples, the higher layers of the wireless device (e.g., MAC/RLC/PDCP or the like) may send an indication to lower layers of the wireless device (e.g., MAC/PHY layers) indicating the Start PDU of the PDU Set being received. The lower layers of the wireless device may, based on not receiving the indication, determine that the Start PDU of a PDU Set is not received.

The wireless device may determine not receiving the End PDU of a PDU Set, e.g., during the first duration. For example, a DCI scheduling the End PDU of the PDU Set may comprise an indication (e.g., a field) for indicating whether a PDU (e.g., a MAC PDU or PDSCH or TB) corresponds to (or is) the End PDU of the PDU Set. In another example, the wireless device may determine whether a PDU of the PDU Set is the End PDU of the PDU Set based on an ID/index/(serial) number/counter (e.g., corresponding to the PDU Set) or flag of a header (e.g., MAC/RLC/PDCP header) of the PDU. For example, a PDSCH carrying/with the End PDU of the PDU Set may be scrambled by a certain identity/scrambling (initial) number/value. In other examples, the higher layers of the wireless device (e.g., MAC/RLC/PDCP or the like) may send an indication to lower layers of the wireless device (e.g., MAC/PHY layers) indicating the End PDU of the PDU Set being received. The lower layers of the wireless device may, based on not receiving the indication, determine that the End PDU of a PDU Set is not received.

For example, the counter (or ID/index/number) may count (or track) a number of remaining PDUs of the PDU Set. The counter may count (or track) a number of transmitted/received PDUs of the PDU Set. The wireless device may, based on the ID/index/(serial) number/counter, determine how many PDUs of the PDU Set being transmitted/received and/or how many PDUs of the PDU Set are expected to be transmitted/received.

The wireless device may determine not receiving an End of Data Burst indication, e.g., during the first duration, for example, based on determining not receiving the End PDU of a PDU Set. In an example, the base station may transmit a DL signal (e.g., a DCI/MAC CE, or the like) indicating the End of Data Burst indication. Based on not receiving the DL signal (e.g., during the first duration), the wireless device may determine not receiving an End of Data Burst indication. In other examples, the End of Data Burst indication may be received from higher layers of the wireless device (e.g., MAC/RLC/PDCP or the like). The lower layers of the wireless device may, based on not receiving the End of Data Burst indication, determine that the End PDU of a PDU Set is not received.

In an example embodiment, as shown in FIG. 25B, during the first DRX Active Time (e.g., the first duration or when the first DRX ODT running), the wireless device may monitor the PDCCH according to at least a first SS group (e.g., a sparse SS group) of the at least two SS groups. For example, the wireless device may prepare to switch (or switch) to the first SS group at least the switching delay prior to a starting occasion of the first DRX ODT. In some cases, the wireless device may monitor the PDCCH according to the first SS group of the at least two SS groups during a first/initial/starting portion of the first duration and monitor the PDCCH (e.g., for the at least one serving cell) according to second SS group (e.g., a dense SS group) of the at least two SS groups during a last/ending/final portion of the first duration. For example, the wireless device may, e.g., the SS switching delay prior to an expiry of the first/initial/starting portion of the first duration, switch (e.g., according to embodiments of FIG. 24) from the first SS group of the at least two SS groups to the second SS group of the at least two SS groups.

In an example embodiment, as shown in FIG. 25B, during the second DRX Active Time (e.g., the second duration or when the second DRX ODT running), the wireless device may monitor the PDCCH (e.g., for the at least one serving cell) according to at least the second SS group of the at least two SS groups. For example, the wireless device may prepare to switch (or switch) to the second SS group at least the switching delay prior to a starting occasion of the second DRX ODT.

In an example embodiment, the wireless device may transmit one or more capability messages to the base station. The one or more capability messages may indicate a capability of switching across SS groups for monitoring PDCCH (e.g., for the at least one serving cell) during DRX Active Times of a DRX cycle. For example, the one or more capability messages may indicate a capability of wireless device for determining a SS group (e.g., not the default SS group) in response to starting a DRX ODT.

In an example embodiment, the base station may configure/enable (e.g., via an indication and/or the one or more configuration parameters) the wireless device for choosing different SS groups in response to starting a DRX ODT, e.g., during a DRX cycle of a DRX configuration. In response to the indication being enabled/configured/indicated, the wireless device may select/determine/choose different SS groups for monitoring the PDCCH (e.g., for the at least one serving cell) during the first duration and the second duration (e.g., based on the method of FIG. 25A).

In response to the first indication being disabled (or not being configured/indicated), the wireless device may, during a DRX cycle, select/determine/choose same SS groups for monitoring the PDCCH during the first duration and the second duration. The wireless device may start, in response to starting the second DRX ODT during the DRX cycle in FIG. 25B, monitoring the PDCCH according to the first SS group. For example, the wireless device may, while the second DRX ODT timer is running and for monitoring the PDCCH (e.g., for the at least one serving cell), switch to the second SS group after an expiry of a first/initial/starting portion of the second duration.

For example, when the wireless device not receiving no PDU during the first duration and/or not receiving the End of data burst indication during the first duration and/or when the first duration overlapping with a measurement gap, by monitoring the PDCCH according to at least the second SS group during the second duration, the wireless device may reduce UL/DL scheduling delay.

FIG. 26A shows a flowchart of a method for PDCCH monitoring in wireless communication systems. FIG. 26B shows an example embodiment of a PDCCH monitoring in wireless communication systems per an aspect of the present disclosure. For example, FIG. 26B may show an implementation of the method/procedure of the FIG. 26A for/at/in a wireless device (e.g., an XR device). In some scenarios, FIG. 26A and FIG. 26B may show example embodiments for determining a SS group for monitoring the PDCCH during a DRX Active Time of a DRX operation (e.g., on an active DL BWP for at least one serving cell, e.g., the serving cell). In some other scenarios, examples of FIG. 26A and FIG. 26B may show a procedure for implicitly/explicitly switching across multiple SS groups (e.g., switching from a first SS group to a second SS group). For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 26A and FIG. 26B, the one or more configuration parameters (e.g., received from the base station) may comprise the one or more DRX configuration parameters. In an example, the one or more DRX configuration parameters may comprise/configure/indicate multiple (or a plurality, e.g., 2 as shown in FIG. 26B) DRX configurations, e.g., per a DRX group. The DRX group may be a secondary DRX group or a primary DRX group. The multiple DRX configurations may correspond to unicast UL/DL transmissions (e.g., not for MBS multicast/broadcast transmissions). For example, a (each) DRX configuration of the multiple DRX configurations may correspond to one or more streams/(QoS) flows/logical channels (e.g., corresponding to video/audio/pose and control data/information). In some cases, the base station may configure the multiple DRX configurations for different PDB requirements of different XR data/traffic, e.g., a first DRX configuration of the multiple DRX configurations for one or more XR traffic flows/streams with a first delay budget (e.g., 10 ms) and a second DRX configuration of the multiple DRX configurations for one or more XR traffic flows/streams with a second delay budget (30 ms). In some examples, a first DRX configuration of the multiple DRX configurations may be an XR-dedicated DRX configuration (e.g., for XR traffic/data) and a second DRX configuration of the multiple DRX configurations may be a non-XR DRX configuration (e.g., not for XR traffic/data).

As shown in example of FIG. 26B, each DRX configuration of the multiple DRX configurations has a corresponding DRX cycle and/or a corresponding DRX onDuration-Timer (ODT). For example, each DRX configuration the multiple DRX configurations has corresponding DRX timers (e.g., a DRX inactivity timer (IAT), a DRX retransmission timer for UL/DL, or the like). For example, a first plurality of serving cells (e.g., from/of the one or more serving cells) may correspond to a first DRX configuration and a second plurality of serving cells (e.g., from/of the one or more serving cells) may correspond to a second DRX configuration. The one or more serving cells may correspond to the DRX group that comprises the multiple DRX configuration parameters.

In some scenarios, the DRX parameters that are separately configured for each DRX configuration may be at least one of: drx-onDurationTimer, drx-InactivityTimer. The DRX parameters that are common to the DRX configurations may be at least one of: a DRX slot offset (e.g., drx-SlotOffset), drx-Retransmission TimerDL, drx-RetransmissionTimerUL, drx-LongCycleStartOffset, drx-ShortCycle (optional), drx-ShortCycle Timer (optional), drx-HARQ-RTT-TimerDL, drx-HARQ-RTT-TimerUL, downlinkHARQ-FeedbackDisabled (optional) and uplinkHARQ-Mode (optional).

In some other examples, each DRX configuration the multiple DRX configurations may comprise a separate/corresponding DRX slot offset. For example, the rest of DRX parameters (e.g., drx-onDurationTimer, drx-InactivityTimer, drx-RetransmissionTimerDL, drx-RetransmissionTimerUL, drx-LongCycleStartOffset, or the like) may be common across the multiple DRX configurations, e.g., per a DRX group. This allows dynamically activating (implicitly by the wireless device and/or explicitly by receiving an activation command) a DRX configuration of the multiple DRX configurations (e.g., see embodiments of FIG. 27A and FIG. 27B), e.g., based on changes in traffic characteristics (e.g., periodicity) or non-integer periodicity of the XR traffic.

In some examples, each DRX configuration the multiple DRX configurations may correspond to a set/bundle of HARQ processes. For example, a first DRX configuration of the multiple DRX configurations has a corresponding first DRX cycle and/or a corresponding first DRX ODT and a second DRX configuration of the multiple DRX configurations has a corresponding second DRX cycle and/or a corresponding second DRX ODT. In the example of FIG. 26B, the length of the second DRX ODT is smaller than the length of the first DRX ODT and the second DRX cycle is shorter than the first DRX cycle. However, other implementations may be possible, e.g., based on periodicity of XR streams/flows and/or PDU-Sets.

In some implementations, at least one DRX configuration of the multiple DRX configurations may be a dedicated DRX configuration for XR traffic/data. For example, a DRX configuration of the multiple DRX configurations may be used by the wireless device to monitor the PDCCH based on certain RNTIs of the at least one RNTI. For example, a first DRX configuration of the multiple DRX configurations may correspond to a first XR-dedicated RNTI (e.g., a first XR-RNTI and/or a first XR-CS-RNTI, e.g., for video frame transmissions). A second DRX configuration of the multiple DRX configurations may correspond to a second XR-dedicated RNTI (e.g., a second XR-RNTI and/or a second XR-CS-RNTI, e.g., for audio transmissions).

In other implementations, the multiple DRX configurations may correspond to different characteristics of XR traffic. For example, a first DRX configuration of the multiple DRX configurations may correspond to a first mode/class/type of the XR traffic (e.g., 30 FPS periodicity) and a second DRX configuration of the multiple DRX configurations may correspond to a second mode/class/type of the XR traffic (e.g., 60 FPS periodicity). When application parameters (e.g., XR traffic periodicity, quality of service, PSDB, PSER, or the like) of an XR application/service (e.g., the XR device) changes from a first set of application parameters to a second set of application parameters, the wireless device and/or the base station may activate a second DRX configuration of the multiple DRX configurations and deactivate a first DRX configuration of the multiple DRX configurations. For example, the wireless device may transmit a MAC CE (or a UCI, e.g., via PUCCH) to inform (or indicate to) the base station regarding changes (at the wireless device) from a first set of application parameters to a second set of application parameters (e.g., or activation of the second DRX configuration and/or deactivation of the first DRX configuration).

In some examples, the base station may, corresponding to a first DRX configuration of the multiple DRX configurations, deactivate UL/DL HARQ retransmissions (e.g., semi-statistically for certain streams/flows/logical channels (e.g., pose/control information) or dynamically in response to violation of delay budget of a PDU or a PDU Set), e.g., not starting a drx-HARQ-RTT-TimerUUDL and/or a DRX-RetransmissionTimerUUDL after performing a new PUSCH/PDSCH transmission, e.g., when the delay budget of the corresponding PDU or HARQ process being violated (not being satisfied). For example, the base station may, corresponding to a second DRX configuration of the multiple DRX configurations, activate UL/DL HARQ retransmissions, e.g., starting a drx-HARQ-RTT-TimerUUDL and/or a DRX-RetransmissionTimerUUDL after performing a new PUSCH/PDSCH transmission.

As shown in FIG. 26A, the one or more configuration parameters may comprise the one or more PDCCH configuration parameters. For example, the one or more PDCCH configuration parameters may comprise/configure/indicate at least two SS groups for monitoring the PDCCH (e.g., during a DRX Active Time of a DRX operation), e.g., for the at least one serving cell). For example, the wireless device may monitor the PDCCH on an active DL BWP for at least one serving cell, e.g., the serving cell. In an example, each SS group of the at least two SS groups may comprise a number of SSSs (e.g., 4 SSSs) and/or one or more SS group indexes. Each SS group of the at least two SS groups may, for example, correspond to one or more CSS and/or a USS. In some cases, each SS group of the at least two SS groups may correspond to certain RNTIs, e.g., the at least one RNTI. In some implementations, a first SS group of the at least two SS groups may correspond to a first XR-dedicated RNTI (e.g., a first XR-RNTI and/or a first XR-CS-RNTI) and a second SS group of the at least two SS groups may correspond to a second XR-dedicated RNTI (e.g., a second XR-RNTI and/or a second XR-CS-RNTI).

In an example embodiment, as shown in FIG. 26A, the wireless device may monitor, during a DRX active time, PDCCH according to at least one SS group of the at least two SS groups based on a DRX configuration (of the at least two DRX configurations) corresponding to the DRX active time. In an example embodiment, as shown in FIG. 26B, during a first DRX Active Time of a first DRX operation (e.g., corresponding to a first DRX configuration of the multiple DRX configurations, e.g., when a first DRX ODT of the first DRX configuration is running), the wireless device may monitor the PDCCH (e.g., for the at least one serving cell) according to the first SS group of the at least two SS groups. During a second DRX Active Time of a second DRX operation correspond to a second DRX configuration of the multiple DRX configurations (e.g., when a second DRX ODT of the second DRX configuration is running), the wireless device may monitor the PDCCH (e.g., for the at least one serving cell) according to the second SS groups of the at least two SS groups. As shown in FIG. 26B, when the first DRX Active Time and the second DRX Active Time overlaps in time (e.g., when both first DRX ODT of the first DRX configuration is running and a second DRX ODT of the second DRX configuration is running), the wireless device may monitor the PDCCH (e.g., for the at least one serving cell) according to both the first SS group of the at least two SS groups and the second SS group of the at least two SS groups.

In some examples, the wireless device may determine an association between a DRX configuration of the multiple DRX configurations and a SS group of the at least two SS groups based on an index/ID and/or one or more RNTIs and/or SS type. The Index may be an SSS index indicated by the one or more SS configuration parameters, e.g., searchSpaceId. The index may, for example, be a CORESET index, e.g., controlResourceSetId, e.g., indicated by the one or more SS configuration parameters. For example, the index may be indicated by a SS group ID list (e.g., searchSpaceGroupIdList-r17). In an implementation, the one or more configuration parameters (e.g., the one or more PDCCH configuration parameters and/or the one or more SS configuration parameters) may comprise/configure a list/ plurality of SSs (or a list/plurality of SS groups). Each SS (or each SS group) of the plurality of SSs (or the plurality of SS groups) may correspond (e.g., via a one-to-one mapping or multiple-to-one mapping or multiple-to-multiple mapping) to a DRX configuration of the multiple DRX configurations. For example, the one or more RNTIs may correspond to an XR-dedicated RNTIs. In some cases, the SS type may be a UE-specific SS type. For example, an SS group with a group index 0 (e.g., a default SS group) may correspond to the default DRX configuration.

Example embodiments may improve consumed power of the wireless device for monitoring PDCCH, e.g., for XR applications with multiple streams/flows.

Figure 27A:
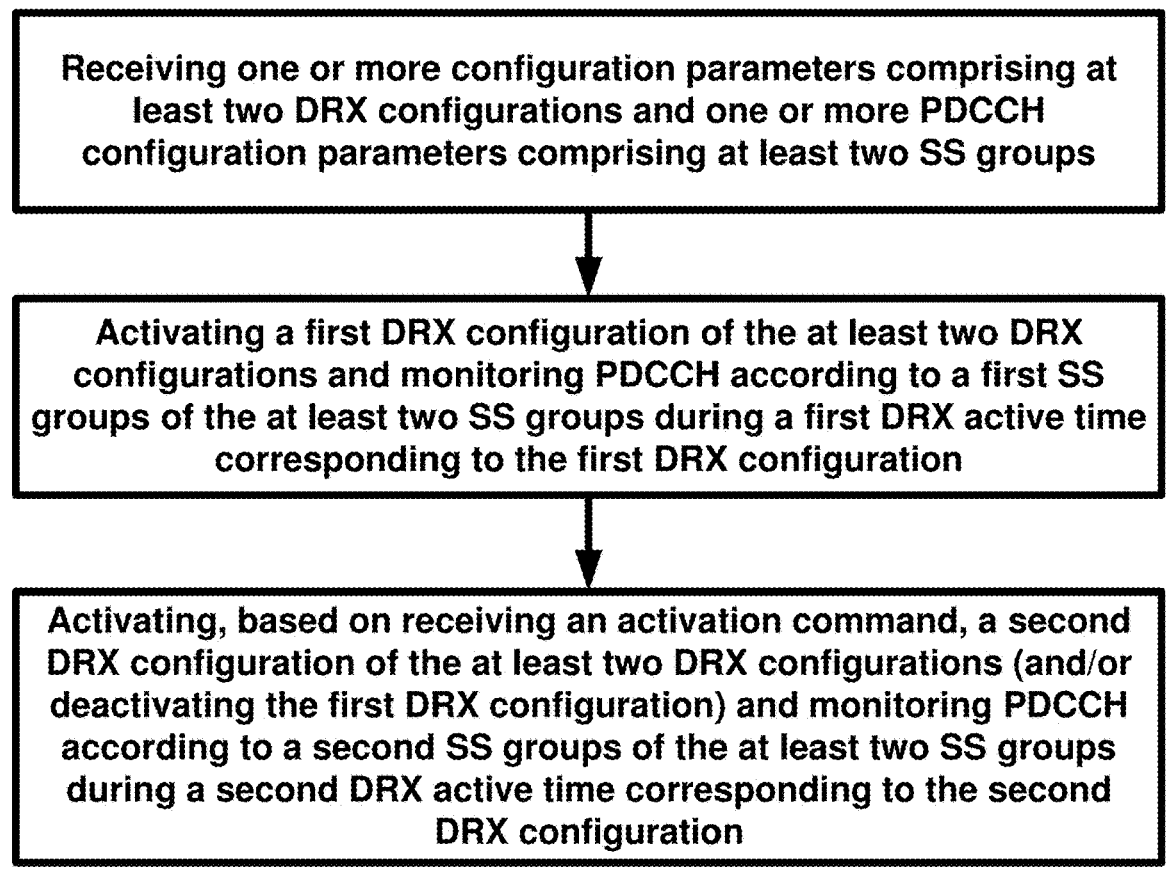
FIG. 27A shows a flowchart of a method for PDCCH monitoring in wireless communication systems.
Figure 27B:
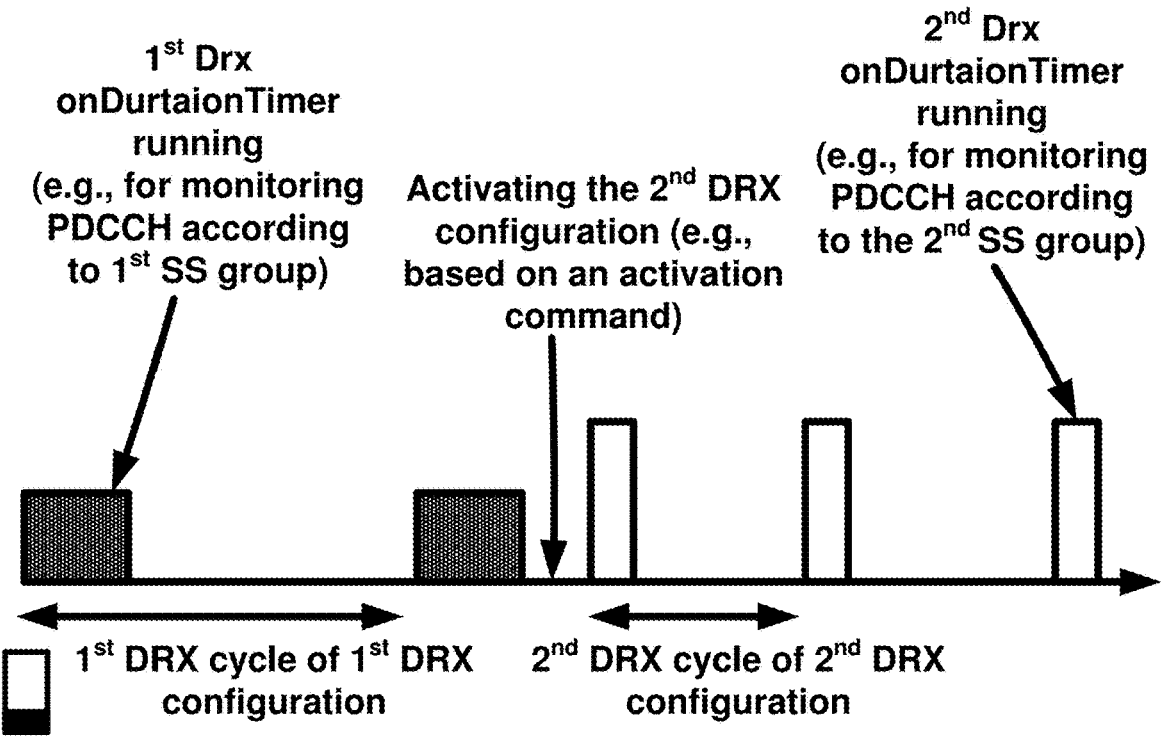
FIG. 27B shows an example embodiment of a PDCCH monitoring in wireless communication systems per an aspect of the present disclosure.

FIG. 27A shows a flowchart of a method for PDCCH monitoring in wireless communication systems. FIG. 27B shows an example embodiment of a PDCCH monitoring in wireless communication systems per an aspect of the present disclosure. For example, FIG. 27B may show an implementation of the method/procedure of the FIG. 27A for/at/in a wireless device (e.g., an XR device). In some scenarios, FIG. 27A and FIG. 27B may show example embodiments for determining a SS group for monitoring the PDCCH during a DRX Active Time of a DRX operation (e.g., on an active DL BWP for at least one serving cell, e.g., the serving cell). In some other scenarios, examples of FIG. 27A and FIG. 27B may show a procedure for implicitly/explicitly switching across multiple SS groups (e.g., switching from a first SS group to a second SS group). For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 27A, the one or more configuration parameters (e.g., received from the base station) may comprise the one or more DRX configuration parameters configuring the multiple (e.g., 2) DRX configurations (e.g., as discussed for FIG. 26A and FIG. 26B), e.g., per a DRX group. The one or more configuration parameters may comprise the one or more PDCCH configuration parameters. For example, the one or more PDCCH configuration parameters may comprise/configure/indicate the at least two SS groups for monitoring the PDCCH (e.g., during a DRX Active Time of a DRX operation). The wireless device may monitor the PDCCH on an active DL BWP for the at least one serving cell, e.g., the serving cell.

As shown in FIG. 27A, in response to/after/based on receiving the one or more DRX configuration parameters (e.g., from the base station), the wireless device may (automatically/initially/implicitly) activate one or more first DRX configurations (e.g., comprising a first DRX configuration) of the multiple DRX configurations (e.g., a default DRX configuration). For example, the first DRX configuration of the multiple DRX configurations may comprise an indication indicating the first DRX configuration of the multiple DRX configurations being the default DRX configuration (e.g., for monitoring PDCCH). In an example embodiment, after the one or more first DRX configurations being activated (e.g., similar to embodiments of FIG. 26A and FIG. 26B), the wireless device may monitor, during a DRX active time, PDCCH (e.g., for the at least one serving cell) according to at least one SS group of the at least two SS groups (and/or one or more first SSSs) based on the DRX active time corresponding to the first DRX configuration (of the one or more first DRX configurations). For example, as shown in FIG. 27B, during a first DRX Active Time of a first DRX operation (e.g., corresponding to the first DRX configuration of the multiple DRX configurations, e.g., when a first DRX ODT of the first DRX configuration is running), the wireless device may monitor the PDCCH (e.g., for the at least one serving cell) according to the first SS group of the at least two SS groups (and/or one or more first SSSs).

For example, the base station may transmit an activation command (e.g., a DCI and/or a MAC CE and/or an RRC message/signal, e.g., an RRC reconfiguration/setup/release message) activating one or more second DRX configurations (e.g., comprising a second DRX configuration) of the multiple DRX configurations. For example, the wireless device may, in response to receiving the activation command, activate the one or more second DRX configurations (e.g., the second DRX configuration of the multiple DRX configurations) and/or deactivate the one or more first DRX configuration (e.g., the default DRX configuration or the first DRX configuration). In some examples, the activation command may indicate one or more second IDs/indexes of the one or more second DRX configurations for activation. In some other examples, the activation command may indicate at least one index/ID of the one or more first DRX configurations for deactivation. The wireless device may deactivate a current active DRX configuration with the (indicated) index/ID of the one or more first DRX configurations for deactivation (e.g., prior to the receiving of the activation command, e.g., the first DRX configuration of the multiple DRX configurations) after/in response to receiving the activation command. The wireless device may, for example, activate the one or more second DRX configurations corresponding to the (indicated) one or more second IDs/indexes for activation after/in response to receiving the activation command.

In an example embodiment, after the one or more second DRX configurations being activated, the wireless device may monitor, during a DRX active time (e.g., similar to embodiments of FIG. 26A and FIG. 26B), PDCCH (e.g., for the at least one serving cell) according to at least one SS group of the at least two SS groups (and/or one or more second SSSs) based on the DRX active time corresponding to a DRX configuration (of the one or more second DRX configurations). For example, during a second DRX Active Time of a second DRX operation corresponding to a second DRX configuration of the multiple DRX configurations (e.g., when a second DRX ODT of the second DRX configuration is running), the wireless device may monitor the PDCCH (e.g., for the at least one serving cell) according to the second SS groups of the at least two SS groups (and/or one or more second SSSs).

Example embodiments may improve consumed power of the wireless device for monitoring PDCCH, e.g., for XR applications with multiple streams/flows.

FIG. 28A shows a flowchart of a method for DRX operation in wireless communication systems. FIG. 28B shows an example embodiment of a DRX operation in wireless communication systems per an aspect of the present disclosure. For example, FIG. 28B may show an implementation of the method/procedure of the FIG. 28A for/at/in a wireless device (e.g., an XR device). For example, the method of FIG. 28A and FIG. 28B may be implemented at/in a wireless device (e.g., an XR device) and/or a base station. In some scenarios, FIG. 28A and FIG. 28B may show example embodiments for determining a starting occasion (e.g., subframe) of a DRX ODT timer. In some other scenarios, for example FIG. 28A and FIG. 28B may show procedures/methods to account for/consider a non-integer DRX cycle and/or a quasi-traffic periodicity (e.g., of an XR application). For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 28A, the one or more configuration parameters (e.g., received from the base station) may comprise the one or more DRX configuration parameters configuring at least one DRX configuration. For example, the one or more configuration parameters may comprise at least one DRX configuration (e.g., the multiple DRX configurations). The at least one DRX configuration may correspond to a DRX group.

As shown in FIG. 28A and FIG. 28B, the wireless device may determine a starting occasion (e.g., subframe/slot/symbol) of a DRX ODT, e.g., corresponding to/of a DRX configuration (e.g., of the at least one DRX configuration and/or of the DRX group). In some examples, based on a DRX cycle of the DRX configuration being an integer value (e.g., a first DRX configuration in FIG. 28B) and/or the DRX configuration corresponding to a first traffic type (e.g., with an integer periodicity), the wireless device may use a first set of (pre-defined) formulas/methods/procedures, e.g., comprising a first formula/method (e.g., when a Short DRX cycle is used for the DRX configuration or the DRX group) and/or a second formula/method (e.g., when a Long DRX cycle is used for the DRX configuration or the DRX group), to determine the starting occasion (e.g., subframe/slot/symbol) of the DRX ODT.

For example, using/corresponding to the first method/formula, the wireless device may determine whether [(SFN× 10)+subframe number]modulo (drx-ShortCycle)=(drx-StartOffset) modulo (drx-ShortCycle), e.g., to start the DRX ODT, e.g., corresponding to/of the DRX configuration (e.g., of the at least one DRX configuration and/or of the DRX group), after a DRX offset of the DRX configuration (e.g., drx-SlotOffset) from the beginning of the subframe (e.g., with/corresponding to the subframe number/SFN in the first formula). The starting occasion of the DRX ODT of the DRX configuration may be the DRX offset of the DRX configuration from the beginning of the subframe.

In another example, using/corresponding to the second method/formula, the wireless device may determine whether [(SFN×10)+subframe number]modulo (drx-ShortCycle)= (drx-StartOffset) modulo (drx-LongCycle), e.g., to start the DRX ODT, e.g., corresponding to/of the DRX configuration (e.g., of the at least one DRX configuration and/or of the DRX group), after drx-SlotOffset from the beginning of the subframe (e.g., with/corresponding to the subframe number/ SFN in the second formula). The starting occasion of the DRX ODT of the DRX configuration may be the DRX offset of the DRX configuration from the beginning of the subframe.

As shown in FIG. 28B, the first traffic type may have an integer periodicity/burst periodicity (e.g., non-XR traffic and/or audio streams/flows of an XR application). For example, the first traffic type may correspond to one or more first logical channels (e.g., configured by the one or more configuration parameters), e.g., not corresponding to the XR application.

In some examples, as shown in FIG. 28A and FIG. 28B, based on a DRX cycle of the DRX configuration being a non-integer value (e.g., a second DRX configuration in FIG. 28B) and/or the DRX configuration corresponding to a second traffic type, the wireless device may use second set of (pre-defined) formulas/methods/procedures, e.g., comprising a third formula/method (e.g., when a Short DRX cycle is used for the DRX configuration or the DRX group) and/or a fourth formula/method (e.g., when a Long DRX cycle is used for the DRX configuration or the DRX group), to determine the starting occasion of the DRX ODT for the DRX configuration or the DRX group. The second traffic type may have a non-integer periodicity/burst periodicity (e.g., video streams/flows of an XR application). For example, the second traffic type may correspond to a one or more second logical channels.

To account for quasi-periodic traffic of XR applications and/or an SFN wrap-around problem/issue, the second set of formulas/methods may use a PDU Set related assistance information, e.g., a burst periodicity of an XR traffic/data/ application/stream/flow, e.g., indicated by the PDU Set related assistance information. In some examples, the second set of formulas/methods may comprise one or more flooring/ceiling operations, e.g., to account for quasi-periodic traffic of XR applications and/or an SFN wrap-around problem/issue. The second set of formulas/methods may be based on a new SFN variable (e.g., different than the SFN variable in the first formula and/or the second formula), e.g., to account for quasi-periodic traffic of XR applications and/or an SFN wrap-around problem/issue. In some examples, the second set of formulas/methods may depend on (or be a function of/based on) one or more counters (e.g., to select/determine a DRX slot offset). In some other examples, the second set of formulas/methods may depend on (or be a function of/based on) at least a short cadence/tempo/lilt/swing and/or a long cadence (e.g., indicated by the DRX configuration).

For example, as shown in FIG. 28B, when the DRX configuration comprises a plurality of DRX slot offsets (e.g., a plurality of drx-SlotOffsets), e.g., the second DRX configuration parameters, and/or the short cadence/tempo/lilt/swing and/or the long cadence, the wireless device may use the second set of formulas/methods. For example, the wireless device may select the DRX slot offset among/from plurality of DRX slot offsets based on the PDU set related assistance information (e.g., the burst periodicity).

In some implementations, the one or more configuration parameters (e.g., the one or more DRX configuration parameters) may indicate/comprise at least one parameter. For example, each parameter of the at least one parameter may correspond to a DRX configuration parameter of the multiple DRX configuration parameters. In an example embodiment, in response to a first parameter (e.g., of the at least one parameter) being indicated/configured/enabled, the wireless device may determine the starting occasion of the DRX ODT (of a first DRX configuration of the multiple DRX configurations) based on the second set of formulas/methods. In an example embodiment, in response to the first parameter (e.g., of the at least one parameter) not being indicated/configured/enabled (e.g., being disabled or being absent), the wireless device may determine the starting occasion of the DRX ODT (of a first DRX configuration of the multiple DRX configurations) based on the first set of formulas/methods.

Some example embodiments of the present disclosure may allow the wireless device to properly determine the starting occasion of a DRX ODT corresponding to a DRX configuration, e.g., to reduce misalignment between the wireless device and the base station and/or to allow the wireless device to align the starting occasion of the DRX ODT with accordance to the burst periodicity (or periodicity of traffic).

Figure 29:
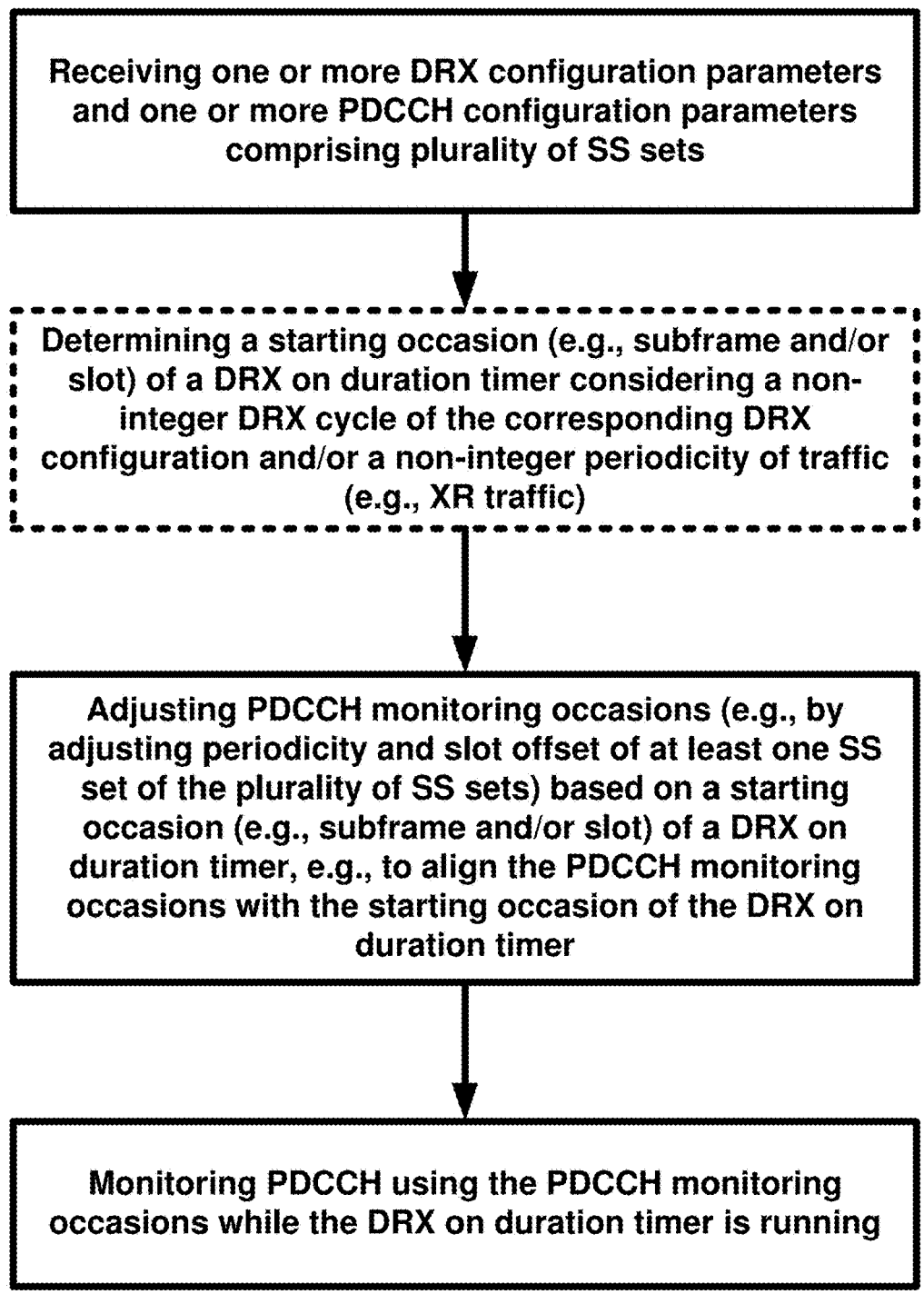
FIG. 29 shows a flowchart of a method for PDCCH monitoring in wireless communication systems per an aspect of the present disclosure.

FIG. 29 shows a flowchart of a method for PDCCH monitoring in wireless communication systems per an aspect of the present disclosure. For example, the method of FIG. 29 may be implemented at/in a wireless device (e.g., an XR device) and/or a base station. In some scenarios, FIG. 29 may show example embodiments for determining one or more PDCCH monitoring occasions for monitoring the PDCCH during a DRX Active Time of a DRX operation (e.g., on an active DL BWP for at least one serving cell, e.g., the serving cell). In some other scenarios, example of FIG. 29 may show a procedure for implicitly/explicitly adjusting periodicity and/or slot offset of multiple SSS (or multiple SS groups) as a result of a non-integer DRX cycle and/or a quasi-traffic periodicity (e.g., of an XR application). For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 29, the one or more configuration parameters (e.g., received from the base station) may comprise the one or more DRX configuration parameters configuring at least one DRX configuration (e.g., the multiple DRX configurations). The one or more configuration parameters may, for example, comprise the one or more PDCCH configuration parameters, e.g., indicating/configuring one or more SSSs (e.g., via the one or more SS configuration parameters). The wireless device may monitor the PDCCH on an active DL BWP for the at least one serving cell, e.g., the serving cell.

As shown in FIG. 29, (using/based on the embodiments of FIG. 28A and FIG. 28B), the wireless device may determine a starting occasion (e.g., subframe/slot/symbol) of a DRX ODT, e.g., corresponding to/of the DRX configuration. In an example embodiment, the wireless device may adjust/determine/select/update one or more PDCCH monitoring occasions based on the (determined) starting occasion (e.g., subframe and/or slot and/or symbol) of the DRX ODT, e.g., to align the one or more PDCCH monitoring occasions with the starting occasion of the DRX ODT. By adjusting the one or more PDCCH monitoring occasions based on the starting occasion of the DRX ODT, the wireless device may reduce UL/DL data transmission latency (e.g., the base station may schedule the wireless device once the DRX ODT is started).

In some examples, when a DRX cycle of the DRX configuration is an integer value (e.g., a first DRX configuration in FIG. 28B) and/or when the DRX configuration corresponds to a first traffic type (e.g., with an integer periodicity) and/or when the DRX configuration comprises only one DRX slot offset, the wireless device may not adjust/determine/select/update the one or more PDCCH monitoring occasions based on the starting occasion. For example, the wireless device may use/follow higher layer configurations (e.g., RRC layer, e.g., the one or more PDCCH configuration parameters) to determine the one or more PDCCH monitoring occasions for monitoring the PDCCH during the DRX ODT is running.

In some other examples, when a DRX cycle of the DRX configuration is a non-integer value (e.g., a second DRX configuration in FIG. 28B) and/or when the DRX configuration corresponds to a second traffic type (e.g., with a non-integer periodicity) and/or when the DRX configuration comprises at least two DRX slot offsets, the wireless device may adjust/determine/select/update the one or more PDCCH monitoring occasions based on the starting occasion. For example, the wireless device may use the higher layer configurations (e.g., RRC layer, e.g., the one or more PDCCH configuration parameters) and the (determined) starting occasion of the DRX ODT to determine the one or more PDCCH monitoring occasions for monitoring the PDCCH (e.g., for the at least one serving cell) during the DRX ODT is running.

For example, the wireless device may adjust/determine (e.g., decrease/increase/shift) a slot offset (indicated by monitoringSlotPeriodicityAndOffset) of at least one SS set of a plurality of SS sets (e.g., configured by the one or more SS configuration parameters). The wireless device may select/determine the slot offset of the at least one SS set from a plurality of slot offsets (e.g., configured by the one or more SS configuration parameters).

For example, the wireless device may adjust/determine (e.g., decrease/increase) a periodicity (indicated by monitoringSlotPeriodicityAndOffset) of at least one SS set of the plurality of SS sets. The wireless device may select the periodicity of the at least one SS set from a plurality of periodicities (e.g., configured by the one or more SS configuration parameters).

In another example, the wireless device may adjust/determine a PDCCH monitoring pattern (e.g., monitoringSlotsWithinSlotGroup) for a group of slots. For example, the wireless device may determine a bitmap based on the starting occasion of the DRX ODT, e.g., the group of slots indicated by the bitmap occur during the DRX ODT being running.

In some examples, the at least one SS set of a plurality of SS sets may correspond to a SS group (e.g., a first SS group of the at least two SS groups). For example, the SS group may correspond to the XR traffic. The SS group may comprise (or correspond to) XR-dedicated RNTI(s).

As shown in FIG. 29, the wireless device may, during the DRX ODT is running, monitor the PDCCH using the one or more PDCCH monitoring occasions.

In an example embodiment, the wireless device may transmit one or more capability messages to the base station. The one or more capability messages may indicate a capability of adjusting the PDCCH monitoring occasions (e.g., corresponding to at least one SS set), e.g., to align the PDCCH monitoring occasions with a burst periodicity (e.g., indicated by a PDU Set related assistance information of an XR traffic/data/application) and/or to align the PDCCH monitoring occasions with a starting occasion of the DRX ODT of the DRX configuration. For example, the base station may configure the wireless device with the plurality of slot offsets and/or the plurality of periodicities of the at least one SS set (e.g., a plurality of monitoringSlotPeriodicityAndOffset).

In an example embodiment, the base station may configure/enable the wireless device for adjusting the PDCCH monitoring occasions (e.g., corresponding to the at least one SS set), e.g., via a first indication (e.g., an RRC configuration parameter, e.g., the one or more PDCCH configuration parameters, e.g., the one or more SS configuration parameters). For example, the first indication may be indicated by a DL signal/message (e.g., DCI/MAC CE/RRC). In response to the first indication being enabled/configured/indicated, the wireless device adjusting the PDCCH monitoring occasions (e.g., corresponding to the at least one SS set), e.g., to align the PDCCH monitoring occasions with a burst periodicity (e.g., indicated by a PDU Set related assistance information of an XR traffic/data/application) and/or to align the PDCCH monitoring occasions with a starting occasion of the DRX ODT of the DRX configuration. For example, in response to the first indication being disabled (or not being configured/indicated), the wireless device may skip adjusting the PDCCH monitoring occasions (per discussions of the method described in FIG. 28A and FIG. 28B).

Some example embodiments of the present disclosure may allow the wireless device to properly adjust PDCCH monitoring occasions based on the starting occasion of a DRX ODT corresponding to a DRX configuration, e.g., allow the wireless device to align the PDCCH monitoring occasions with the starting occasion of the DRX ODT. For example, example embodiments may reduce delay in scheduling the wireless device and/or reduce the consumed power of the wireless device for monitoring the PDCCH.

An example method comprising: receiving, by a wireless device, one or more configuration parameters indicating at least two search space set (SS) groups for physical downlink control channel (PDCCH) monitoring; monitoring the PDCCH according to a first SS group of the at least two SS groups; receiving a downlink control information (DCI) comprising a PDCCH monitoring adaptation field indicating skipping PDCCH during a first window; stopping/skipping, during the first window, the PDCCH monitoring; and in response to transmitting an uplink signal comprising a negative acknowledgement, resuming/starting, after a transmission occasion of the uplink signal, the PDCCH monitoring according to a second SS group of the at least two SS groups.

The above-example method further comprising switching to the second SS group after an offset from the transmission occasion of the uplink signal.

One or more of the above-example methods, wherein the offset is based on at least one of: an SS switching delay; or a length/value of a discontinuous reception (DRX) timer.

One or more of the above-example methods, wherein the DRX timer is a drx-HARQ-RTT-TimerDL.

One or more of the above-example methods, wherein the length of the DRX timer is greater than the SS switching delay.

One or more of the above-example methods, wherein the offset is a minimum of a first value and the SS switching delay, wherein the first value is a subtraction of the SS switching delay from the length of the DRX timer.

One or more of the above-example methods, wherein the length of the DRX timer is smaller than the SS switching delay.

One or more of the above-example methods, wherein the offset is equal to the SS switching delay.

One or more of the above-example methods, wherein a group index of the second SS group is greater than 0.

One or more of the above-example methods, wherein the second SS group is equal to the first SS group.

One or more of the above-example methods, wherein a group index of the first SS group is greater than 0.

One or more of the above-example methods, wherein the second SS group is different than the first SS group.

One or more of the above-example methods, wherein a group index of the first SS group is 0.

One or more of the above-example methods, further comprising determining an SS switch timer corresponding to the first SS group not being running.

One or more of the above-example methods, further comprising starting the SS switch timer in response to resuming the PDCCH monitoring according to the second SS group, wherein an index of the second SS group is greater than 0.

One or more of the above-example methods, further comprising determining an SS switch timer corresponding to the first SS group being running.

One or more of the above-example methods, further comprising restarting/resetting the SS switch timer in response to resuming the PDCCH monitoring according to the second SS group, wherein the second SS group is the first SS group.

One or more of the above-example methods, further comprising starting an SS switch timer in response to resuming the PDCCH monitoring according to the second SS group, wherein: a group index of the first SS group is 0; and a group index of the second SS group is greater than 0.

One or more of the above-example methods, further comprising transmitting the uplink signal.

One or more of the above-example methods, wherein the transmitting the uplink signal comprises a number of repetitions, wherein the number of repetitions is indicated by the one or more configuration parameters.

One or more of the above-example methods, wherein the transmission occasion of the uplink signal corresponds to a first repetition of the uplink signal.

One or more of the above-example methods, wherein the one or more configuration parameters configures the wireless device for resuming the PDCCH skipping from the last repetition of the uplink signal.

One or more of the above-example methods, wherein the transmission occasion of the uplink signal corresponds to a last repetition of the uplink signal.

One or more of the above-example methods, wherein the one or more configuration parameters configures the wireless device for resuming the PDCCH skipping from the first repetition of the uplink signal.

One or more of the above-example methods, further comprising: determining an SS switch timer corresponding to the first SS group being running; avoiding decrementing the SS switch timer during the first window; and decrementing the SS switch timer based on the resuming the PDCCH monitoring according to the first SS group.

One or more of the above-example methods, further comprising: determining an SS switch timer corresponding to the first SS group being running; decrementing the SS switch timer during the first window; and resetting, in response to determining the SS switch timer not being expired, the SS switch timer based on the resuming the PDCCH monitoring according to the first SS group.

One or more of the above-example methods, wherein the timer is a drx-HARQ-RTT-TimerUL.

One or more of the above-example methods, further comprising in response to transmitting a second uplink signal comprising a positive scheduling request (SR): resuming/starting, after a transmission occasion of the second uplink signal, the PDCCH monitoring according to the second SS group of the at least two SS groups; and switching from the first SS group to the second SS group after an offset from the transmission occasion of the second uplink signal.

One or more of the above-example methods, wherein the offset is an SS switching delay.

One or more of the above-example methods, wherein the DCI triggers the transmission of the uplink signal.

One or more of the above-example methods, wherein the DCI does not trigger the transmission of the uplink signal.

One or more of the above-example methods, further comprising in response to transmitting a third uplink signal comprising a transport block: resuming/starting, after a transmission occasion of the second uplink signal, the PDCCH monitoring according to the second SS group of the at least two SS groups; and switching from the first SS group to the second SS group after an offset from the transmission occasion of the second uplink signal.

One or more of the above-example methods, wherein the third uplink signal is a physical uplink shared channel (PUSCH).

One or more of the above-example methods, wherein the offset is based on at least one of: an SS switching delay; or a length/value of a drx-HARQ-RTT-TimerDL.

An example method comprising: monitoring the PDCCH according to a first SS group of at least two SS groups; receiving a downlink control information (DCI) indicating skipping PDCCH monitoring; stopping/skipping, based on the DCI, the PDCCH monitoring; and in response to transmitting an uplink signal, resuming/starting, after a transmission occasion of the uplink signal, the PDCCH monitoring according to a second SS group of the at least two SS groups.

An example method comprising: receiving, by a wireless device, one or more configuration parameters indicating at least two search space (SS) groups for physical downlink control channel (PDCCH) monitoring; monitoring the PDCCH according to a first SS group of the at least two SS groups; receiving a downlink control information (DCI) comprising a PDCCH monitoring adaptation field indicating a second SS group of the at least two SS groups; monitoring, based on the DCI, the PDCCH monitoring according to the second SS group of the at least two SS groups; and in response to transmitting an uplink signal comprising a negative acknowledgement after the receiving the DCI, monitoring, after a transmission occasion of the uplink signal, the PDCCH monitoring according to the first SS group of the at least two SS groups.

The above-example method, further comprising switching to the first SS group after an offset from the transmission occasion of the uplink signal.

One or more of the above-example methods, further comprising determining a SS switch timer being running, wherein the SS switch timer is started based on the receiving the DCI.

One or more of the above-example methods, further comprising resetting the SS switch timer in response to the switching from the second SS group to the first SS group, wherein a group index of the first SS group is greater than 0.

One or more of the above-example methods, further comprising decrementing the SS switch timer by value one at a beginning of a slot after the switching from the second SS group to the first SS group, wherein a group index of the first SS group is greater than 0.

One or more of the above-example methods, further comprising determining a SS switch timer not being running.

One or more of the above-example methods, further comprising starting the SS switch timer based on switching to the second SS group.

One or more of the above-example methods, wherein a group index of the first SS group is larger than 0.

One or more of the above-example methods, wherein a group index of the second SS group is 0.

One or more of the above-example methods, further comprising resetting the SS switch timer based on receiving a first DCI with a first radio network temporary identifier (RNTI), wherein the first RNTI is an extended reality (XR) dedicated RNTI.

One or more of the above-example methods, wherein the offset is based on at least one of: an SS switching delay; or a length/value of a discontinuous reception (DRX) timer, wherein the DRX timer is a drx-HARQ-RTT-TimerDL.

One or more of the above-example methods, wherein the length of the DRX timer is greater than the SS switching delay.

One or more of the above-example methods, wherein the offset is a minimum of a first value and the SS switching delay, wherein the first value is a subtraction of the SS switching delay from the length of the DRX timer.

One or more of the above-example methods, wherein the length of the DRX timer is smaller than the SS switching delay.

One or more of the above-example methods, wherein the offset is equal to the SS switching delay.

One or more of the above-example methods, further comprising: in response to transmitting a second uplink signal comprising a positive scheduling request after the receiving the DCI, monitoring, after a transmission occasion of the second uplink signal, the PDCCH monitoring according to the first SS group of the at least two SS groups; and switching to the first SS group after an offset from the transmission occasion of the second uplink signal.

One or more of the above-example methods, wherein the second uplink signal is a physical uplink control channel (PUCCH).

One or more of the above-example methods wherein the offset is an SS switching delay.

One or more of the above-example methods, further comprising: in response to transmitting a third uplink signal comprising a transport block after the receiving the DCI, monitoring, after a transmission occasion of the second uplink signal, the PDCCH monitoring according to the first SS group of the at least two SS groups; and switching to the first SS group after an offset from the transmission occasion of the second uplink signal.

One or more of the above-example methods, wherein the third uplink signal is a physical uplink shared channel (PUSCH).

One or more of the above-example methods, wherein the offset is based on at least one of: an SS switching delay; or a length/value of a DRX timer, wherein the DRX timer is a drx-HARQ-RTT-TimerUL.

One or more of the above-example methods, further comprising transmitting the uplink signal.

One or more of the above-example methods, wherein the transmitting the uplink signal comprises a number of repetitions, wherein the number of repetitions is indicated by the one or more configuration parameters.

One or more of the above-example methods, wherein the transmission occasion of the uplink signal corresponds to a first repetition of the uplink signal.

One or more of the above-example methods, wherein the transmission occasion of the uplink signal corresponds to a last repetition of the uplink signal.

One or more of the above-example methods, wherein the one or more configuration parameters configures the wireless device for switching from the second SS group to the first SS group after the last repetition of the uplink signal.

One or more of the above-example methods, wherein the one or more configuration parameters configures the wireless device for switching from the second SS group to the first SS group after the first repetition of the uplink signal.

An example method comprising: receiving, by a wireless device, one or more configuration parameters indicating: at least two search space (SS) groups for physical downlink control channel (PDCCH) monitoring on a serving cell; and a value of a discontinuous reception (DRX) timer; starting the DRX timer; in response to the starting the DRX timer: monitoring the PDCCH according to a first SS group of the at least two SS groups; and starting a first timer; and based on an expiry of the first timer and while the DRX timer is running, monitoring the PDCCH according to a second SS group of the at least two SS groups.

The above-example method, further comprising stopping, based on the expiry of the first timer, the PDCCH monitoring according to the first group of the at least two SS groups.

One or more of the above-example methods, wherein the expiry of the first timer is during the DRX timer running.

One or more of the above-example methods, wherein the one or more configuration parameters indicate a second value for the first timer.

One or more of the above-example methods, wherein the one or more configuration parameters indicate a third value for a SS switch timer, wherein the SS timer is different than the first timer.

One or more of the above-example methods, wherein the first timer is an SS switch timer.

One or more of the above-example methods, wherein the first timer is a bandwidth part inactivity timer.

One or more of the above-example methods, wherein a group index of the first SS group of the at least two SS groups is greater than 0.

One or more of the above-example methods, wherein a group index of the first SS group of the at least two SS groups is equal to 0.

One or more of the above-example methods, wherein a group index of the second SS group of the at least two SS groups is greater than 0.

One or more of the above-example methods, wherein a group index of the second SS group of the at least two SS groups is 0.

One or more of the above-example methods, further comprising stopping the first timer based on receiving a downlink control information (DCI) or starting a DRX inactivity timer, wherein the DCI schedules at least one of: a transmission of at least one physical uplink shared channel (PUSCH); or a transmission of at least one physical downlink shared channel (PDSCH).

One or more of the above-example methods, wherein the DCI comprises a PDCCH monitoring adaptation field indicating the second SS group.

One or more of the above-example methods, wherein the DCI does not comprise a PDCCH monitoring adaptation field.

One or more of the above-example methods, wherein the DCI indicates a bandwidth part switching.

One or more of the above-example methods, wherein the DCI is scrambled by an extended reality (XR) dedicated radio network temporary identifier (RNTI).

One or more of the above-example methods, further comprising switching from the first SS group to the second SS group based on a Start packet data unit (PDU) of a PDU Set being received.

One or more of the above-example methods, further comprising switching from the second SS group to a third SS group of the at least two SS groups based on: an End PDU of a PDU Set being received; or an End of data burst indication being received.

One or more of the above-example methods, wherein the third SS group in the first SS group.

One or more of the above-example methods, wherein a group index of the third SS group is 0.

One or more of the above-example methods, further comprising starting an SS switch timer in response to switching from the first SS group to the second SS group.

One or more of the above-example methods, further comprising resetting the SS switch timer in response to receiving a first DCI, wherein the first DCI is scrambled by an XR dedicated RNTI.

One or more of the above-example methods, further comprising: determining a first occasion for the starting the DRX timer; preparing switching to the first SS group an SS switching delay prior to the first occasion.

One or more of the above-example methods, further comprising: determining a second occasion for the expiry of the first timer; and preparing switching to the second SS group an SS switching delay prior to the second occasion.

One or more of the above-example methods, wherein the first SS group is a sparse SS group.

One or more of the above-example methods, wherein the second SS group is a dense SS group.

An example method comprising: receiving, by a wireless device, one or more configuration parameters indicating: at least two groups for physical downlink control channel (PDCCH) monitoring on a serving cell; a value for a discontinuous reception (DRX) timer; starting, at a beginning of a DRX cycle, the DRX timer; monitoring, in response to the starting the DRX timer, the PDCCH according to a first SS group of the at least two SS groups; and monitoring, in response to restarting the DRX timer during the DRX cycle, PDCCH according a second SS group of the at least two SS groups.

The above-example method, may further comprise restarting the DRX timer during the DRX cycle based on one or more conditions being satisfied.

One or more of the above-example methods, wherein the one or more conditions are based on at least one of: receiving an indication indicating restarting the DRX timer; a packet data unit (PDU) set related assistance information; or overlapping the DRX timer with a measurement gap.

An example method comprising: receiving, by a wireless device, one or more configuration parameters indicating: at least two search space (SS) groups for physical downlink control channel (PDCCH) monitoring on a serving cell; and discontinuous reception (DRX) configuration parameters of at least two DRX configurations; and monitoring, during a DRX active time, the PDCCH according to at least one SS group of the at least two SS groups based on whether the DRX active time corresponding to a first DRX configuration of the at least two DRX configurations or a second DRX configuration of the at least two DRX configurations.

The above-example method, further comprising monitoring, during a first DRX active time of the first DRX configuration of the at least two DRX configurations, the PDCCH according to a first SS group of the at least two SS groups; and monitoring, during a second DRX active time of the second DRX configuration of the at least two DRX configurations, the PDCCH according to a second SS group of the at least two SS groups.

One or more of the above-example methods, further comprising: determining the first SS group of the at least two SS groups being associated (or corresponding to) the first DRX configuration of the at least two DRX configurations; and determining the second SS group of the at least two SS groups being associated (or corresponding to) the second DRX configuration of the at least two DRX configurations.

One or more of the above-example methods, wherein the first SS group corresponds to one or more first radio network temporary identifiers (RNTIs) and the second SS group corresponds to one or more second radio network temporary identifiers (RNTIs).

One or more of the above-example methods, wherein the one or more first RNTIs comprise at least one extended reality (XR) dedicated RNTI.

One or more of the above-example methods, wherein: the first DRX configuration corresponds to a first type of traffic, wherein the first type of traffic has a non-integer data burst periodicity; or a DRX cycle of the first DRX configuration is a non-integer value.

One or more of the above-example methods, wherein: the second DRX configuration corresponds to a second type of traffic, wherein the second type of traffic has an integer data burst periodicity; or a DRX cycle of the second DRX configuration is an integer value.

One or more of the above-example methods, further comprising: activating the first DRX configuration in response to receiving the one or more configuration parameters; receiving an activation command activating the second DRX configuration; and activating the second DRX configuration in response to the activation command.

One or more of the above-example methods, further comprising deactivating the first DRX configuration in response to the activation command.

One or more of the above-example methods, wherein the activation command indicates the deactivating of the first DRX configuration.

An example method comprising: determining, by a wireless device and using a first pre-defined formula, a first occasion for starting a first discontinuous reception (DRX) on-duration timer of a first DRX configuration based on a first DRX cycle of the first DRX configuration being an integer number; starting the first DRX on-duration timer of the first DRX configuration at the first occasion; determining, using a second pre-defined formula, a second occasion for starting a second discontinuous reception (DRX) on-duration timer of a second DRX configuration based on a second DRX cycle of the second DRX configuration being a non-integer number; and starting the second DRX on-duration timer of the second DRX configuration at the second occasion.

The above-example method, may further comprise determining, using the first per-defined formula, the first occasion based on the first DRX configuration corresponding to a first traffic type with an integer data burst periodicity.

One or more of the above-example methods, further comprising determining, using the second per-defined formula, the second occasion based on the second DRX configuration corresponding to a second traffic type with a non-integer data burst periodicity.

One or more of the above-example methods, further comprising determining, using the second per-defined formula, the second occasion based on the second DRX configuration comprising at least two DRX slot offsets for starting the second DRX on-duration timer.

An example method comprising: receiving, by a wireless device, one or more configuration parameters indicating: a periodicity and a slot offset for determining one or more physical downlink control channel (PDCCH) monitoring occasions; and a discontinuous reception (DRX) cycle with a non-integer value; determining, in response to the DRX cycle having the non-integer value, the one or more PDCCH monitoring occasions based on: the periodicity and the slot offset; and an occasion for starting a DRX on-duration timer; and monitoring, while the DRX on-duration timer running, PDCCH using the one or more PDCCH monitoring occasions.

The above-example method, wherein the periodicity and the slot offset correspond to a search space set with a first search space index.

One or more of the above-example methods, wherein the one or more configuration parameters indicates a second DRX cycle with an integer value.

One or more of the above-example methods, further comprising determining, in response to the second DRX cycle having the integer value, the one or more PDCCH monitoring occasions based on the periodicity and the slot offset.

Clause 1. A method comprising: receiving, by a wireless device, one or more discontinuous reception (DRX) configuration parameters indicating: a first DRX cycle; a DRX slot offset; and a DRX on-duration timer; determining, for starting the DRX on-duration timer, a DRX cycle based on whether the one or more DRX configuration parameters indicate a second DRX cycle with a non-integer value, wherein the DRX cycle is: the first DRX cycle, based on the one or more DRX configuration parameters not indicating the second DRX cycle with the non-integer value; and the second DRX cycle, based on the one or more DRX configuration parameters indicating the second DRX cycle with the non-integer value; and starting, after the DRX slot offset from a subframe determined based on the DRX cycle, the DRX on-duration timer.

Clause 2. A method comprising: receiving, by a wireless device, one or more discontinuous reception (DRX) configuration parameters indicating a first DRX cycle; determining a DRX cycle based on whether the one or more DRX configuration parameters indicate a second DRX cycle with a non-integer value, wherein the DRX cycle is: the first DRX cycle, based on the one or more DRX configuration parameters not configuring the second DRX cycle with the non-integer value; and the second DRX cycle, based on the one or more DRX configuration parameters configuring the second DRX cycle with the non-integer value; and starting, based on the DRX cycle, a DRX on-duration timer.

Clause 3. The method of clause 2, wherein: the one or more DRX configuration parameters not configuring the second DRX cycle with the non-integer value comprises the one or more DRX configuration parameters not indicating the second DRX cycle with the non-integer value; and the one or more DRX configuration parameters configuring the second DRX cycle with the non-integer value comprises the one or more DRX configuration parameters indicating the second DRX cycle with the non-integer value.

Clause 4. The method of clause 2 or clause 3, wherein: the one or more DRX configuration parameters indicate a DRX slot offset and the DRX on-duration timer; and the starting the DRX on-duration timer is after the DRX slot offset from a subframe, wherein the subframe is determined based on the DRX cycle.

Clause 5. The method of any one of clauses 1 to 4, wherein based on the one or more DRX configuration parameters configuring the second DRX cycle with the non-integer value, the determined subframe, for starting the DRX on-duration timer, is further based on a counter.

Clause 6. The method of any one of clauses 1 to 4, wherein based on the one or more DRX configuration parameters configuring the second DRX cycle with the non-integer value, the starting the DRX on-duration timer is further based on a counter.

Clause 7. The method of any clauses 1 to 6, wherein based on the one or more DRX configuration parameters configuring the second DRX cycle with the non-integer value, the determined subframe, for starting the DRX on-duration timer, is further based on a second system frame number (SFN), wherein: the second SFN is different than a first SFN; the first SFN is determined based on receiving a master information block (MIB); and the second SFN is used when the DRX cycle is a non-integer value.

Clause 8. The method of any one of clauses 1 to 7, wherein based on the one or more DRX configuration parameters not configuring the second DRX cycle with the non-integer value, the determined subframe, for starting the DRX on-duration timer, is further based on a single system frame number (SFN), wherein the single SFN is determined based on receiving a master information block (MIB).

Clause 9. The method of any one of clauses 2 to 8, wherein based on the one or more DRX configuration parameters configuring the second DRX cycle with the non-integer value, the starting the DRX on-duration timer is further based on a second SFN, wherein: the second SFN is different than a first SFN; the first SFN is determined based on receiving a master information block (MIB); and the second SFN is used when the DRX cycle is a non-integer value.

Clause 10. The method of any one of clauses 2 to 9, wherein based on the one or more DRX configuration parameters not configuring the second DRX cycle with the non-integer value, the starting the DRX on-duration timer is further based on a single system frame number (SFN), wherein the single SFN is determined based on receiving a master information block (MIB).

Clause 11. The method of any one of clauses 1 to 10, wherein: the first DRX cycle is a first Long DRX cycle; the second DRX cycle is a second Long DRX cycle; and the DRX cycle is a Long DRX cycle.

Clause 12. The method of any one of clauses 1 to 11, wherein: the first DRX cycle is a first Short DRX cycle; the second DRX cycle is a second Short DRX cycle; and the DRX cycle is a Short DRX cycle.

Clause 13. The method of any one of clauses 1 to 12, further comprising receiving one or more radio resource control (RRC) messages comprising the one or more DRX configuration parameters.

Clause 14. A method comprising: receiving, by a wireless device, one or more radio resource control (RRC) configuration parameters indicating to resume control channel monitoring after a last repetition of repetitions of an uplink signal; receiving a downlink control information (DCI) indicating to skip control channel monitoring; starting, based on the DCI, skipping monitoring control channel; transmitting repetitions of a first uplink signal; and based on the one or more RRC configuration parameters, resuming, after a last repetition of the repetitions of the first uplink signal, monitoring the control channel.

Clause 15. The method of clause 14, wherein the first uplink signal comprises at least one of: a negative acknowledgment; or a scheduling request (SR).

Clause 16. The method of clause 14 or clause 15, wherein the transmitting repetitions of the first uplink signal is after the receiving the DCI.

Clause 17. The method of any one of clauses 14 to 16, wherein the resuming monitoring the control channel comprises terminating skipping monitoring control channel.

Clause 18. The method of any one of clauses 14 to 17, wherein monitoring control channel comprises monitoring physical downlink control channel (PDCCH) candidates.

Clause 19. The method of any one of clauses 14 to 18, wherein skipping monitoring control channel comprises skipping monitoring physical downlink control channel (PDCCH) candidates.

Clause 20. A method comprising, receiving, by a wireless device, one or more second RRC configuration parameters; receiving a second DCI indicating to skip control channel monitoring; starting, based on the second DCI, skipping monitoring control channel; transmitting repetitions of a second uplink signal, wherein second uplink signal comprises at least one of: a second negative acknowledgment; or a second SR; and based on the one or more second RRC configuration parameters not indicating to resume control channel monitoring after a last repetition of repetitions of an uplink signal, resuming, after a first repetition of the repetitions of the second uplink signal, monitoring the control channel.

Clause 21. A method comprising: sending, by a network to a wireless device, one or more discontinuous reception (DRX) configuration parameters indicating: a first DRX cycle; a DRX slot offset; and a DRX on-duration timer, wherein the wireless device is configured to determine, for starting the DRX on-duration timer, a DRX cycle based on whether the one or more DRX configuration parameters indicate a second DRX cycle with a non-integer value, wherein the DRX cycle is: the first DRX cycle, based on the one or more DRX configuration parameters not indicating the second DRX cycle with the non-integer value; and the second DRX cycle, based on the one or more DRX configuration parameters indicating the second DRX cycle with the non-integer value; and to start, after the DRX slot offset from a subframe determined based on the DRX cycle, the DRX on-duration timer.

Clause 22. A method comprising: sending, by a network to a wireless device, one or more discontinuous reception (DRX) configuration parameters indicating a first DRX cycle; wherein the wireless device is configured to determine a DRX cycle based on whether the one or more DRX configuration parameters indicate a second DRX cycle with a non-integer value, wherein the DRX cycle is: the first DRX cycle, based on the one or more DRX configuration parameters not configuring the second DRX cycle with the non-integer value; and the second DRX cycle, based on the one or more DRX configuration parameters configuring the second DRX cycle with the non-integer value; and to start, based on the DRX cycle, a DRX on-duration timer.

Clause 23. The method of clause 22, wherein: the one or more DRX configuration parameters not configuring the second DRX cycle with the non-integer value comprises the one or more DRX configuration parameters not indicating the second DRX cycle with the non-integer value; and the one or more DRX configuration parameters configuring the second DRX cycle with the non-integer value comprises the one or more DRX configuration parameters indicating the second DRX cycle with the non-integer value.

Clause 24. The method of clause 22 or clause 23, wherein: the one or more DRX configuration parameters indicate a DRX slot offset and the DRX on-duration timer; and the starting the DRX on-duration timer is after the DRX slot offset from a subframe, wherein the subframe is determined based on the DRX cycle.

Clause 25. The method of any one of clauses 21 to 24, wherein based on the one or more DRX configuration parameters configuring the second DRX cycle with the non-integer value, the determined subframe, for starting the DRX on-duration timer, is further based on a counter.

Clause 26. The method of any one of clauses 21 to 24, wherein based on the one or more DRX configuration parameters configuring the second DRX cycle with the non-integer value, the starting the DRX on-duration timer is further based on a counter.

Clause 27. The method of any clauses 21 to 26, wherein based on the one or more DRX configuration parameters configuring the second DRX cycle with the non-integer value, the determined subframe, for starting the DRX on-duration timer, is further based on a second system frame number (SFN), wherein: the second SFN is different than a first SFN; the first SFN is determined based on receiving a master information block (MIB); and the second SFN is used when the DRX cycle is a non-integer value.

Clause 28. The method of any one of clauses 21 to 27, wherein based on the one or more DRX configuration parameters not configuring the second DRX cycle with the non-integer value, the determined subframe, for starting the DRX on-duration timer, is further based on a single system frame number (SFN), wherein the single SFN is determined based on receiving a master information block (MIB).

Clause 29. The method of any one of clauses 22 to 28, wherein based on the one or more DRX configuration parameters configuring the second DRX cycle with the non-integer value, the starting the DRX on-duration timer is further based on a second SFN, wherein: the second SFN is different than a first SFN; the first SFN is determined based on receiving a master information block (MIB); and the second SFN is used when the DRX cycle is a non-integer value.

Clause 30. The method of any one of clauses 22 to 29, wherein based on the one or more DRX configuration parameters not configuring the second DRX cycle with the non-integer value, the starting the DRX on-duration timer is further based on a single system frame number (SFN), wherein the single SFN is determined based on receiving a master information block (MIB).

Clause 31. The method of any one of clauses 21 to 30, wherein: the first DRX cycle is a first Long DRX cycle; the second DRX cycle is a second Long DRX cycle; and the DRX cycle is a Long DRX cycle.

Clause 32. The method of any one of clauses 21 to 31, wherein: the first DRX cycle is a first Short DRX cycle; the second DRX cycle is a second Short DRX cycle; and the DRX cycle is a Short DRX cycle.

Clause 33. The method of any one of clauses 21 to 32, further comprising receiving one or more radio resource control (RRC) messages comprising the one or more DRX configuration parameters.

Clause 34. A method comprising: transmitting, by a network to a wireless device, one or more radio resource control (RRC) configuration parameters indicating to resume control channel monitoring after a last repetition of repetitions of an uplink signal; transmitting, by the network to the wireless device, a downlink control information (DCI) indicating to skip control channel monitoring, wherein the wireless device is configured to start, based on the DCI, skipping monitoring control channel; and receiving repetitions of a first uplink signal, wherein the wireless device is configured to, based on the one or more RRC configuration parameters, resume, after a last repetition of the repetitions of the first uplink signal, monitoring the control channel.

Clause 35. The method of clause 34, wherein the first uplink signal comprises at least one of: a negative acknowledgment; or a scheduling request (SR).

Clause 36. The method of clause 34 or clause 35, wherein the receiving repetitions of the first uplink signal is after the transmitting the DCI.

Clause 37. The method of any one of clauses 34 to 36, wherein the resuming monitoring the control channel comprises terminating skipping monitoring control channel.

Clause 38. The method of any one of clauses 34 to 37, wherein monitoring control channel comprises monitoring physical downlink control channel (PDCCH) candidates.

Clause 39. The method of any one of clauses 34 to 38, wherein skipping monitoring control channel comprises skipping monitoring physical downlink control channel (PDCCH) candidates.

Clause 40. A method comprising, transmitting, by a wireless device, one or more second RRC configuration parameters; transmitting a second DCI indicating to skip control channel monitoring, wherein the wireless device is configured to start, based on the second DCI, skipping monitoring control channel; and receiving repetitions of a second uplink signal, wherein second uplink signal comprises at least one of: a second negative acknowledgment; or a second SR; and wherein the wireless device is configured to, based on the one or more second RRC configuration parameters not indicating to resume control channel monitoring after a last repetition of repetitions of an uplink signal, resume, after a first repetition of the repetitions of the second uplink signal, monitoring the control channel.

Clause 41. An apparatus comprising one or more processors and memory storing instructions that, when executed by the one or more processors, cause the apparatus at least to perform the method according to any one of clauses 1-40.

Clause 42. A non-transitory computer-readable medium comprising instructions that, when executed by one or more processors of a device, cause the device to perform the method according to any one of clauses 1-40.

Clause 43. An apparatus comprising means for performing the method according to any one of clauses 1-40.

Clause 44. An apparatus comprising circuitry configured to perform the method according to any one of clauses 1-40.

Clause 45. A computer program product encoding instructions for performing the method according to any one of clauses 1-40.

The embodiments illustrated by way of example in clauses 1 through 45 may be used together in any combination, permutation, or sub-combination.

The invention claimed is:

1. A method comprising:
receiving, by a wireless device, one or more discontinuous reception (DRX) configuration parameters indicating:
a first DRX cycle;
a DRX slot offset; and
a DRX on-duration timer;
determining, for starting the DRX on-duration timer, a DRX cycle based on whether the one or more DRX configuration parameters indicate a second DRX cycle with a non-integer value, wherein the DRX cycle is:
the first DRX cycle, based on the one or more DRX configuration parameters not indicating the second DRX cycle with the non-integer value; and
the second DRX cycle, based on the one or more DRX configuration parameters indicating the second DRX cycle with the non-integer value, wherein a parameter of the one or more DRX configuration parameters indicates the non-integer value of the second DRX cycle; and
starting, after the DRX slot offset from a subframe determined based on the DRX cycle, the DRX on-duration timer.

2. The method of claim 1, wherein based on the one or more DRX configuration parameters configuring the second DRX cycle with the non-integer value, the determined subframe, for starting the DRX on-duration timer, is further based on a counter.

3. The method of claim 1, wherein based on the one or more DRX configuration parameters configuring the second DRX cycle with the non-integer value, the starting the DRX on-duration timer is further based on a counter.

4. The method of claim 1, wherein based on the one or more DRX configuration parameters configuring the second DRX cycle with the non-integer value, the determined subframe, for starting the DRX on-duration timer, is further based on a second system frame number (SFN), wherein:
the second SFN is different than a first SFN;
the first SFN is determined based on receiving a master information block (MIB); and
the second SFN is used when the DRX cycle is a non-integer value.

5. The method of claim 1, wherein based on the one or more DRX configuration parameters configuring the second DRX cycle with the non-integer value, the starting the DRX on-duration timer is further based on a second SFN, wherein:
the second SFN is different than a first SFN;
the first SFN is determined based on receiving a master information block (MIB); and
the second SFN is used when the DRX cycle is a non-integer value.

6. The method of claim 1, wherein:
the first DRX cycle is a first Long DRX cycle;
the second DRX cycle is a second Long DRX cycle; and
the DRX cycle is a Long DRX cycle.

7. The method of claim 1, further comprising receiving one or more radio resource control (RRC) messages comprising the one or more DRX configuration parameters.

8. A wireless device comprising:
one or more processors and memory storing instructions that, when executed by the one or more processors, cause the wireless device at least to perform
receiving one or more discontinuous reception (DRX) configuration parameters indicating:
a first DRX cycle;
a DRX slot offset; and
a DRX on-duration timer;
determining, for starting the DRX on-duration timer, a DRX cycle based on whether the one or more DRX configuration parameters indicate a second DRX cycle with a non-integer value, wherein the DRX cycle is:
the first DRX cycle, based on the one or more DRX configuration parameters not indicating the second DRX cycle with the non-integer value; and
the second DRX cycle, based on the one or more DRX configuration parameters indicating the second DRX cycle with the non-integer value, wherein a parameter of the one or more DRX configuration parameters indicates the non-integer value of the second DRX cycle; and
starting, after the DRX slot offset from a subframe determined based on the DRX cycle, the DRX on-duration timer.

9. The wireless device of claim 8, wherein based on the one or more DRX configuration parameters configuring the second DRX cycle with the non-integer value, the determined subframe, for starting the DRX on-duration timer, is further based on a counter.

10. The wireless device of claim 8, wherein based on the one or more DRX configuration parameters configuring the second DRX cycle with the non-integer value, the starting the DRX on-duration timer is further based on a counter.

11. The wireless device of claim 8, wherein based on the one or more DRX configuration parameters configuring the second DRX cycle with the non-integer value, the determined subframe, for starting the DRX on-duration timer, is further based on a second system frame number (SFN), wherein:
the second SFN is different than a first SFN;
the first SFN is determined based on receiving a master information block (MIB); and
the second SFN is used when the DRX cycle is a non-integer value.

12. The wireless device of claim 8, wherein based on the one or more DRX configuration parameters configuring the second DRX cycle with the non-integer value, the starting the DRX on-duration timer is further based on a second SFN, wherein:
the second SFN is different than a first SFN;
the first SFN is determined based on receiving a master information block (MIB); and
the second SFN is used when the DRX cycle is a non-integer value.

13. The wireless device of claim 8, wherein:
the first DRX cycle is a first Long DRX cycle;
the second DRX cycle is a second Long DRX cycle; and
the DRX cycle is a Long DRX cycle.

14. A non-transitory computer-readable medium comprising instructions that, when executed by one or more processors of a device, at least cause the device to perform:
receiving one or more discontinuous reception (DRX) configuration parameters indicating:
a first DRX cycle;
a DRX slot offset; and
a DRX on-duration timer;
determining, for starting the DRX on-duration timer, a DRX cycle based on whether the one or more DRX configuration parameters indicate a second DRX cycle with a non-integer value, wherein the DRX cycle is:
the first DRX cycle, based on the one or more DRX configuration parameters not indicating the second DRX cycle with the non-integer value; and
the second DRX cycle, based on the one or more DRX configuration parameters indicating the second DRX cycle with the non-integer value, wherein a parameter of the one or more DRX configuration parameters indicates the non-integer value of the second DRX cycle; and
starting, after the DRX slot offset from a subframe determined based on the DRX cycle, the DRX on-duration timer.

15. The non-transitory computer-readable medium of claim 14, wherein based on the one or more DRX configuration parameters configuring the second DRX cycle with the non-integer value, the determined subframe, for starting the DRX on-duration timer, is further based on a counter.

16. The non-transitory computer-readable medium of claim 14, wherein based on the one or more DRX configuration parameters configuring the second DRX cycle with the non-integer value, the starting the DRX on-duration timer is further based on a counter.

17. The non-transitory computer-readable medium of claim 14, wherein based on the one or more DRX configuration parameters configuring the second DRX cycle with the non-integer value, the determined subframe, for starting the DRX on-duration timer, is further based on a second system frame number (SFN), wherein:
the second SFN is different than a first SFN;
the first SFN is determined based on receiving a master information block (MIB); and
the second SFN is used when the DRX cycle is a non-integer value.

18. The non-transitory computer-readable medium of claim 14, wherein based on the one or more DRX configuration parameters configuring the second DRX cycle with the non-integer value, the starting the DRX on-duration timer is further based on a second SFN, wherein:
the second SFN is different than a first SFN;
the first SFN is determined based on receiving a master information block (MIB); and
the second SFN is used when the DRX cycle is a non-integer value.

19. The non-transitory computer-readable medium of claim 14, wherein:
the first DRX cycle is a first Long DRX cycle;
the second DRX cycle is a second Long DRX cycle; and
the DRX cycle is a Long DRX cycle.

20. The non-transitory computer-readable medium of claim 14, wherein:
the first DRX cycle is a first Short DRX cycle;
the second DRX cycle is a second Short DRX cycle; and
the DRX cycle is a Short DRX cycle.

* * * * *